United States Patent
Wing So

(12) 
(10) Patent No.: US 6,170,048 B1
(45) Date of Patent: Jan. 2, 2001

(54) PC CIRCUITS, SYSTEMS AND METHODS

(75) Inventor: John Ling Wing So, Plano, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/372,310

(22) Filed: Aug. 11, 1999

Related U.S. Application Data

(62) Division of application No. 08/823,257, filed on Mar. 24, 1997, now Pat. No. 5,987,590.

(51) Int. Cl.[7] ................................. G06F 9/24; G06F 9/44
(52) U.S. Cl. ............................... 712/35; 712/31; 712/37; 712/32
(58) Field of Search ................................ 714/30; 712/35, 712/31, 36, 32, 37; 709/209, 204; 395/872; 348/396; 710/22, 20, 65, 129; 340/396; 715/129

(56) References Cited

U.S. PATENT DOCUMENTS

| | | | | |
|---|---|---|---|---|
| 5,023,778 | * | 6/1991 | Simon, Jr. et al. | 709/209 |
| 5,508,942 | * | 4/1996 | Agarwal | 709/204 |
| 5,867,732 | * | 2/1999 | Young | 395/872 |

FOREIGN PATENT DOCUMENTS

PCT/US96/17963   5/1997  (WO).

* cited by examiner

*Primary Examiner*—Daniel H. Pan
(74) *Attorney, Agent, or Firm*—Robert D. Marshall, Jr.; W. James Brady, III; Frederick J. Telecky, Jr.

(57) ABSTRACT

An improved PC system that includes a main CPU microprocessor, a file-based operating system, and a DSP microprocessor arranged so that the DSP can execute main CPU operations during time intervals in which the main CPU is otherwise occupied, thereby increasing the bandwidth of the system is provided. This PC system may include multiple CPUs and/or multiple DSPs.

4 Claims, 39 Drawing Sheets

IDSP#1 = PCI DSVD
IDSP#2 = PCMCIA/
VIDEO ADAPTER
(MPEG 1)
IDSP#3 = #DD
IDSP#4 = ISA SOUND

DSP CACHING SCHEME

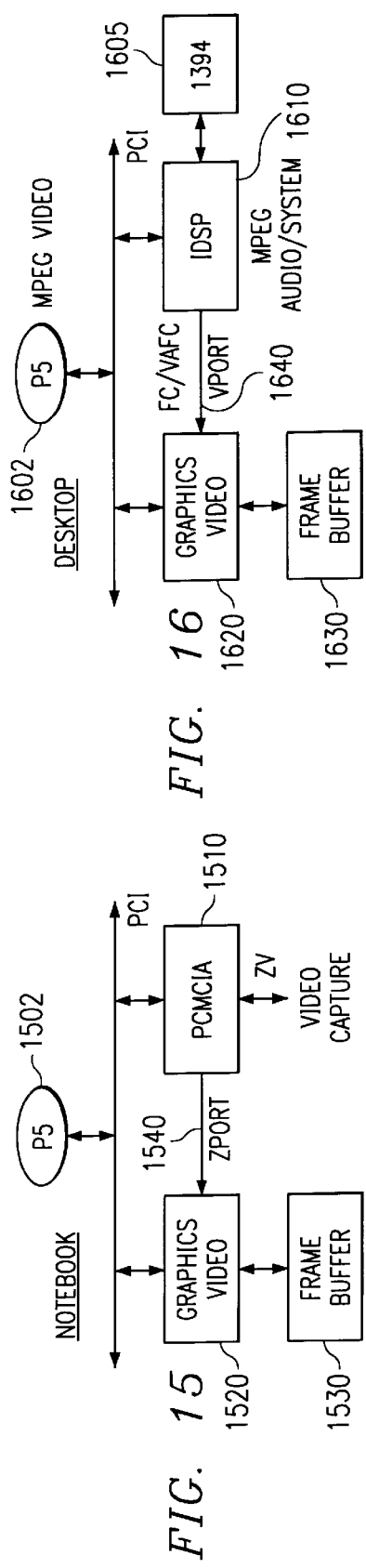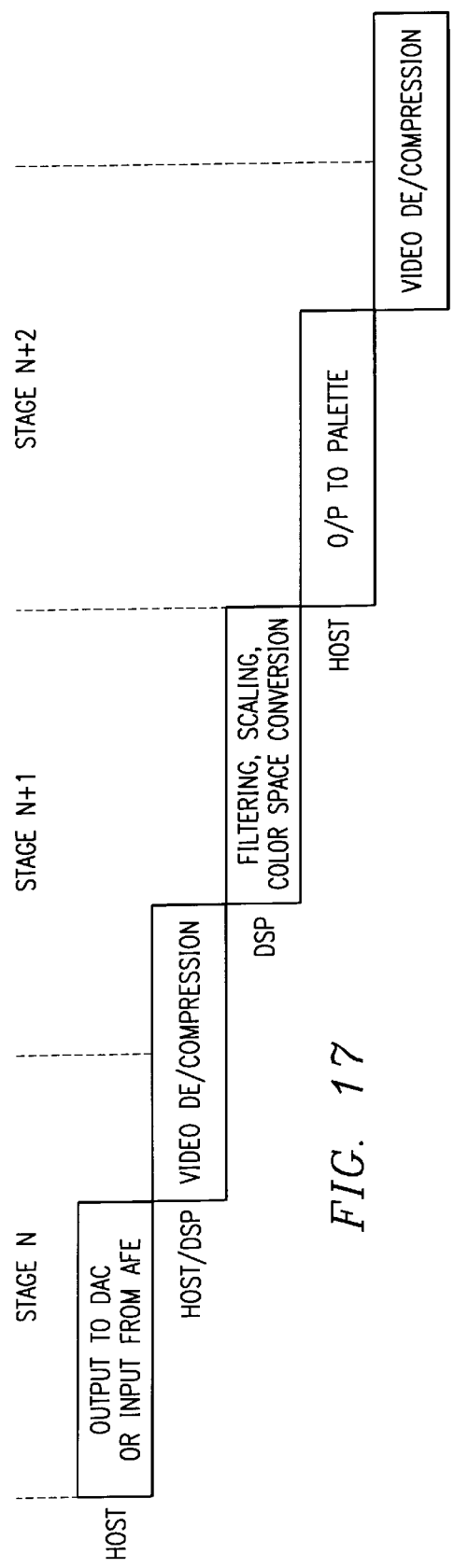

FIG. 30
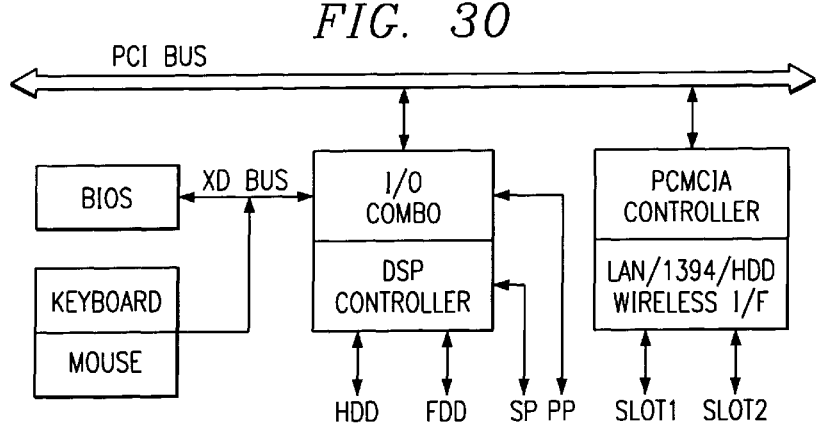
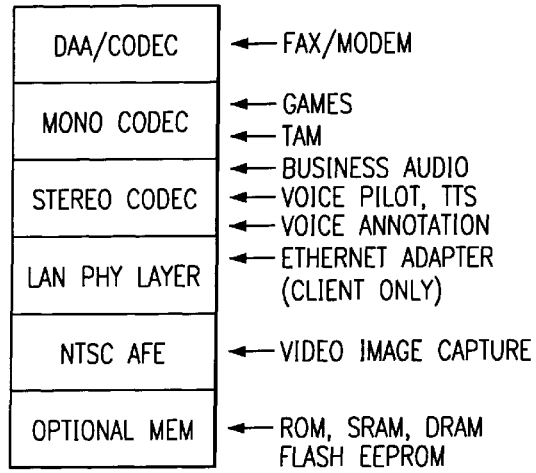
PCMCIA MM PERIPHERAL PHYSICAL LAYER
• A MULTI-FUNCTION MM PC CARD WITH ALL ANALOG I/O I/F CIRCUITS
• A SOFT DAA IS REQUIRED FOR TAM AND FAX/MODEM FUNCTIONS
• MONO CODECS FOR GAMES, FAX/MODEM AND GAMES
• A PHY FOR LAN CLIENT MODE
• OPTIONAL IMAGE CAPTURING AFE FOR IMAGE AND POSSIBLY VIDEO INPUT
FIG. 31
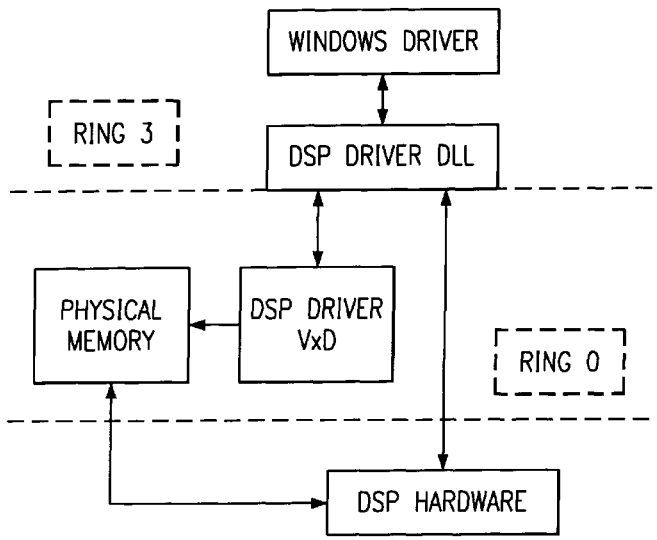

PC CIRCUITS, SYSTEMS AND METHODS

This application is a Divisional of 08/823,257 filed on Mar. 24, 1997, now U.S. Pat. No. 5,987,570.

FIELD OF THE INVENTION

This invention generally relates to improved PC circuits, computer systems and methods of operating them.

BACKGROUND OF THE INVENTION

Early computers required large amounts of space, occupying whole rooms. Since then minicomputers and desktop computers entered the marketplace.

Popular desktop computers have included the "Apple" (Motorola 680x0 microprocessor-based) and "IBM-compatible" (Intel or other x86 microprocessor-based) varieties, also known as personal computers (PCs) which have become very popular for office and home use. Also, high-end desk top computers called workstations based on a number of superscalar and other very-high-performance microprocessors such as the SuperSPARC microprocessor have been introduced.

In a further development, a notebook-size or palm-top computer is optionally battery powered for portable user applications. Such notebook and smaller computers challenge the art in demands for conflicting goals of miniaturization, ever higher speed, performance and flexibility, and long life between battery recharges. Also, a desktop enclosure called a docking station has the portable computer fit into the docking station, and improvements in such portable-computer/docking-station systems are desirable. However, all these systems are generally CPU-centric in the sense that the selection of the CPU determines the system's processing capabilities and add-in-cards are added to the CPU to add specific applications or functions, such as modem or multimedia. Improvements in circuits, integrated circuit devices, computer systems of all types, and methods to address all the just-mentioned challenges, among others, are desirable, as described herein.

SUMMARY OF THE INVENTION

Generally, and in one form of the present invention, a PC system includes a main CPU microprocessor, a file-based operating system, and a DSP microprocessor arranged so that the DSP can execute main CPU operations during time intervals in which the main CPU is otherwise occupied, thereby increasing the bandwidth of the system. This system may include multiple CPUs and/or multiple DSPs.

In another form of the present invention, a combined video/imaging system comprising a DSP microprocessor, video/audio control logic circuit and a compression/decompression circuit are both coupled to the DSP microprocessor, a main CPU microprocessor, a memory management circuit coupled to both the main CPU microprocessor and the DSP microprocessor, and a memory circuit and local bus coupling the memory circuit to the memory management circuit so that the memory circuit serves as a unified memory architecture for the DSP, main CPU, video control and de/compression circuitry and the DSP performs processing functions for both the video/audio and de/compression circuitries. In addition, software that virtualizes portions of the video/imaging functions may be added to the system.

The present invention provides a system for totally soft upgrades to PC.

The present invention provides a system which scales up in performance by bundling add-in features by way of an add-in card.

The present invention provides methodology of integrating features in the core logic for motherboard implementation.

The present invention provides full functional integration of a system on the CPU chip.

The present invention provides a system having a main CPU, a DSP, and at least one piece of application hardware reduced substantially to a physical layer only, so that the DSP virtualizes and performs the rest of the application associated with the signals mediated by the physical layer. This system may employ multiple applications and layers. The DSP may by way of example, virtualize a LAN, a video controller, image compression/decompression circuitry, fax, and modem.

The present invention provides an integrated circuit having a DSP core, a master/slave bus interface, and a memory circuit comprising FIFO function coupled to the master/slave interface and RAM function coupled to the DSP core.

The present invention provides an integrated circuit comprising a DSP core, a master/slave bus interface, and a memory circuit comprising FIFO function coupled to the master/slave interface and RAM function, and a single-instruction-multiple-data control circuit coupling the memory to the DSP core.

The present invention provides an integrated circuit having a DSP core, an interface circuit including a master/slave bus interface and a translation circuit, and a memory circuit comprising FIFO function coupled to the master/slave bus interface and a RAM function coupled to the translation circuit, and said DSP core is coupled to said memory and interface circuit.

The present invention provides a video controller integrated circuit having a first bus interface circuit, a display controller circuit having a display interface, and a second bus interface circuit, said display controller circuit including a bus mastering circuit coupled to said second bus interface circuit.

The present invention provides a software system having an operating system, at least one multimedia driver, an x86 object code application, a non-x86 DSP code application virtualizing a hardware application, and a DSP kernel software operable on a DSP core to perform realtime interrupt and/or DMA virtualization and/or multithreaded, multitasking operation in the DSP core in conjunction with the operating system and/or multimedia realtime events and/or causing the DSP core to perform memory transaction and/or I/O transaction functions otherwise performed by x86 operation.

The present invention provides a computing system, having a processing element, an interconnecting circuit connected to said processing element, memory circuitry connected to said processing element (or said interconnecting circuit), a multiplexed bus connected to said interconnecting circuit, and a virtualization circuit connected to said multiplexed bus for performing preselected application functions.

The present invention provides a virtualization circuit for performing preselected application functions, having a first multiplexed bus interface circuit, a second multiplexed bus interface circuit, and at least one signal processing element connected to said first and second interface circuits.

Other improved PC devices, systems and methods are also claimed.

BRIEF DESCRIPTION OF THE DRAWINGS

The invention may be understood by reference to the detailed description which follows, read in conjunction with the accompanying drawings in which:

FIG. 15 is a schematic block diagram of an embodiment of a video solution for a notebook computer of the present invention;

FIG. 16 is a schematic block diagram of an embodiment of a video solution for a desktop computer of the present invention;

FIG. 17 is a schematic diagram of an application pipeline for DSP algorithms for the improved computer system of the present invention;

FIG. 30 is an electrical block diagram of another embodiment of an improved computer system according to the present invention;

FIG. 31 is a schematic block diagram of an embodiment of a virtual memory model for the improved computer system of the present invention;

Corresponding numerals and symbols in the different Figures refer to corresponding parts unless otherwise indicated.

DETAILED DESCRIPTION

Figure 28:
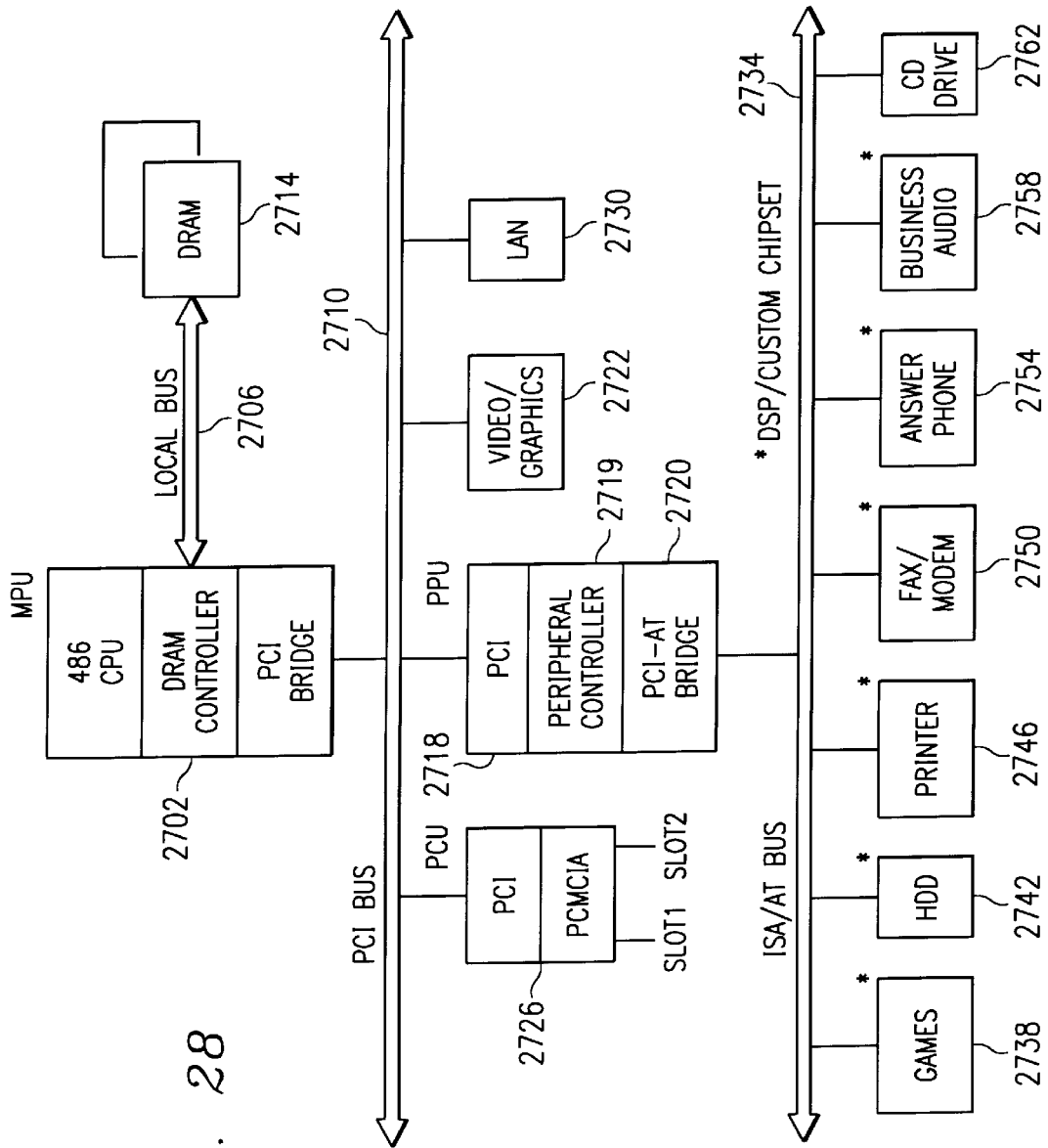
FIG. 28 is an electrical block diagram of another embodiment of an improved computer system according to the present invention.

Referring initially to FIG. 28, there may be seen a block diagram of an improved Personal Computer (PC) 100 of the present invention. In FIG. 28, MicroProcessor Unit (MPU) block 2702 includes a 486 (or P5) Central Processing Unit (CPU), or any other type of x86 CPU, a Dynamic Random Access Memory (DRAM) controller circuit and a PCI bridge circuit. The PC 100 has multimedia application capability.

Local CPU bus 2706 connects MPU block 2702 to a DRAM 2714. The DRAM preferably has at least 4 Meg of capacity, although clearly more or less memory may be so employed. The local bus 2706 is designed to maintain CPU independence so that a variety of CPUs may be used on the same bus.

PCI bus 2710 is connected to the CPU in MPU block 2702 via the PCI bridge (or interface) in block 2702. In this way the PCI 2710 bus provides a wide bandwidth bus and also provides a connector for a wide variety of peripherals which might otherwise adversely load the local bus 2706.

Peripherals Processing Unit (PPU) 2718 acts as a system bridge that connects the PCI bus 2710 to the ISA/AT bus 2734. A video graphics chip 2722 is connected to the PCI bus. Also, a PCMCIA bridge 2726 for PCMCIA cards or PCMCIA cardbus connects to the PCI bus. Network bridge 2730 connected to the PCI bus may be as uncomplicated as a Local Area Network (LAN) bridge, or can be a Wide Area Network (WAN) bridge, radio frequency bridge, ATM or ISDN bridge. Each of these types of bridges create a lot of traffic directly on the PCI bus, and indirectly create substantial traffic on the local bus 2706. The PC 100 typically has a keyboard and mouse (not depicted in FIG. 28) connected to it for user inputs and a display, or CRT, (not depicted in FIG. 28) for user viewing of CPU outputs.

In FIG. 28, buses 2706, 2710 and 2734 are not interconnected. ISA/AT bus 2734 has depicted a set of optional accessory peripherals connected to it, such as for example, but not limited to games 2738, hard disk drive 2742, printer 2746, fax data modem 2750, telephone answering machine (DTAD) 2754, business audio block 2758, and CD compact disk drive 2762 for multimedia PC. Each of these ISA blocks are accessory peripherals that perform part-time functions, and many (those asteriked) contain a digital signal processor (DSP).

Currently the other blocks connected to the PCI bus 2710 in FIG. 28 may cost about as much as all the peripheral devices connected to the ISA/AT bus 2734. For example, the total system cost of a business audio system 2758 should be less than $10 or less than about 0.5% of the total PC system cost.

A roadmap of cost reduction, future upgrade paths, and compatibility with existing ("Legacy") software are important goals for any improved PC systems. System embodiments of the present invention recognize and demonstrate that improvements at the system level can substantially achieve these goals. More particularly, system embodiments recognize that anything included on a PC motherboard preferably has low cost, free software, and takes essentially negligible motherboard area.

Backward compatibility with DOS and Windows 3.11 is desirable and may be provided by the "virtual" hardware of the present invention. Virtual hardware means that all the functions depicted in FIG. 28 are fixed and dedicated, and even though they are distributed they are not renewable. Software can help to virtualize them. If one chip implements all of the functions depicted in FIG. 28, it would be very programmable. Accordingly, various embodiments of the present invention combine all the redundant and conflicting hardware depicted in FIG. 28 to create several chips which are fully programmable to "virtualize" all the functions depicted in FIG. 28, and to ultimately provide a single chip to perform these functions.

Windows is the operating system (OS) for most recent and future PCs and has a dynamically linked library so that software does not have to be compiled and linked before runtime, e.g. Dynamic Link Loading (DLL) does not link until runtime, and provides virtual software. This reduces software system size.

Currently conventional CPU systems use fixed CPU hardware to implement various applications, but the CPU cannot sit on the AT-bus or on all the I/O ports depicted in FIG. 28. In one embodiment of the present invention described later herein, hardware does just this.

For multimedia applications a Direct Memory Access (DMA) 2719 and interrupt controller 2720 in system bridge 2718 have fixed hardware and a fixed function. In one embodiment of the present invention, DMA and interrupt control are virtualized. Two key challenges in servicing multimedia are the need for high bandwidth for multimedia data and the ability to service realtime interrupts. These challenges can create bottlenecks and interrupt latency which translates into constraints or limits on ability to service realtime events. All this is overcome in embodiments of the present invention by virtualizing the hardware, e.g. making the hardware programmable so that it may take on multiple personalities. When it takes on the personality of an interrupt handler, it is part of the CPU or an extension of the otherwise realtime capable CPU and operating system (OS), and not a coprocessor or attached unit.

Virtual hardware has the mobility to sit inside the CPU and inside the OS at the same time. Since there is no known way of physically achieving this, in accordance with the teachings of the present invention a virtualization is implemented. DSP solutions and cores which are programmable serve as the basis for the virtual hardware, which is customized and improved as described herein.

A DSP core is a highly advantageous base for running the various virtualizations needed for the embodiments of the present invention. However, a DSP utilizes memory peripherals and a local DSP bus which introduces an additional challenge. Using the teachings of the present invention a diametrically different DSP architecture is made to "look" like an x86 CPU, such as a Pentium(R), or vice versa.

A software link is used to tightly couple the DSP and its peripherals to the x86 CPU, and uses a popular OS, such as for example, but not limited to Windows 95, to do this. The software link couples the two more tightly than if they are on the same chip. Thus everything is made soft, and the line between hardware and software is blurred to achieve some remarkable advantages. Ultimately, one has a single chip, which is software upgradable remotely by phone line or by control information transfer.

Figure 19:
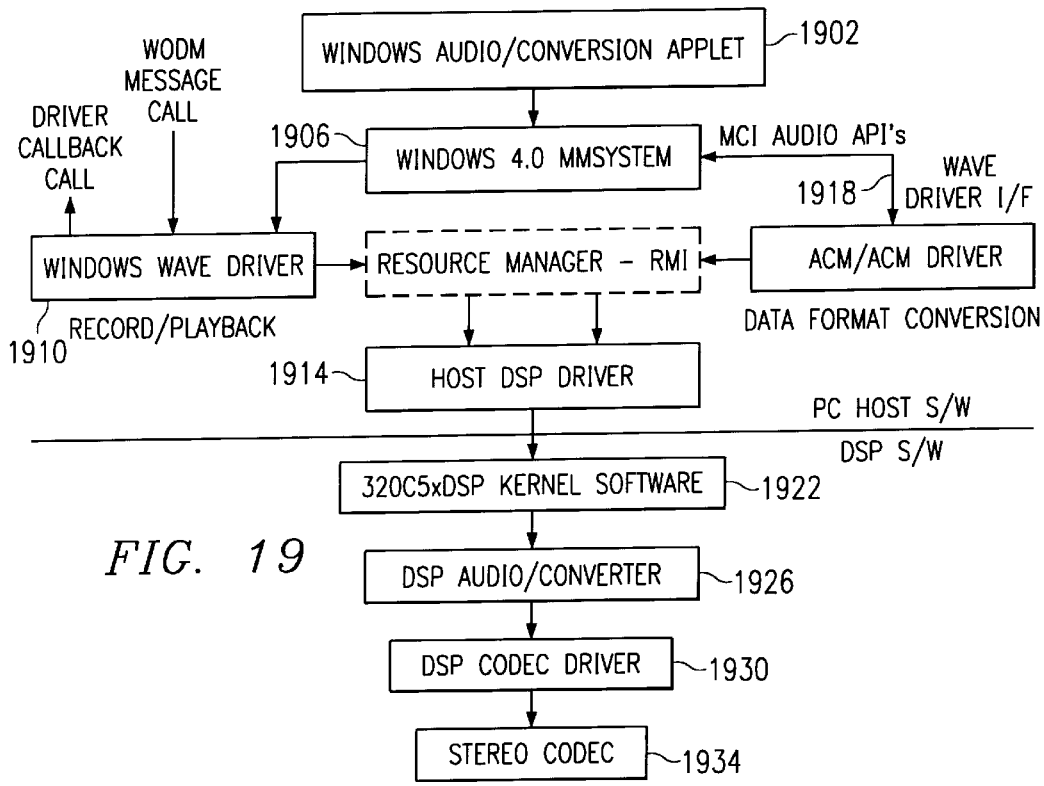
FIG. 19 is a system software flow diagram for the improved computer system of the present invention.

Referring now to FIG. 19 there may be seen a layered architecture which is predominant in Windows 3.11. Application block 1902 is a multimedia application, such as an audio application. Ordinarily blocks below block 1902 are transparent to ISVs (independent software vendors). The Windows application uses a client/server model with the application being the client and the server being whatever handles the request; the issue is often finding the right server. Block 1906 is a first layer MMSYSTEM (multimedia system) below block 1902 and communicates to multimedia hardware and plays a audio .WAV file. Windows .WAV driver block 1910 is a second layer or first driver layer in the system and handles requests from application 1902 and plays signals in the .WAV format without compression. A bottom layer in the CPU environment is DSP driver 1914, which is a virtual device driver that virtualizes the hardware in a hardware adaptation layer (HAL). An audio compression manager (ACM) driver 1918 provides compression,/decompression functionality in the system and communicates to block 1914. This completes the picture from the CPU 2702 side.

This provides a way in Windows architecture to plug in client/server architecture. Thus, through Windows one can plug in a DSP server or an audio compression server; the mechanics are the same. FIG. 19 shows a way to plug into Windows any architecture desired. Also, this is the key to backward compatibility while establishing a brand new nonintrusive roadmap to the future.

Next in FIG. 19 a virtual hardware environment 1922 is implemented, for example, with, but not limited to, a TI TMS320C5x DSP with special DSP kernel software which accommodates already available maximum third party installed software base (e.g. modems, audio equipment, etc). Everything runs on a preemptive basis and priorities are calculated in realtime and dynamically executed. However, something has to feed the OS so it can calculate realtime priorities; that something is the realtime kernel software 1922. This complements and does not conflict with the Windows OS, but serves to extend it. This provides multithreaded and multitasking systems.

Next, audio converter block 1926 performs audio compression/decompression on the DSP side whereas ACM driver block 1918 could have done the same function on the CPU side. However, if the CPU is occupied and does not have the time to perform this function, the DSP may handle it. If both the CPU and DSP are free, because of the ability of software to blur the line between the CPU and DSP, either or both can do this function. Thus, the CPU can impersonate a DSP and the DSP can impersonate the CPU, all as an advantageous result of the connection through the OS. Conventionally, the CPU performs data moves, since it can do so in 32 or 64 bit chunks. However, algorithmic intensive blocks in an application call for a DSP to do it; in this way applications may be accelerated.

DSP codec driver 1930 couples to a stereo codec 1934. Preferably, for this system embodiment one chip for the DSP is suitably used with an external stereo codec 1934 to allow for codec updates.

Figure 1:
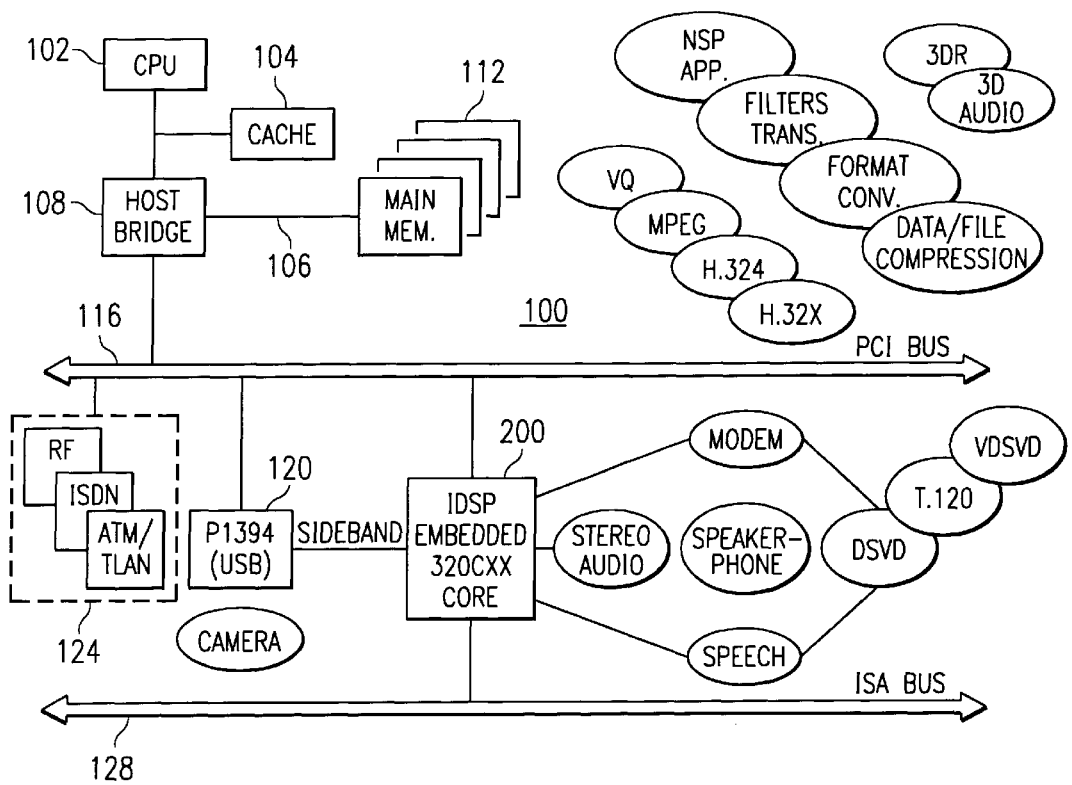
FIG. 1 is an electrical block diagram of an embodiment of an improved computer system according to the present invention.

Referring now to FIG. 1, there may be seen a block diagram of an improved PC 100 of the present invention. In FIG. 1, the DC system 100 includes a CPU 102 which is connected to cache 104 and host bridge 108. Host bridge 108 is connected to main memory bus 106 (sometimes referred to as the CPU bus or local bus) and thereby to main memory 112 and is also connected to PCI bus 116. The PC 100 typically has a keyboard and/or mouse (not depicted in FIG. 1) connected to it for user inputs and a display (or CRT) (not depicted in FIG. 1) for user viewing of CPU outputs. A virtual DSP circuit 200 is connected to the PCI bus 116. A P1394/USB block 120 which embodies a low to high speed serial capture port for the system 100, is connected to PCI bus 116. An I/O block 124 is depicted in FIG. 1 and is connected to the PCI bus 116. This I/O block may be an ATM/LAN, ISDN or RF link. The DSP block 200 may optionally connect to all these various I/O systems.

The DSP 200 can be used to comprehend or replace block 124 because of the ability of the DSP 200 to "virtualize" the hardware needed to perform these functions or applications.

In FIG. 1 the modem of the past is virtualized by providing the DSP 200 with appropriate modem software. Other similar applications that may be virtualized are speakerphone, speech, digital simultaneous voice and data modem (DSVD), T.120 transport layer, video digital simultaneous voice and data (VDSVD). The "bubbles" in FIG. 1 illustrate some of these applications.

Other virtualizable applications include vector quantization (VQ) for video compression/decompression, MPEG for video compression/decompression, room conferencing H.320 on ISDN, H.321, H.322 on ATM and LAN, and videoteleconferencing H.324 for a telephone line.

Still further virtualizable applications are 3-dimensional graphics rendering applications, and 3-dimensional audio for phase shifting directional audio.

More such applications include business audio, games, hard disk drive, printer, fax data modem, telephone answering machine (DTAD), CD compact disk drive for multimedia, and data/file compression executed by the DSP continuously to reduce system traffic and CPU burden, format conversion and digital filters and transforms.

In FIG. 1, the P1394/USB block 120 is included to recognize that the home market provides the PC as an appliance in appearance but not always in operation. For example, the PC is simply switched on and off and the user does not interface to it. Two cables, one for USB and one for P1394 are connected to this PC, and a wireless RF interface may be similarly connected. When the user wants a telephone answering machine, the user has a low-cost telephone unit that has a USB cable running from the telephone unit to the USB jack of the PC and, as well may have a line to the usual wall phone jack. If the PC is in another room of the house, RF may be used, or the home is wired for P1394.

To take cost out of a cellular phone, the hardware is removed from the design of the cellular phone and shifted to the PC. Thus the cellular phone is no longer a standalone system.

Thus, for each home application, the hardware is removed from the application as it is currently known and shifted to the PC which virtualizes that hardware within I/O block.

The RF hardware 124 likewise is virtualized down to the physical layer. Thus, the PC is truly multifunction and multitasking.

Figure 2:
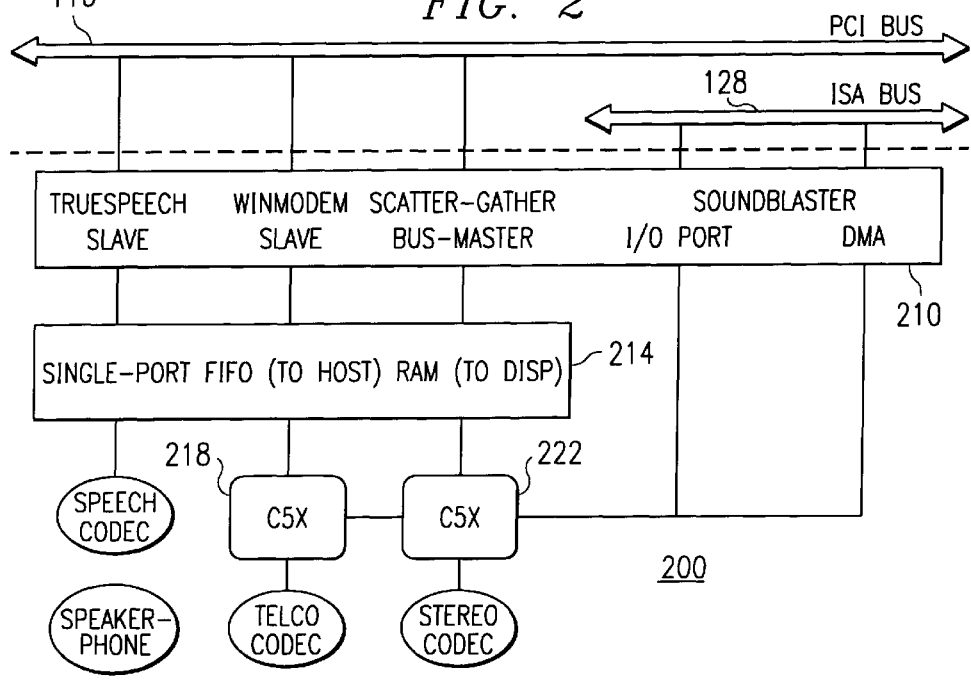
FIG. 2 is a more detailed electrical diagram (partially schematic, partially block) of a preferred embodiment of a portion of the improved computer system of FIG. 1.

Referring now to FIG. 2, there may be seen a block diagram providing more details of the virtual DSP block 200 of the improved PC 100 of the present invention. In FIG. 2, block 200 is connected to the PCI bus 116 and to the ISA bus 128. In other embodiments block 200 may be connected to the local bus 106 as well.

In FIG. 2, PCI bus 116 is connected to hardware interface circuitry 210 which is a first layer that in turn is coupled to interface circuitry 214, which in turn is coupled to two Texas Instruments TMS320C5x DSP cores 218 and 222. Circuitry 210 includes a PCI slave interface for speech transcoding (Truespeech Slave), a PCI slave interface for a windows-based modem data pump (WinModem Slave), a PCI super-bus master interface for DMA scatter-gather functionalities, a soundblaster(R, Creative Labs)—like I/O port and DMA interfaces. By virtue of circuitry 210 and PCI bus 116, a PCI/ISA bridge is also established for multimedia applications.

The heart of block 200 is one or more DSP cores 218, 222. Circuitry 214 is a FIFO-RAM; that is, circuitry 214 is a piece of RAM 112 that performs a FIFO function rather than being a hardware FIFO. To the DSPs 218 and 222 RAM 112 looks like a regular RAM, while RAM 112 looks like a FIFO to the PCI bus side of the interface. A lot of translations occur in circuitry 214. Data and operands stream between the CPU 102 and block 200. The CPU 102 does not operate on a byte or word basis. Even if the CPU operates on a 32 or 64 bit word basis it operates through bursts via the cache 104 and main memory 112 on a cache line basis. This data flow incompatibility consumes many cycles in translation.

The interface hardware 214 is designed to take the 32 or 64 bit wide datapath and extract any portion of it down to bytes and then provide 16 bit words to the DSP core(s). Thus a CISC or RISC to single instruction multiple data (SIMD) architecture is implemented to solve the interface challenge.

Thus, advantageously block 214 does the following functions: 1) streams in 64 or 128 bit wide bursts as a burst compatible FIFO, 2) translates them into a preselected DSP format, and 3) acts as RAM to the DSP core(s).

Since different clocks are running in the different chips, a clocking challenge is solved in block 210 by decoupling the DSP core operation from the PCI operation. From the CPU side the system is fully synchronized to the PCI operations. From the DSP side the system is asynchronous with the PCI operations. In this way, multiple wait states are avoided, and the blazing DSP operating speed does not come to a grinding halt when interfaced to the CPU.

A DMA transaction is preferably stream-I/O based. Although the CPU is operating in virtual space, the DMA is working in physical space. The translation is performed by the DSP under software control, preferably using Windows 95, without incurring old or new hardware in the CPU 102. The DSP becomes the main DMA engine. In another embodiment the DMA engine in 210 can be decoupled from the DSP 218 and DSP 222 is associated with the DMA engine. The DSP sets up and executes the DMA the way the CPU or windows wants it to. For example, over 100 megabytes/second DMA throughput is readily achievable with current technology DMA cores.

Block 210 in itself is a multifunction PCI agent and is cost-reduced in the sense of being a single-master, multiple slave PCI agent in hardware but not in operation. By virtue of the bus mastering capability of block 210 all slaves are slaved in operation but are capable of bus mastering the PCI bus when called upon to do so by the application. Software calls the slaves to be masters by appropriate configuration data. This multiple-personality interface works in the case that the CPU does the polling unless the CPU is otherwise occupied. If bus mastering is required, but the CPU is occupied, the same implementation allows the DSP to become the bus master through the master in block 210. The DSP thus is serving in the capacity of a host in lieu of the CPU 102 itself, for the same application.

The software architecture of Windows requires everything to look like a file transaction under Windows. File transactions are memory transactions and it does not matter whether the CPU or DSP performs them. Hardware is not needed because the CPU can only do one thing at a time, so the DSP gets at the system dead time and fills the dead time. The ability to cherry pick and get at this dead time is an important advantage of this approach that the CPU can not perform. Video chip, DSP, CPU—all chips are governed by same constraint that every transaction has to be a memory or file transaction (or less importantly for this purpose, an I/O transaction). All are treated equally under the OS.

Figure 3:
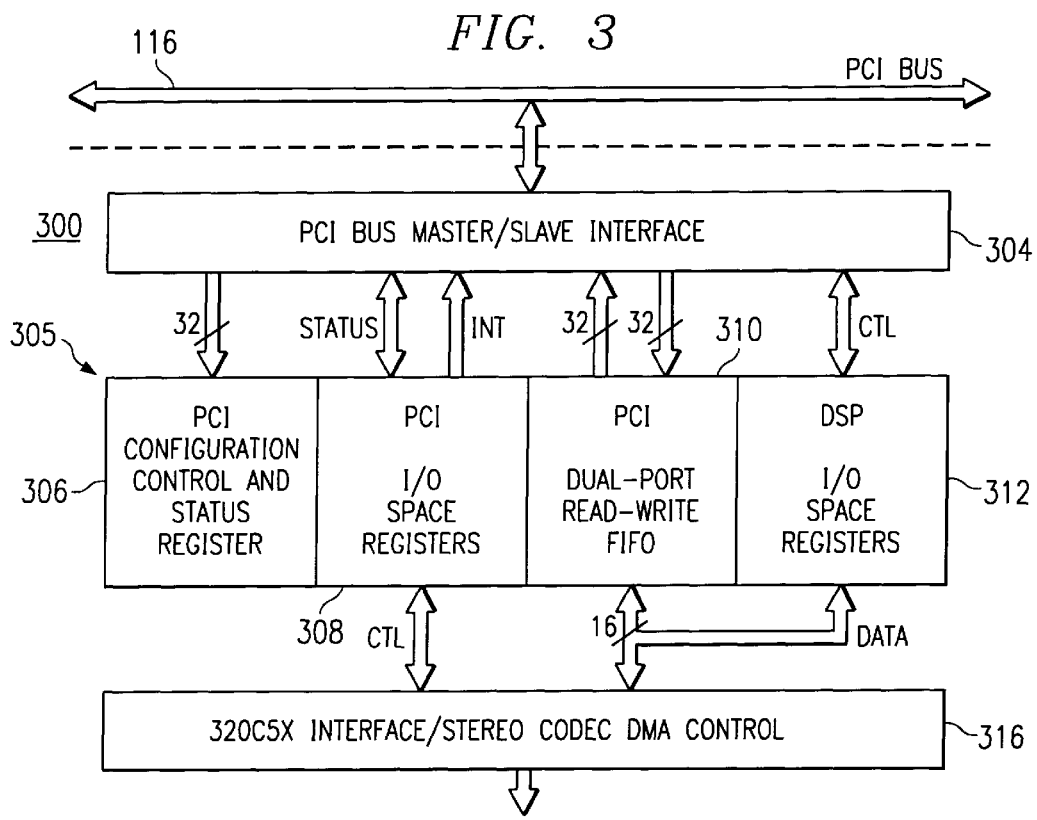
FIG. 3 is a more detailed electrical diagram (partially schematic, partially block) of a preferred embodiment of a portion of the improved computer system of FIG. 1.

FIG. 3 is a more detailed electrical diagram (partially schematic, partially block) of one preferred embodiment of a portion of the improved computer system of FIG. 1. FIG. 3 depicts schematically the functions needed to implement the hardware interface circuitry 210 and interface circuitry 214 of FIG. 2. More particularly, it may be seen that a PCI Master/Slave interface circuit 304 is connected to the PCI bus 116. The PCI Master/Slave interface circuit 304 contains the circuitry for the master and slave operations and is connected to a hardware layer 305 that contains PCI configuration control and status register circuitry 306, PCI I/O space register circuitry 308, dual-port read-write FIFO circuitry 310, and DSP I/O space register circuitry 312. The hardware layer 305 is in turn connected to an interface/codec DMA control circuit 316 which is in turn connected to a DSP (not depicted in FIG. 3).

Figure 4:
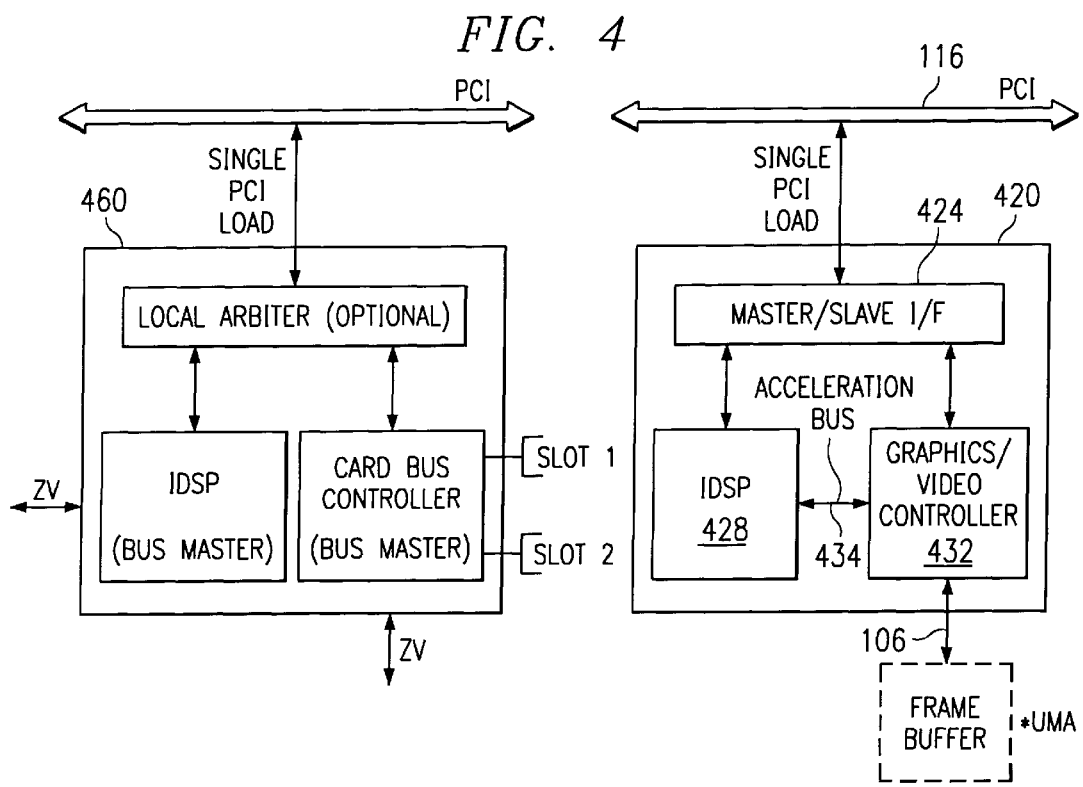
FIGS. 4, 4a are a more detailed electrical diagram (partially schematic, partially block) of a preferred embodiment of a portion of the improved computer system of FIG. 1.

Referring now to FIG. 4 there may be seen a more detailed electrical diagram (partially schematic, partially block) of preferred embodiments of a portion of the improved computer system of FIG. 1. In FIG. 4, a PCI bus 116 is connected to a single chip 420 on the motherboard, or on an add-in-card, via a data gateway to a master/slave interface 424. FIG. 4 also depicts a second chip 460 that is connected to a PCI bus 116. These two chips 420, 460 depict two different ways to partition various functionality according to the teachings of the present invention.

Chip 420 has an on-chip acceleration bus 434 and is preferably for a desk top PC. General Purpose buses GPI401 and GPI402 may also be provided (not depicted in FIG. 4) for either chip 420 or 460. In chip 420, IDSP logic block 428 contains at least all the logic of block 200 of FIG. 2. Similarly, the IDSP block of chip 460 contains at least all the logic of block 200 of FIG. 2. Chip 460 includes two Zoom Video (ZV) buses and is preferably used in a portable PC. Graphics/Video controller 432 includes 2D and 3D graphics capabilities as well as video capture/compression/decompression capabilities. Block 432 needs to be a bus master but traditionally it has always been a slave. A proposed new unified memory architecture (UMA) makes a bus master advantageous.

Memory must change because typical or conventional memory cycle times are too long. Memory cannot be a commodity in functionality, so memory needs additional functionality and has to be interfaced to new blocks. The present invention takes advantage of this additional functionality memory.

Figure 4A:
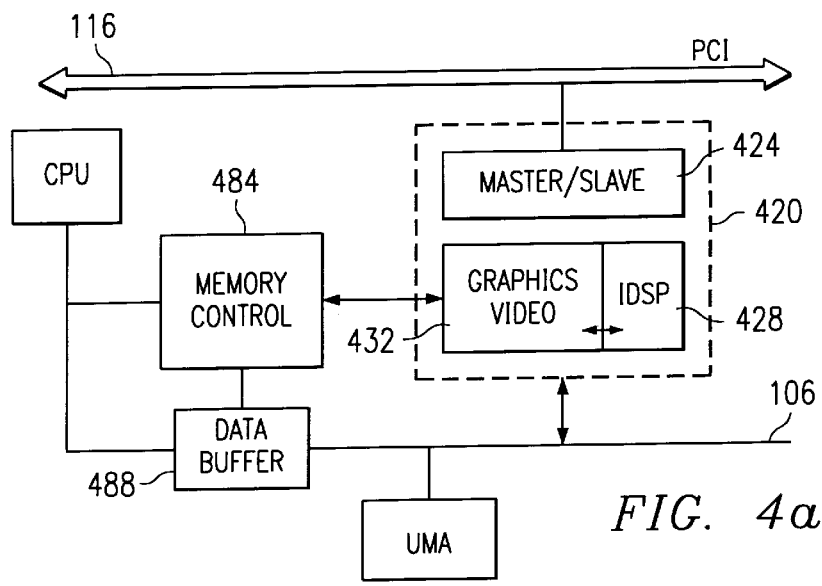

In FIG. 4A, a PCI bus 116 is connected to DSP/video chip 420 of FIG. 4 to form a PC system. Chip 420 is connected to a memory controller 484 which has another coupling to CPU 102. The memory controller 484 and CPU 102 are further coupled to and control a data buffer 488 which accesses UMA memory on local bus 106. By using the data buffer 488, the CPU also must now request a memory access rather than controlling memory accesses. Advantageously, the functions of video/graphics block 432 are consolidated into the PC system. The video/graphics function lies in an advantageous space because the chip 420 is likely to be pad-bound (i.e. has many pins and circuit does not occupy all the silicon required to accommodated all the pads required). All the various applications noted earlier herein may be brought in via the IDSP acceleration bus.

UMA block 492 includes EDO (Extended Data Output DRAM) memory for low-end market. EDO has an unchanged pincount and supports a 486 level CPU and the data output is kept active longer to avoid precharge. Another suitable UMA is high-speed EDO with burst capability to fill cache lines. A higher-level UMA is multi-bank burst EDO. The skilled worker selects the memory type according to performance and marketing price-point considerations desired for a particular application system.

Out of the UMA block 492 one embodiment has up to one gigabyte/second (1 Gbyte/s) bandwidth for uncompressed output on bus 106. This may be accomplished either by a wide bus or a very high speed bus such as RAMbus bus operating at 500 MHz or higher. In FIG. 4A, controller 432 accesses the UMA 492 and sends the uncompressed video to a display (not depicted in FIG. 4A). High bandwidth memory and access to memory through PCI bus 116 support the high bandwidth and low latency (e.g. 2 microseconds) of the system.

The acceleration bus 434 of FIG. 4 is connected to the DSP 428 to allow access externally or internally to allow for acceleration of controller 432. In a similar manner, FIG. 4A may contain an acceleration bus that internal or external.

Figure 5:
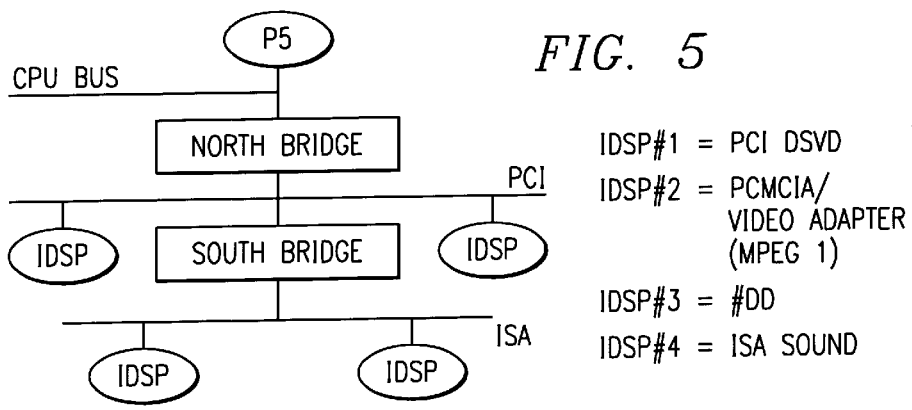
FIG. 5 is a block diagram of an embodiment of an improved computer system of the present invention for asymmetrical multiprocessing.

Referring now to FIG. 5 there may be seen a block diagram of one embodiment of an improved computer system of the present invention for asymmetrical multiprocessing that is host independent. In FIG. 5, a P5 processor is the CPU. In FIG. 5, any CPU/IDSP intelligence in the PC can be lumped together via the virtualization techniques of the present invention as much as needed to support an application and then be disbanded after the application is shutdown. The user only needs a given amount of required computing resources for a given application at any one time.

Multiple IDSPs 200 are shown in FIG. 5 to satisfy the needs of any particular application. The chips may be designed differently to appropriately interface to the ISA bus and PCI bus. Examples are depicted in FIG. 5. Although the IDSP blocks are shown as attached to the buses, they may also be attached to either the north or south bridge and integrated into that block's functionality.

Figure 6:
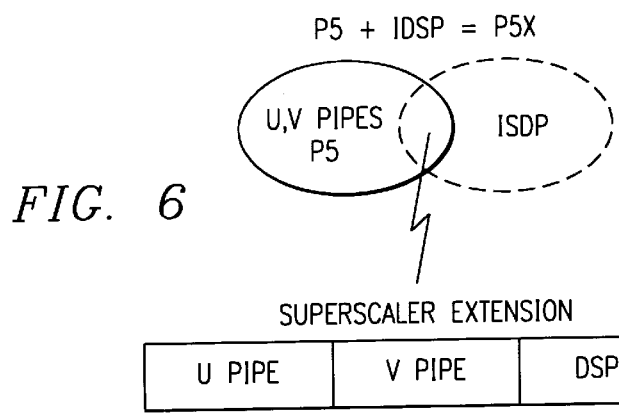
FIG. 6 is a schematic block diagram of an embodiment of a CPU model using a superscalar extension for the improved computer system of the present invention.

Referring now to FIG. 6 there may be seen a schematic block diagram of an embodiment of a CPU model using a superscalar extension for the improved computer system of the present invention. In FIG. 6 a new chip has three pipelines, including two conventional superscalar pipelines and a third, DSP operation, pipeline. That is, a superscalar CISC/RISC and DSP CPU architecture has three operations dispatched on a single chip. In a CISC there is a microcode store. The DSP core is a DSP hardware microstore which dispatches DSP operations. The DSP core may be "empty" until a user clicks on a Windows icon then the DSP code is cached from the hard disc to main memory to the local DSP memory for execution. In this manner, the x86 CPU does not need to go nonstandard and dispatch DSP operations. Such combination architectures are compatible with Windows 95.

Figure 6A:
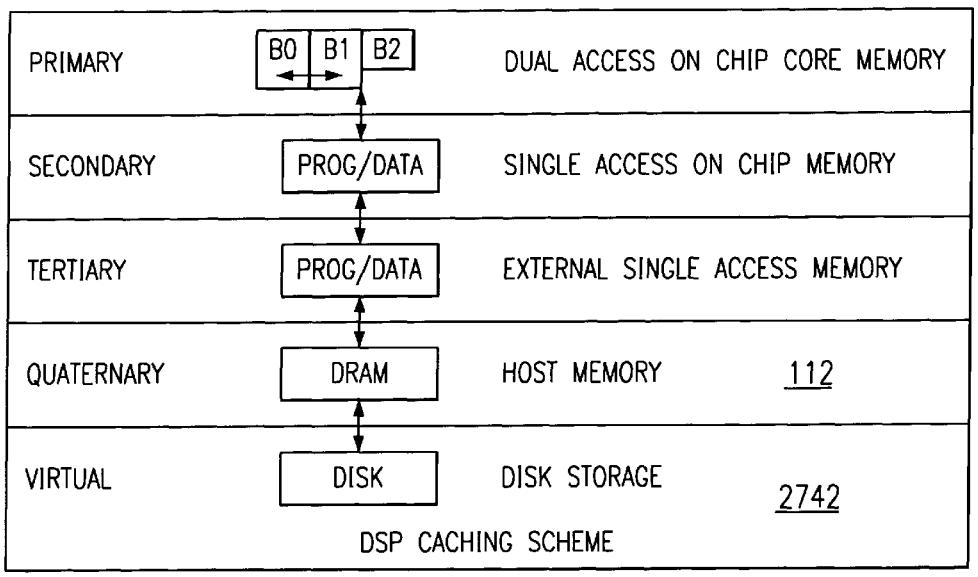
FIG. 6a shows a memory hierarchy for the improved computer system of the present invention depicted in FIG. 6.

FIG. 6a depicts one such memory cache hierarchy. Disk storage 2742 is at one pole of the spectrum defined by FIG. 6a. Next is host memory 112. External single access memory is any other memory on ISA bus, PCI bus, or memory 214 in chip 200 or anywhere else in the PC system at a tertiary level of FIG. 6a. At a secondary level, single access on-chip memory such as in a configurable DSP core add-on memory is provided. And at the primary level, the dual access on-chip DSP core memory with the B0, B1, B2 memories of the Texas Instruments TMS320C5x core is provided as an exemplary but not exclusive case.

This is a software cache within block 210 doing the cacheing and the CPU and OS doing the cacheing. Thus, the DSP sets up the cacheing cycle in software and control passes up the hierarchy.

As an example, one V.34 modem conventionally uses 64K of code and data space since modem rate negotiation requires it to be able to talk to any other modem. In a 75 millisecond period the modem knows what the other modem it is talking to is and then switches in only the fragment of code to sustain the specific application that corresponds to the modem mode that is called for as a result of the negotiation. In this way less code and data are needed compared to the prior art.

Having a 132 Megabyte/s transfer rate allows many applications to easily move code needed from memory to the DSP local memory where it is executed.

Figure 7:
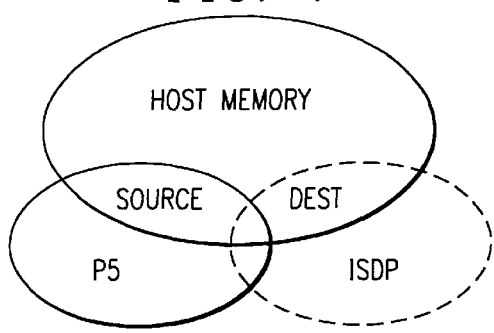
FIG. 7 is a schematic diagram of an embodiment of a shared memory model for the improved computer system of the present invention.

FIG. 7 shows how to use a shared memory model to couple the DSP and CPU. The shared memory model, which is based on Windows' architecture, tightly couples the DSP and CPU asymmetrically on top of any symmetrical software architecture beneath.

In FIG. 7 Windows has an architecture that calls for handles like a file drawer that tell where in virtual memory the software starts and ends. They provide a mechanism to locate memory resources in virtual memory space. They allow the DSP to do what the host CPU does. The host says the application needs to manipulate some memory contents and where the source handle is and where the destination handle is. Windows being content based sends information to a location defined by a destination handle. Knowing 1) where the source handle is, and 2 where the destination handle is, the DSP can go in and handle the transfer in lieu of the CPU. Depending on the application, the virtual memory manager of the OS which tells the CPU where the physical address is. Also, the CPU has on-chip hardware to help determine the physical address. The DSP interrogates the virtual memory manager of the OS as a superbus master (e.g., it can cross page boundaries unlike a mere bus master). While the DSP runs the application it locks the handles down to make them real physical addresses, unlike the CPU which handles them as virtual addresses. The DSP lock is a utility written in the host DSP driver in the HAL layer, and activates a utility already present in the OS virtual memory manager to return the physical address.

Figure 8:
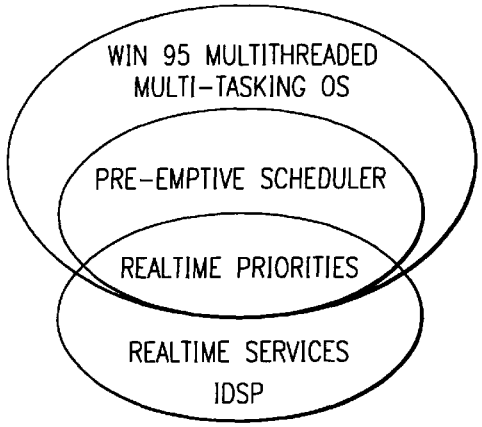
FIG. 8 is a schematic diagram of an embodiment of a multimedia extension model for the improved computer system of the present invention.
Figure 33:
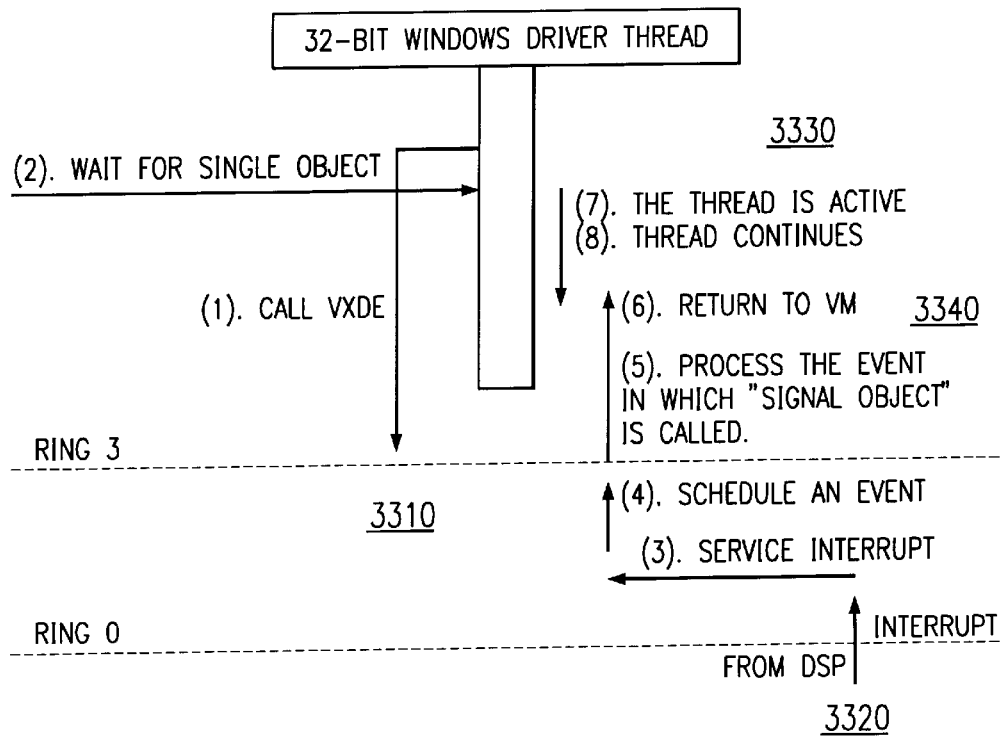
FIG. 33 is a schematic block diagram illustrating various actions in the virtual memory model of FIG. 31 or 32 for the improved computer system of the present invention.
Figure 34:
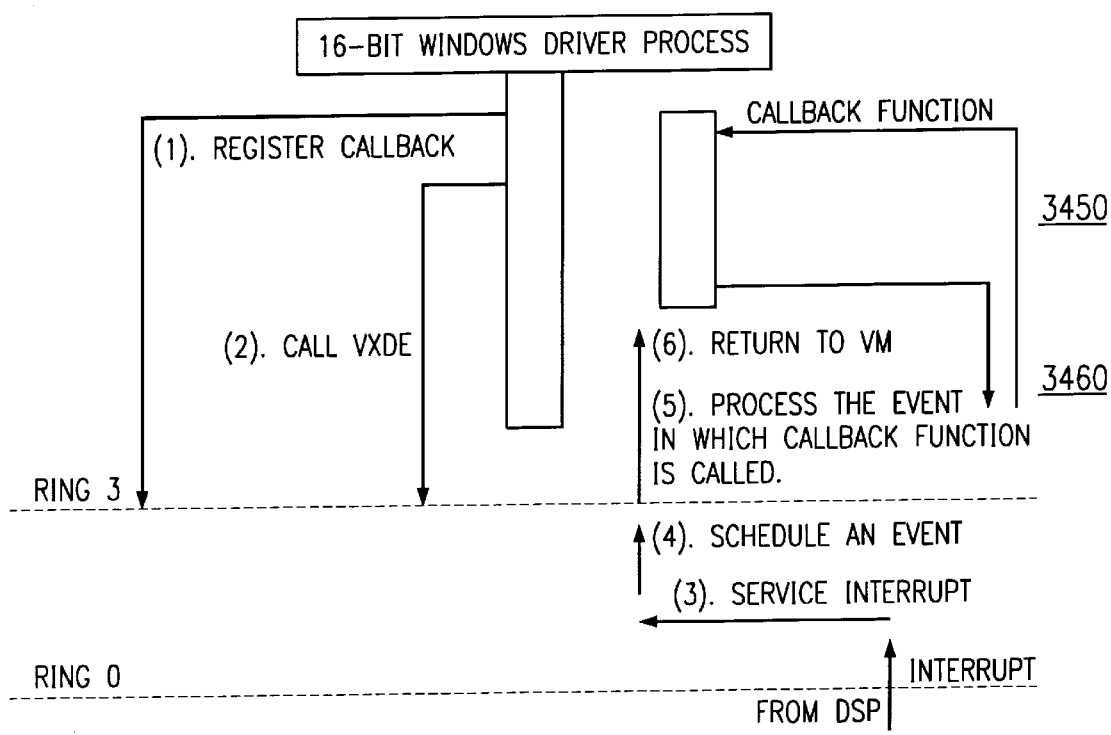
FIG. 34 is a schematic block diagram illustrating various actions in the virtual memory model of FIG. 31 or 32 for the improved computer system of the present invention.
Figure 36:
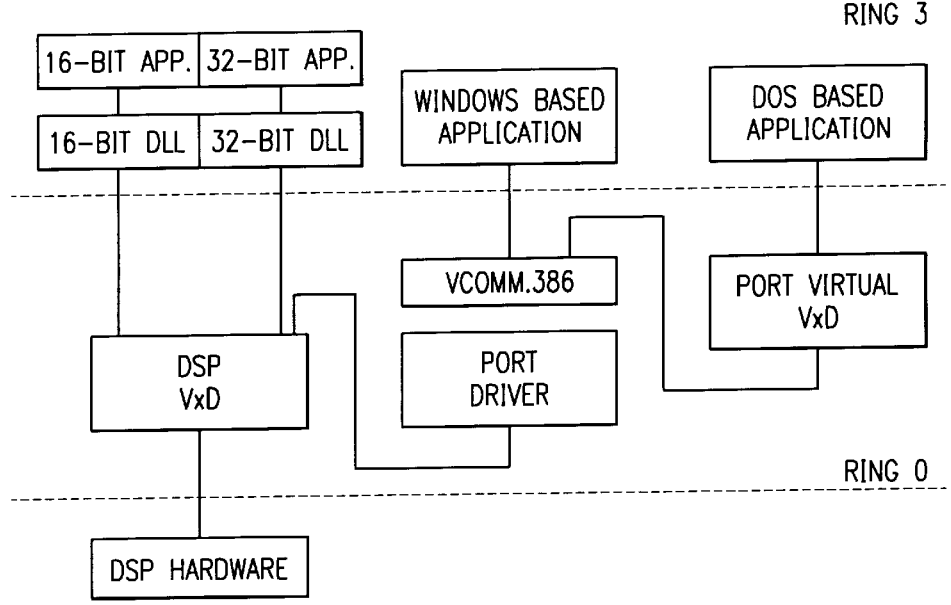
FIG. 36 is a schematic block diagram of another embodiment of a virtual memory model for the improved computer system of the present invention.

FIG. 8 is a schematic diagram of an embodiment of a multimedia extension model for the improved computer system of the present invention. More particularly, it may be seen that realtime services provided by the IDSP of the present invention may also provide realtime priorities to the pre-emptive scheduler portion of a Windows OS that is both multithreaded and multitasking. FIGS. 33 and 34 are discussed later herein and provide more details of how interrupts may be handled to provide realtime priorities. FIG. 36 provides details of some realtime services.

Figure 9:
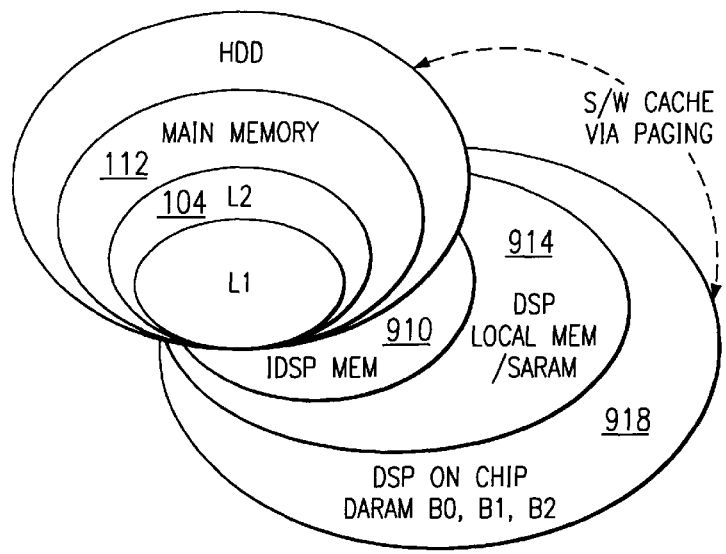
FIG. 9 is a schematic diagram of an embodiment of a system/cache/virtual memory model for the improved computer system of the present invention.

FIG. 9 is a schematic diagram of an embodiment of a system/cache/virtual memory model for the improved computer system of the present invention. The DSP core is a cache which moves data and instructions back and forth very efficiently. The CPU is moving data from hard disk to this cache. A new cacheing scheme for the improved PC of the present invention is described.

In FIG. 9 during runtime, code is fetched from HDD to main memory 112. During runtime fragments of code are fetched from main memory 112 into block 214 of FIG. 2. Block 210 moves code, independent of the DSP and the CPU, further into DSP memory 918 and C5x memory of FIG. 9; the cacheing scheme is illustrated in FIG. 6A. In FIG. 2 block 210 does part of the cacheing scheme. In FIG. 9, fragments of code corresponding to the dead time of the CPU are paged throughout virtual space in the CPU which is now extended to include the memory on the DSP side in block 300. In this manner the virtual memory is translated to physical memory using the OS. In FIG. 9, DARAM is dual access static RAM and SARAM is single access static RAM.

Figure 10:
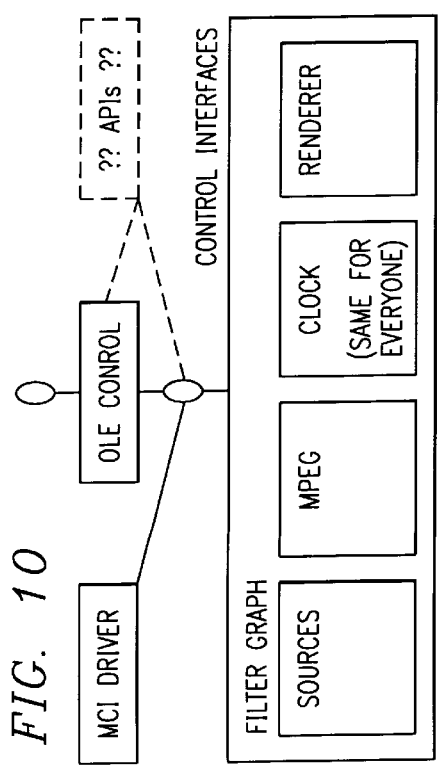
FIG. 10 is a schematic block diagram of an embodiment of an MPEG playback filter graph model for the improved computer system of the present invention.

FIG. 10 is a schematic block diagram of an embodiment of an MPEG playback filter graph model that may be employed in the improved computer system of the present invention. In FIG. 10, Windows dynamically allocates memory and runs object linking embedding (OLE) when a user clicks on a software object. MPEG works object by object instead of layer by layer. Sources may include image capture data to decompress.

Figure 11:
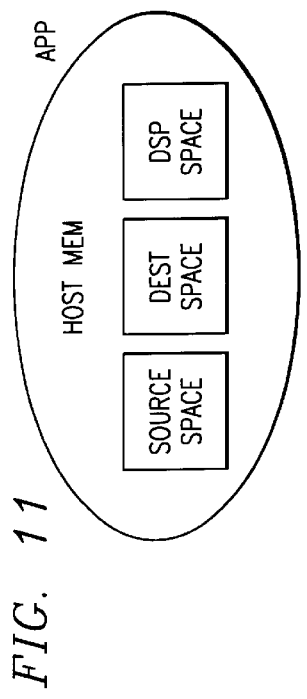
FIG. 11 is a schematic diagram of an embodiment of a virtual I/O hardware-PCIDMA and multimedia realtime interrupt handler model for the improved computer system of the present invention.

FIG. 11 is a schematic diagram of an embodiment of a virtual I/O hardware-PCIDMA and multimedia realtime interrupt handler model for the improved computer system of the present invention. In FIG. 11, the system intercepts real time interrupts. DSP space is the external SRAM which now resides for practical purposes in the host memory 112. Thus source space, destination space and DSP space all are comprehended in the same space. This dynamically obtains resources that otherwise cannot be allocated from a Windows system. Legacy code advantageously runs under Windows compatibly on system 100. The application (APP) uses portions of main memory that a PCI bus master scatter gather DMA controller may effectively collapse to the blocks shown.

Figure 12:
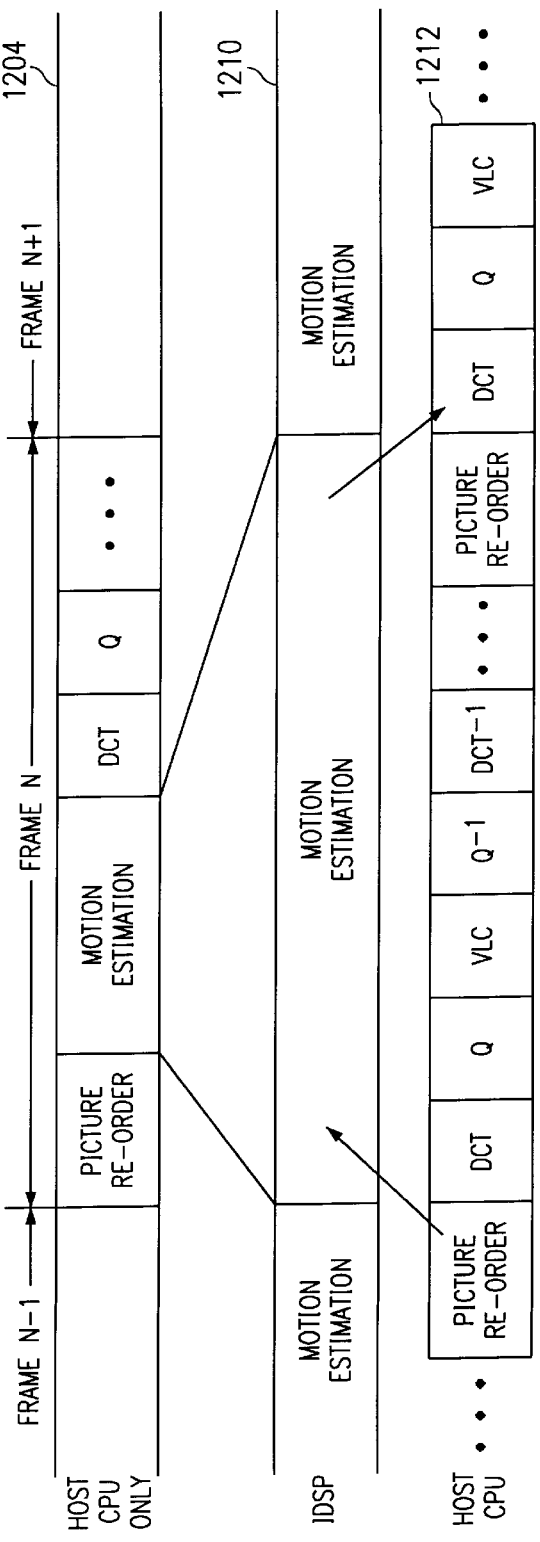
FIG. 12 is a schematic block diagram of parallel processing in a frame for the improved computer system of the present invention.

FIG. 12 is a schematic block diagram of parallel processing by a CPU and IDSP in a frame for the improved computer system of the present invention. In FIG. 12, given a frame the host CPU must execute all the processing and monopolizes numerous time slots in time band 1204. Advantageously, the DSP and CPU combination provides two time bands 1210 and 1212 wherein the DSP processes the frame in band 1210 and the DCT becomes two short time slots in CPU band 1212.

Thus a relatively moderate performance DSP has plenty of resource to do major image processing because it is dedicated for that signal processing task. LAN, modem and other applications are time-shared with the image processing but in other time periods irrelevant to the point of the analysis of FIG. 12.

Figure 13:
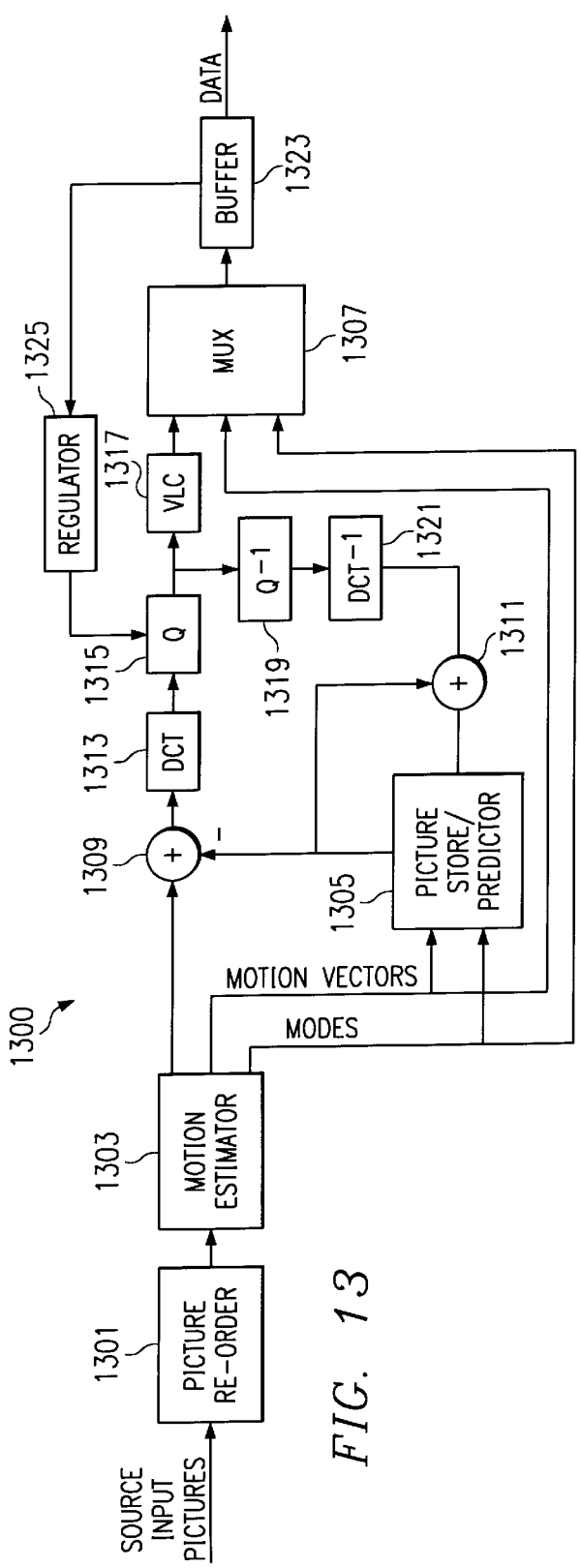
FIG. 13 is a simplified block diagram of an MPEG encoder for the improved computer system of the present invention.

FIG. 13 depicts a simplified block diagram of an MPEG encoder 1300 that the improved computer system of the present invention may employ. More particularly, it may be seen that incoming video pictures may be re-ordered in block 1301 and then provided to a motion estimator block 1303 to determine what areas of a picture have changed. Outputs from the motion estimator block 1303 are provided to a picture/store predictor block 1305, an output mux 1307 and an adder 1309. Outputs from the picture/store predictor block 1305 are provided to an adder 1311 and adder 1309. Adder 1309 provides an input to discrete cosine transform (DCT) block 1313 that outputs to a quantizer (Q) block 1315. Quantizer block 1315 provides outputs to variable length encoder (VLC) block 1317 and inverse quantizer (Q-1) 1319. Inverse quantizer 1319 provides an output to inverse DCT block 1321 which provides an output to adder 1311. Variable length encoder (VLC) block 1317 provides an output to mux 1307 which provides an output to output buffer 1323 which provides the output encoded video data. Such an encoder may be implemented in hardware or in software.

Figure 14:
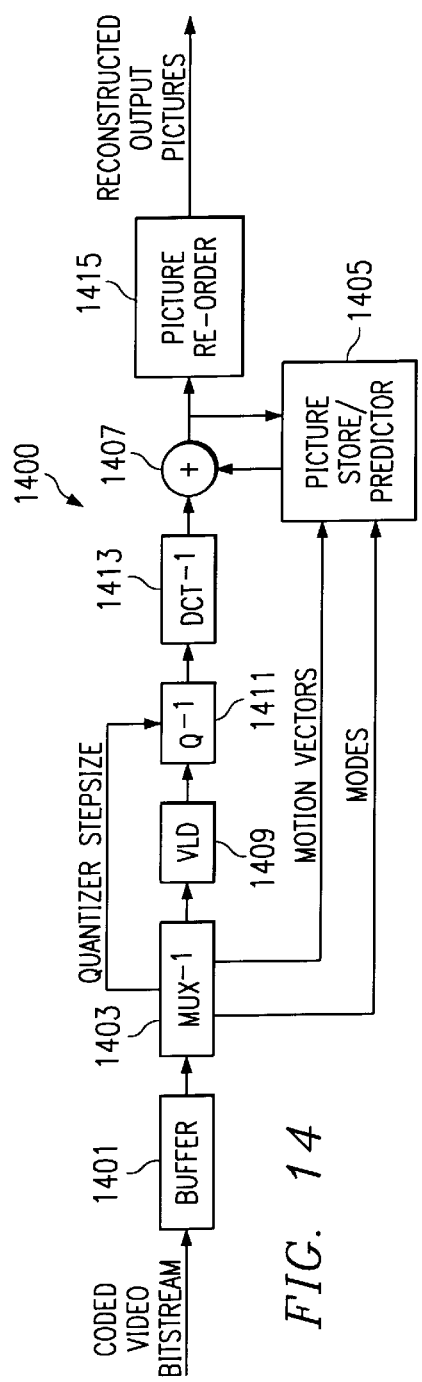
FIG. 14 is a simplified block diagram of an MPEG decoder for the improved computer system of the present invention.

FIG. 14 depicts a simplified block diagram of an MPEG decoder 1400 that the improved computer system of the present invention may employ. Incoming coded video is stored in input buffer 1401 which outputs to an inverse mux (MUX-1) 1403 that outputs to a picture store/predictor block 1405 and a variable length decoder (VLD) 1409. The picture store/predictor block 1405 outputs to adder 1407. The variable length decoder (VLD) 1409 outputs to an inverse quantizer (Q-1) 1411 with quantizer steps supplied from the inverse mux Mux$^1$ 1403. The inverse quantizer (Q-1) 1411 outputs to an inverse DCT (DCT-1) block 1413 which outputs to adder 1407. Adder 1407 outputs to picture store/predictor block 1405 and picture re-order block 1415 which outputs the decoded video pictures.

FIG. 15 is a schematic block diagram of an embodiment of a video solution for a notebook computer of the present invention that employs a P5 processor as she CPU. In FIG. 15, the system works with a PCMCIA standard, revision 2.1, in the manner illustrated by FIG. 4.

Zoom video accommodates a video input source that overlies into the frame buffer without need of an extra frame buffer. The PCI is not isochronous, it is bursted and interrupted and so it is not very advantageous for video. However, in accordance with the present invention an isochronous capability is provided by a dedicated backdoor private high speed bus ZV connected to the frame buffer. Linking the blocks together in chip 420 or 460 of FIG. 4 is the acceleration bus.

FIG. 16 is a schematic block diagram of an embodiment of a video solution for a desktop computer of the present invention that employs a P5 processor as the CPU. FIG. 16 illustrates a desktop PC embodiment without PCMCIA or Cardbus. Thus, in playing back MPEG video the CPU may perform the video decode function while the DSP performs the audio decode function, or vice versa. System synchronization is performed by the CPU if data comes from CD ROM. If it comes from an external 1394 camera or other external image capturing system, the DSP does system synchronization because the data comes to the DSP first. In this way the system and method advantageously solves the problem of which processor should do system synchronization.

FIG. 17 is a schematic diagram of an application pipeline for DSP algorithms for the improved computer system of the present invention. In FIG. 17, a single processor even a superscalar processor cannot pipeline at the application level. This is distinguished from the hardware pipeline of a pipelined processor. What is meant is executing different parts of the application at the same time to pipeline the application.

A stage is established by the nature of the application. For example, frame N of video is decompressed by the DSP while an x86 CPU outputs processor data to screen for the frame N−1 simultaneously and then the cycle repeats in a manner related to the depth of the pipeline. The DSP may also perform filtering, scaling and color space conversion, while the CPU inputs data or outputs data.

Figure 18:
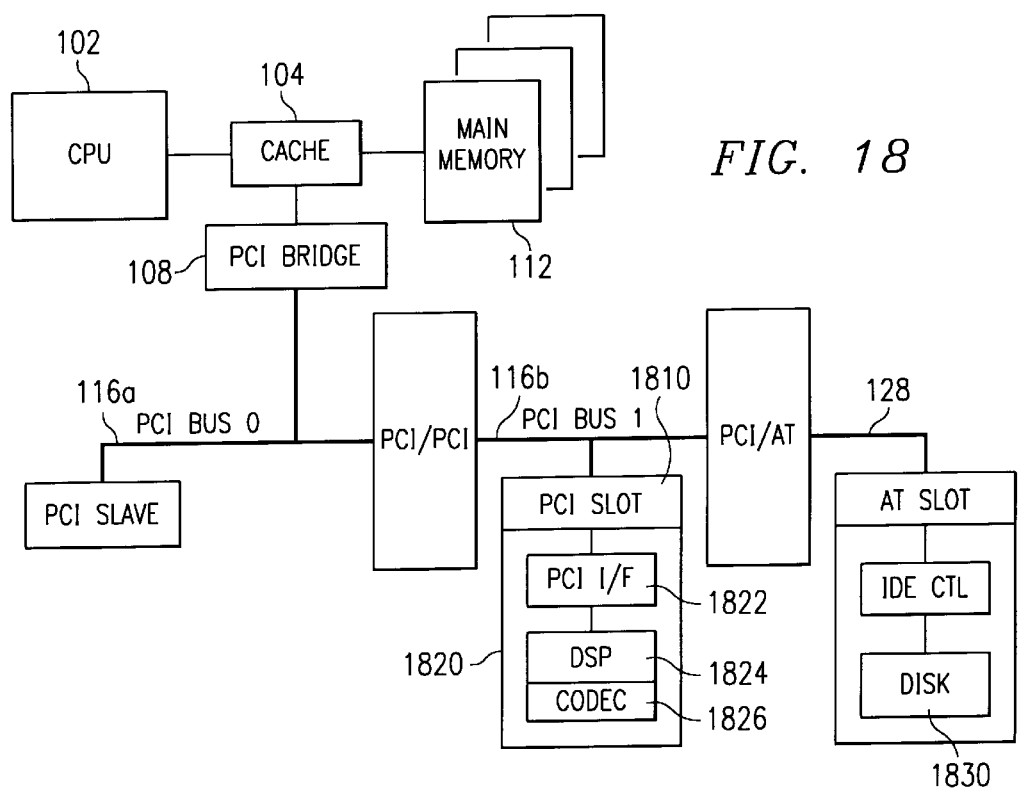
FIG. 18 is an electrical block diagram of another embodiment of an improved computer system according to the present invention.

FIG. 18 is an system level view of another embodiment a hardware architecture for an improved computer system according to the present invention. FIG. 18 depicts a alternative arrangement of the simplified block diagram of FIG. 1. FIG. 18 depicts a PC that uses the PCI bus and has a slot 1810 for a plug-in PCI card 1820. The plug-in PCI card 1820 contains the PCI Interface (I/F) 1822 and DSP 1824 and associated codec 1826, such as depicted in FIGS. 3 or 4. Everything else is standard PC hardware. A hard disk drive 1830 is part of the standard PC hardware. The codec 1826 handles audio functions.

The PCI card 1820 will be both a PCI master and a PCI slave. The host CPU will be able to access PCI configuration registers and main memory pointer registers in the slave mode. In the master mode, the DSP will be able to fetch program code and fetch and store data in host main memory using scatter-gather DMA.

Figure 20:
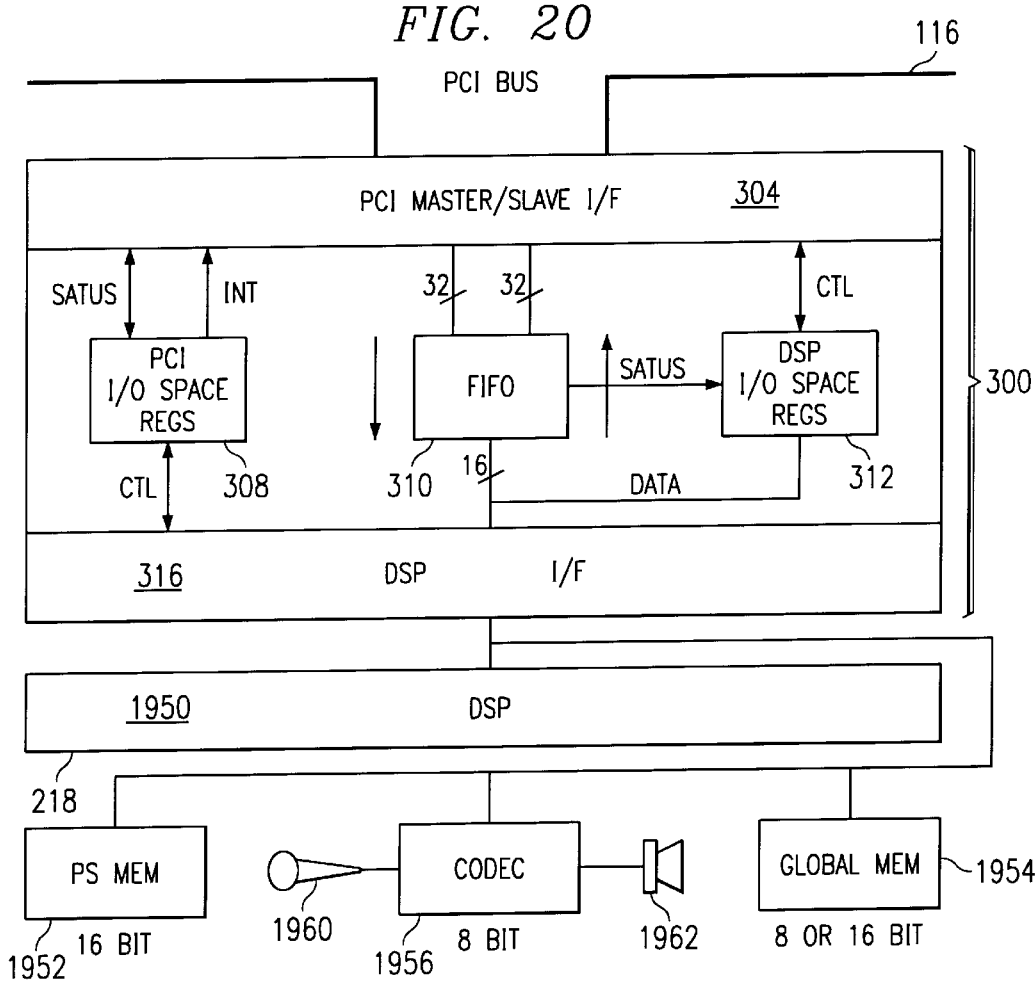
FIG. 20 is a more detailed electrical diagram (partially schematic, partially block) of a preferred embodiment of a portion of the improved computer system of FIG. 1.

FIG. 20 is a more detailed electrical diagram (partially schematic, partially block) of a presently preferred demonstration embodiment of a portion of the improved computer system of FIG. 1. FIG. 20 is similar to FIG. 3, but in addition details the DSP 1950 and associated memories 1952, 1954. In addition codec chip 1956 is depicted as well as its connections to the chip 300 (depicted in FIG. 3), speaker 1962 and microphone 1960. FIGS. 39A through 39G provide the details of one arrangement for this embodiment.

The DSP 1950 runs independently of the CPU. The CPU downloads the initialization code to the DSP after reset when the PCI card will be a slave, then the DSP is on its own. The CPU will be able to start the DSP by setting a START bit in a PCI I/O space register 308. The start bit will be an interrupt to the DSP that causes it to start executing code. The DSP will carry on independently as a PC master until it has finished executing the code. When the DSP algorithm has finished, a DONE bit may be set in the PCI Status Word 308 and an interrupt to the CPU may be generated over the PCI bus.

The CPU provides pointer addresses to main memory. The three addresses needed are the base address for the DSP's 128K bytes of program space, the 128K bytes of read data space (source), and the 128K bytes of write data space (destination). Depending on the application, these may point to different areas of memory, or point to the same area of memory. The CPU will control the DSP by writing to a register 308 that has the START bit for the DSP. The DSP will use this bit as an interrupt. The interrupt may start the algorithm loaded into the DSP or indicate that the host has sent a command to the DSP.

Another bit in the register 308 is a DSP reset bit. That bit goes to the reset pin of the DSP. It can be used to abort the current DSP task and restart the DSP with a bootload sequence. To load a new task into the DSP, the DSP can either be reset (which takes additional time to bootload) or a 14ASTER ABORT bit can be set in the host controlled register 308. When the MASTER ABORT bit is set, an interrupt will be generated to the DSP that may cause the originally loaded boot code to execute. This bootcode will load the DSP task from host main memory that is currently being pointed to by the PCI I/O space host memory program space pointer. The DSP indicates that it is finished by setting an EVENT bit in the PCI I/O space CMD/STATUS register 308 and generating a PCI interrupt (a bit will also be set indicating that the DSP is working before it completes).

The PCI application card DSP architecture is initially memoryless. This is to appeal to systems manufacturers who need to keep costs as low as possible. However, the architecture does not preclude the addition of external Program space memory or external Data space memory, as depicted by memories 1952, 1954. If the DSP application software can afford the time and overhead to do successive 8 bit accesses, one 8 bit Reside external RAM may be used in place of a 16 bit RAM chip memory system to implement Data memory. To achieve a memoryless system, the internal memory of the DSP will be split between Program and Data space. If the program is too large to fit in internal memory, code must be fetched from main memory over the PCI bus as it is needed. Raw data will be fetched from main memory and the data resulting from the DSP operation will be returned to main memory.

With no external memory, the only way to get executable code into the DSP is to reset it and use the ROM based bootloader to load a small initialization program from main memory. The bootloader version of the DSP ("BDSP") will be used in the following discussion. This DSP will read global memory address FFFF at reset to determine what type of bootloading will occur. The value of 1100 in the 4 least significant bits will indicate a 16 bit parallel I/O load, using the XF and BIO signals for handshaking. When BIO is low, the data bus will be driven. After the bootload is complete, the BIO must be left high to prevent bus collisions on the DSP data bus.

By loading 16 bit words via the I/O boot mode, the basic main memory initialization program can be quickly loaded into DSP memory by the CPU. The DSP will be in the reset state so it will only be able to respond as a slave to PCI bus transactions. The PCI host will control the initialization program values that are loaded into the DSP. This allows the initialization program to be modified by software. After this routine is loaded, the DSP will be taken out of reset so it can execute the initialization program (the BIO select bit must also be set to allow the BIO signal of the DSP to be driven by the FIFO status signals). The initialization program will act as a PCI bus master and go into main memory to fetch the actual DSP application software. By bootloading only the initialization, the DSP PCI bus master can control the loading of the actual DSP application code.

If the DSP application software cannot fit entirely inside the DSP internal memory, it will need to swap in more code. This code will be fetched from main memory. To fetch more code the DSP application may perform a BLDP instruction (Block Toad Program to Data) which will take Global space data and move it to Program space. If the Global Data space is specified to be external memory and Program space is specified to be internal memory, the BDSP will make the necessary external accesses to move the code. Since the DSP will be making a Global Data space fetch to the external world, the application software needs a mechanism to tell the PCI interface that DSP code is being fetched over the bus, not data. I/O port register bits will be used to indicate whether program space code, source data, destination data, or DSP determined data is being fetched. The I/O port register bits will be set to access the program space at reset.

The original bootloaded code used to bring in the application code should preferably be maintained in memory. This will allow the CPU to abort a DSP operation by forcing an interrupt to reload the application. If this code is lost, the CPU will not have control over the DSP and will have to reset the DSP in order to reload program code. The DSP application software can transfer data from external to internal memory and back by using the BLDD command (Block Load Data to Data).

The PCI interface 304 is both a PCI Master and a PCI Slave. The interface will need to be a slave so the CPU can access configuration space. The CPU will also be able to access either Memory or I/O space to exercise some control over the DSP and setup main memory pointers. The DSP will be a PCI master to make accesses to main memory for code and data. Also included in the PCI interface is a FIFO 310. The FIFO preferably holds 64 bytes of data. Since the BDSP has a 16 bit external data bus, the FIFO between the PCI bus and the BDSP bus must convert DSP program and data from 32 bits to 16 bits. By packing each main memory location with two DSP instruction or data words, the number of PCI bus transactions required for any given application is reduced by a factor of two.

The configuration registers that are required by the PCI standard are used to designate areas in PCI I/O and Memory address space through base addresses 0 and 1. The only PCI space required is 5 doublewords. Since address spaces are requested in powers of 2, 8 addresses must be reserved. The registers above the 5 that are needed will not be used and will return 0s if read. The 5 doublewords will be used for program and data space pointers, a DSP command and DSP status word, and an I/O port for bootloading the BDSP.

The PCI host will write to the PCI I/O Space registers 308. The DSP will be controlled by them. Base address 0 and 1 in the Configuration registers point to an area of PCI space that this chip will respond to. Both Base addresses will point to the same space but Base address 0 will be configured as I/O space. Base address 1 will be configured as Memory space. This allows additional flexibility to system designers to either design a memory based system or an I/O based system. Twenty bytes are needed to communicate with and control the DSP. Thirty-two bytes will be reserved in the PCI configuration registers. Registers 0x14 through 0x1F will be reserved and will only return 0s. The addresses will be Base Address+0x0 to Base Address+13x0. These registers allow the CPU to determine what portion of main memory is to be used for DSP memory as well as start, stop, and monitor the status of the DSP. The lower 12 bits of the Host Memory Program (and Data) Space registers will be reserved. This will allow program and data space to be relocated in 4K boundaries.

When the DSP algorithm has finished, an EVENT INTERRUPT bit in the Status Word will be set. When this bit is set, an interrupt will also be generated to the application software over the PCI bus. Since the interrupts are controlled by the DSP software, an interrupt enable will not be implemented in hardware.

The DSP Hardware Control word will directly control the operation of the DSP hardware. The least significant 4 bits are the Retry Counter bits. The Retry Counter is a PCI macro function that will retry a PCI transaction if it initially fails. This value is reset to 0000 which will cause it to retry forever. The value can be changed to allow between 1 and 15 retries. If the Retry Counter runs out because the transaction cannot be performed, the Retry Counter Expired bit in the MISC CTRL register will be set. This status will be available to the host.

The DSP interface ASIC consists of the PCI interface, PCI FIFO, DSP (Connection Device) interface, and CODEC interface. This approach requires that the BDSP be a discrete chip.

The DSP has 5 user interrupts available. One of the interrupts is non-maskable, and 4 are maskable. The codec interface requires 3 interrupts, and the PCI interface requires 2 interrupts and the RESET pin. The interrupts are used in the following manner: NMI–Master Abort (PCI host to DSP), INT1–CDRQ (from Codec), INT2–PDRQ (from Codec), INT3–IRQ/IRQ2 (from Codec1 and Codec2), and INT4–Command (PCI host to DSP) The Command interrupt is the lowest priority, which is not a problem since there is plenty of housekeeping to be done between coming out of RESET and responding to a DSP algorithm. The Master Abort interrupt will be the highest priority and may be used to cause the DSP to reload its original DSP code. Interrupt 1, 2, and 3 will be generated by the codec. If a second Codec is needed by the user, the IRQ interrupt can be shared. The IRQ and IRQ2 signals will be gated together to provide one interrupt to the DSP. The IRQ, CDRQ, and PDRQ signals are inverted by the ASIC. The IRQ2 signal supplied by the user should be active low.

The DSP will have access to memory mapped I/O ports that will be used to control the PCI macro for mastering operations. These registers cannot be accessed by the PCI host.

The CODEC registers will be used by the DSP to communicate with a discrete CODEC on the PCI application board. The FIFO status will be available to the DSP at an I/O port. Future revisions of this or other ASICs may have different sizes of FIFOs. It would aid the DSP to know what size FIFO it has to work with to tune performance. The FIFO size register will indicate the maximum number of words the FIFO can hold. The number of DSP words to transfer will be written into another I/O port. This value will be doubled in hardware to get the number of bytes that will be transferred. The maximum number of words that can be transferred is 32768 (65536 bytes). This means that the MS Bit of register 0x59 cannot be used. If a 1' is written to that bit it will be ignored.

The PCI address offset (0x58) is the address in DSP space which will be translated into PCI space and used to transfer data from or to the host. The DSP accesses host main memory by writing a DSP pointer to the PCI Addr pointer registers which will take 2 DSP words and make a 32 bit PCI pointer. This is a useful feature if the DSP needs to calculate a location in main memory that has data based on a scatter-gather table. The PCI address space select bits in the PCI Control register determine whether the DSP pointer or a PCI pointer written to PCI I/O space is used when a PCI bus transaction is initiated.

The Codec Status/Mode register (0x5F) will be readable for all 16 bits. Only the lower 8 bits will be writable (the upper 8 bits are read only). BIO Select will allow a flexible choice of FIFO status or user signals to be connected to the DSP BIO input. All of the status signals and therefore BIO will be active high.

The DSP will perform reads and writes to and from the PCI bus through the 64 byte FIFO on the PCI ASIC. The PCI FIFO is arranged as 2 parallel 16 word FIFOs that are synchronous to the PCI clock. The DSP control signals are synchronous to the DSP's CLKOUT1 signal. There are two options provided for clocking the processor. The first option is to divide the PCI clock by two and use the CLKIN2 input of the DSP (which will multiply the CLKIN2 signal by 2) to have the DSP running internally at the PCI clock rate (33 Mhz max). This will result in a situation where the PCICLK is the same frequency as CLKOUT1. The phase of CLKOUT1 however may be shifted up to around 270 degrees. The delay through the clock divide circuitry and the phase shift through the DSP's PLL could cause a total delay of up to 25 ns. The second option is to divide the PCICLK by one and use the divide by one input option of a DSP (the DSP does not support this mode). The end result would be that PCICLK would still be the same frequency as CLKOUT1, but the phase would still be different.

The DSP's RDz (read enable—active low) and WEz (write enable—active low) signals will be used to generate FIFO read and write pulses. Reads by the DSP must be performed with at least 3 software wait states to guarantee that the clock delays are accounted for.

Writes by the DSP must be performed with at least 2 software wait states to guarantee that the clock delays are accounted for.

The DSP manages the data coming from and going to the FIFOs. This data stream cannot be transparent to the DSP without causing FIFO overruns and underruns (the DSP could outrun the PCI bus and overrun the FIFO). In order for the DSP to make the best use of resources, the BIO signal should be used as a flag to tell the DSP when the FIFO has data to read or when the FIFO has been emptied during a write. There are two basic methods for performing reads and writes from the DSP. The first method is to wait until the FIFO is empty (before a read or write), then read or write only the number of words that would fill the FIFO. This will be 32 words in the current hardware configuration. The FIFO will be guaranteed not to overrun or underrun. After the 32 words have been read or written, the DSP can loop on the BIO signal (which will indicate that the FIFO is ready to receive another 32 words) and read or write another 32 words.

The second method will allow blocks of data larger than 32 words to be transferred. This method will use the BIO signal, but the DSP will loop on the BIO before every read or write to the FIFO. A half empty and a half full flag can be used to indicate FIFO status via the BIO for these operations. The DSP will use its IO Space to set bits in a control register to start a PCI transaction. The control register parameters will be PCI address space select bits, a FIFO reset bit, the PCI macro control bits, DSP status bits, the start bit, and BIO selection bits. A status register will also be needed to check the status of the FIFO before a transaction starts. The parameters necessary to start a PCI bus transaction are: DSP address (which will be translated to the PCI main memory address), number of words to transfer (hardware will convert the number of words into a number of bytes), and direction.

Single data phase transfers will occur when only 2 words will be transferred over the PCI bus. The 2 words will only fill one 32 bit transaction. The PCI macro will need to be aware of this special situation in order to correctly handle the PCI protocol. The value written by the DSP [number of words] will be doubled in hardware to get the number of bytes, so the minimum number of bytes is 2. The minimum number of bytes that should actually be transferred though is 4. If less than 4 bytes are transferred the DSP must change the PCI bus byte enable bits or 2 of the 4 bytes of the PCI data phase will not be valid. The direction bit will be important because that will be a determining factor in the source of the input to the FIFO. The direction bit will be set automatically when the DSP writes to the FIFO (this prevents having to set the bit, write the FIFO, then start the transaction). On a read from the PCI bus, the direction bit will be set by the write to the register to start the transaction. The BIO signal will be selected by the value of the BIO Select register. This value may have to be changed every time there is a change between a read and a write operation.

After these parameters are written to the interface ASIC, the PCI transfer will be initiated when the Start bit is written by the DSP. Two examples of DSP sequences follow:

DSP Read Sequence
1. Write address of data to transfer from.
2. Write number of words to transfer(>=2).
3. Write Done bit(clear it), Working bit(set it), direction of transfer(0=read), BIO select, and the start bit.
Once the Start bit is set, the hardware will:
3.1. Wait for the PCI bus to become free (P2CDGNTCUPL to go inactive).
3.2. Write to a register to set the CD2PREQCUPL and CD2PGNTCUPL signals.
3.3. Wait for the P2CDGNTCUPL to go active.
3.4. Write to a register to set the CD2PMSTCUPL signal (to prevent other transactions).
3.5. Strobe the new address, number of bytes, direction, and multiphase status to the macro.
3.6. Start filling up the FIFO.
4. Wait for the macro to indicate that the FIFO is not empty. (Bring this status into the DSP as BIO).
5. Read from FIFO. The reads can be done from the FIFO with 2 cycle/1 wait-state instructions. The wait-states will be software wait states. The FIFO read pulses will be generated by the DSP read signals. If the FIFO does not have data, BIO will not be set and an operation will be held off (may have to use an internal time-out on this). By using the BIO signal, the DSP Rill wait for data. Loop back to #3 and repeat until finished. The DONE bit can optionally be set when complete to generate a PCI interrupt.

If the PCI bus slave can run without wait states during the last 2 data phases, the PCI macro will fill up the FIFO. If there are any wait states in the last data phases, the FIFO will not have the last word written in. The FIFO will have FIFO Full-1 doublewords in it.

DSP Write Sequence
1. Wait for the macro to indicate that the FIFO is empty. (Bring this status into the DSP as BIO).
2. Write to the FIFO. The writes can be done to the FIFO with 3 cycle/1 wait-state instructions. The wait-states will be software wait states. The FIFO write pulses will be generated by the DSP write signals. Loop back to #12 and repeat until finished.
3. Write address of data to transfer to.
4. Write number of words to transfer(32 in this case).
5. Write Done bit(reset it), Working bit(set it), BIO select, and the start bit.

Once the Start bit is set, the hardware will:

5.1. Wait for the PCI bus to become free (P2CDGNTCUPL to go inactive).

5.2. Write to a register to set the CD2PREQCUPL and CD2PGNTCUPL signals.

5.3. Wait for the P2CDGNTCUPL to go active.

5.4. Write to a register to set the CD2PMSTCUPL signal (to prevent other transactions).

5.5. Strobe the new address, number of bytes, direction, and multiphase status to the macro.

5.6. Alert the DSP that the FIFO is empty (Use the BIO signal).

When the DSP makes accesses to main memory, the DSP's 16 bit word oriented address will have to be translated into a 32 bit byte oriented address. Part of this translation requires that the DSP 16 bit address be shifted 1 bit to the left (multiplying by 2). This means that instead of addressing 64K words of memory space, the DSP will really be able to access 118K bytes of PCI host main memory. The PCI specification requires that PCI initiators that wish to use linear addressing (addresses incremented linearly during burst transfers) leave the 2 LSBs of the address as 00. This puts a restriction on the DSP software that all fetches from main memory must start with an even address (Least Significant Bit is 0). To make the application flexible in main memory, the DSP Data and Instruction space will be relocateable on 4K boundaries.

The PCI bus is a selectable width bus. Any of 4 byte enable signals can be active indicating that any or all 4 bytes on the bus is valid data. The DSP has a 16 bit bus that is assumed to have 16 bits of valid data on every transfer. While the DSP is the Initiator on the PCI bus, all byte enable signals will be active (all data will be 32 bit). In order to translate between the PCI bus and the DSP bus, there will be 2 16 bit FIFOs in parallel to capture PCI data. The DSP will mux the output of the FIFOs to get one 16 bit word. The mux will be controlled by the LSB of the DSP address. A 0 on the address bit 0 will select the least significant word FIFO and a 1 on the address bit 0 will select the most significant word FIFO.

The stereo audio codec 1956 is an 8 bit device with an ISA bus interface. The Codec is connected to a data bus separate from the DSP's data bus. The DSP will access the Codec via the I/O space registers. To prevent the DSP from being tied up waiting for the slow ISA interface, the ASIC 316 implements a state machine that controls the actual reads and writes from the DSP.

The state machine that governs the Codec is controlled via the CODEC Status/Mode register at DSP I/O space address. The state machine will begin when a 1 is written to the START bit. Depending on whether a read or write is requested and whether or not a PIO or DMA access is requested, the state machine will follow the appropriate protocol and either write the bytes in I/O space registers or read the contents of the Codec and put them into those registers. The BYTE XFER COUNT bits determine how many bytes get transferred during a DMA operation (1 to 4). The ADDR SEL bits determine which address the least significant byte is written to during a PIO access (0 to 3). When the Codec state machine completes, the Codec status bit DONE will be set. This bit is cleared when the state machine is started. It is provided for information to the DSP only.

The PCI card user will have the option of including external memory in Program space and in the Data space of the DSP. This memory (which will be socketed for easy installation and removal) will allow a DSP algorithm to maintain its current form for testing until the code can be rewritten to take advantage of the access to the host main memory. The data space is available to maintain local data separate from host main memory. Global memory will be specified as interface to the host system. This interface will be via a FIFO that resides in Global memory space. This memory will be accessed using software wait states instead of the READY signal.

The bootload process uses Global Memory location 0xFFFF and the memory mapped I/O port 50h. This location will be available in Global memory if the BIO bit in the PCI IO Space register (DSP Command Word—bit 3) is set high. If BIO is set low, a read from location 0xFFFF will result in a bus conflict between bootload data and the Global Memory data. If a user must use Global memory the BR# signal from the DSP to the ASIC should be gated with the user's address decode signal to prevent the ASIC's FIFO from being active on the user's Global memory accesses.

The PC BIOS software executed on Power On is responsible for discovering what kinds of PCI cards are installed in the system. This software is called Power On Self Test (POST) code and is responsible for performing some generic initialization of the PCI application card. After the initialization is complete, the card can go off to main memory and fetch its own Program code.

Once the PC is powered up, the DSP will be held in the reset state until the host DSP driver takes the DSP out of reset. At this point the driver will write to the PCI I/O space COMMAND WORD register to take the DSP out of reset. The CPU will then bootload the BDSP. The device driver will download the 16 bit words to the DSP via the PCI I/O space BOOTLOAD DATA register by looking for the BDSP to set XF, then setting BIO (in the COMMAND WORD register) after the valid data has been written to the BOOTLOAD DATA register. This requires no additional hardware in the PCI ASIC or on the application card. It does cause some overhead for the host DSP driver. It is also the most flexible approach since the bootloaded code can be changed in software. Once the DSP has been initialized, it will wait for the CPU to write to a register and set the COMMAND bit. The COMMAND bit will generate an interrupt to the DSP and cause it to begin execution. One of the first things this initial DSP code must do is check for the existence of Data memory. If Data memory is found, then it must be determined whether the memory is 8 bits wide or 16 bits wide. The existence of DSP global memory means that the DSP applications will have the opportunity to store up to 64K words (or bytes) of data in fast memory on the PCI card without having to go through the PCI bus to access it.

Figure 21:
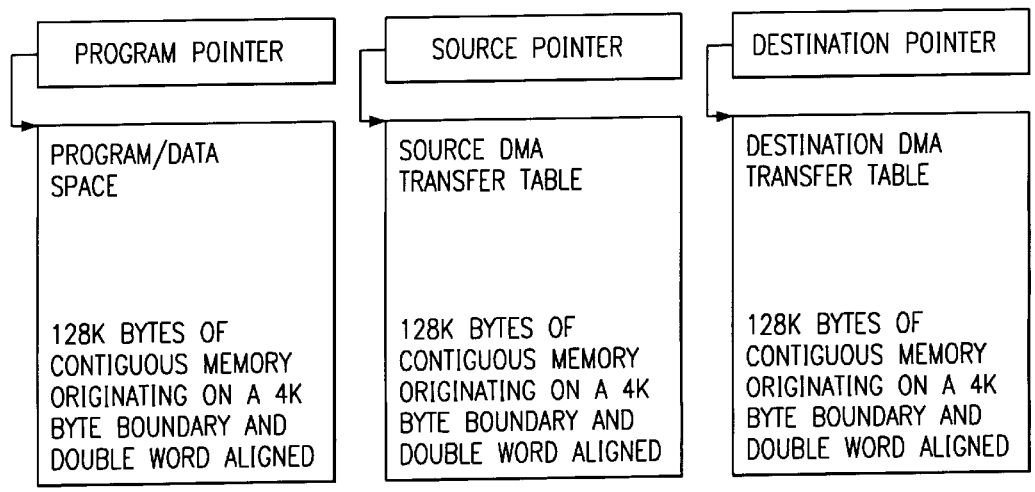
FIG. 21 is a schematic block diagram of an embodiment of a memory allocation and physical locking model for the improved computer system of the present invention.

FIG. 21 is a schematic block diagram of an embodiment of a memory allocation and locking model for the improved computer system of the present invention. The memory allocation and locking depicted in FIG. 21 corresponds to that depicted in FIG. 11. Through DSP software there is known a pointer to DSP space. For every transaction there is also known Where the source and destination table is. FIG. 21 provides a directory for the memory architecture. FIG. 11 represents a single source space and a contiguous destination space. In Windows 95 this is true of virtual space but physical addresses are scattered all over space; thus the term scatter—gather bus mastering by the DSP.

Figure 22:
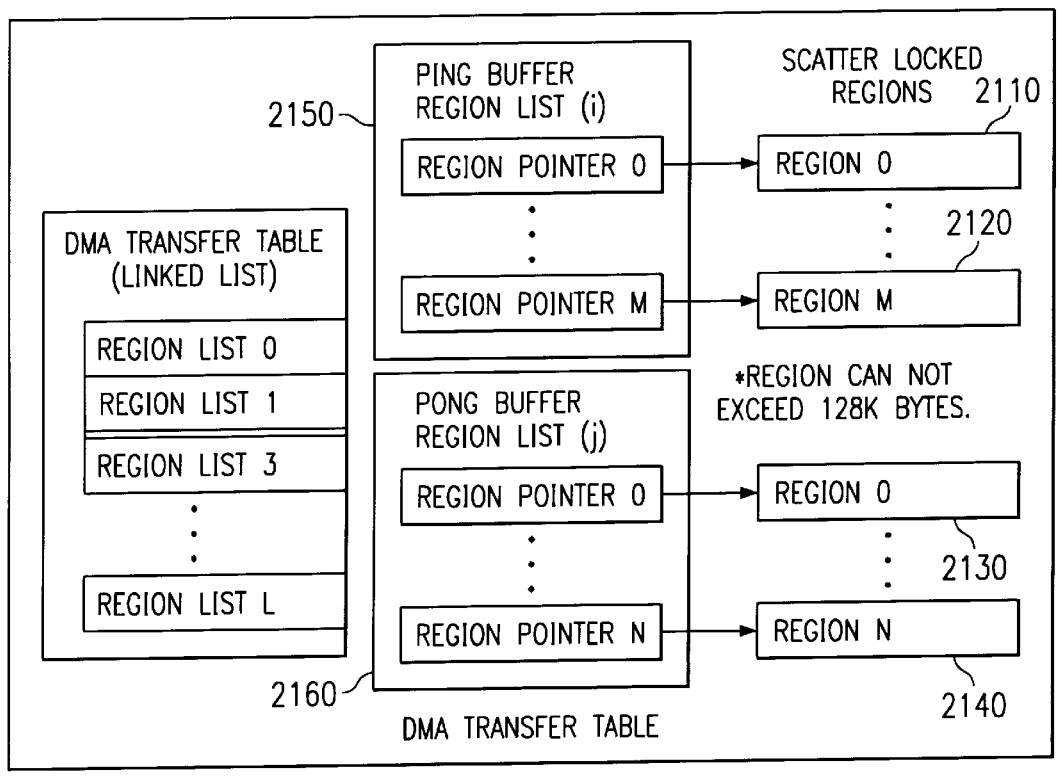
FIG. 22 is an overview diagram of a source and destination data DMA model for the improved computer system of the present invention.

FIG. 22 is an overview diagram of a source and destination data DMA transfer table model for the improved computer system of the present invention. In FIG. 22, each block 2110, 2120, 2130, 2140 is a (scatter locked) region in memory 112 or portion of 112 utilized for that application at runtime. At that moment a directory is set up that breaks up into numerous pieces in regions. A link-list allows the application to hop around in virtual space. A ping-pong buffer 2150, 2160 approach is used. A destination becomes a source for the CPU, dovetailing with the CPU.

Figure 23:
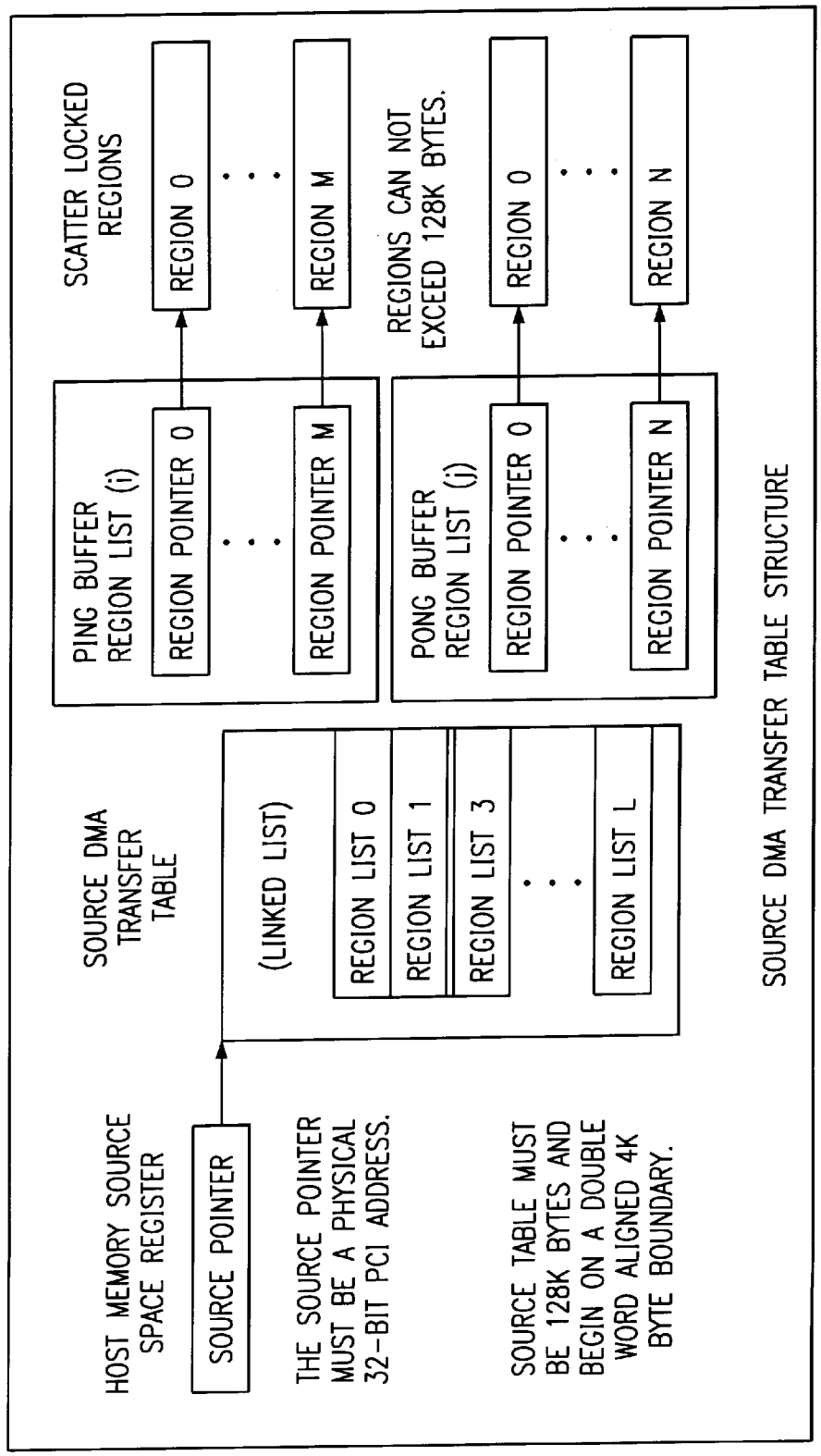
FIG. 23 is a schematic block diagram of the internal structure of a source data DMA transfer table for the improved computer system of the present invention.

FIG. 23 is a schematic block diagram of the internal structure of a source data DMA transfer table for the improved computer system of the present invention. In FIG. 23, more internal structure of the source DMA transfer table is shown compared to FIG. 21.

Figure 24:
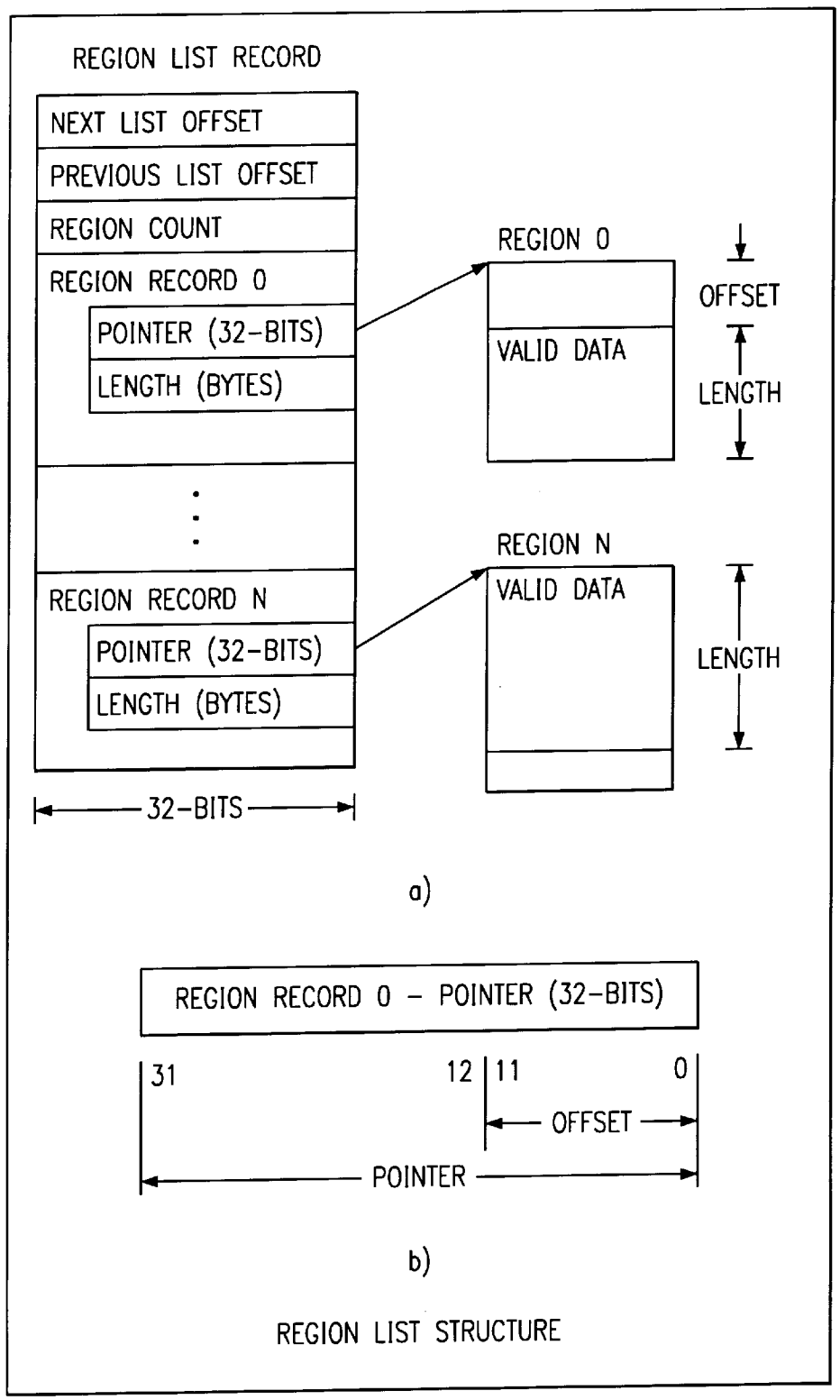
FIG. 24 is a detail of a region list for the source data DMA transfer table of FIG. 22.
Figure 25:
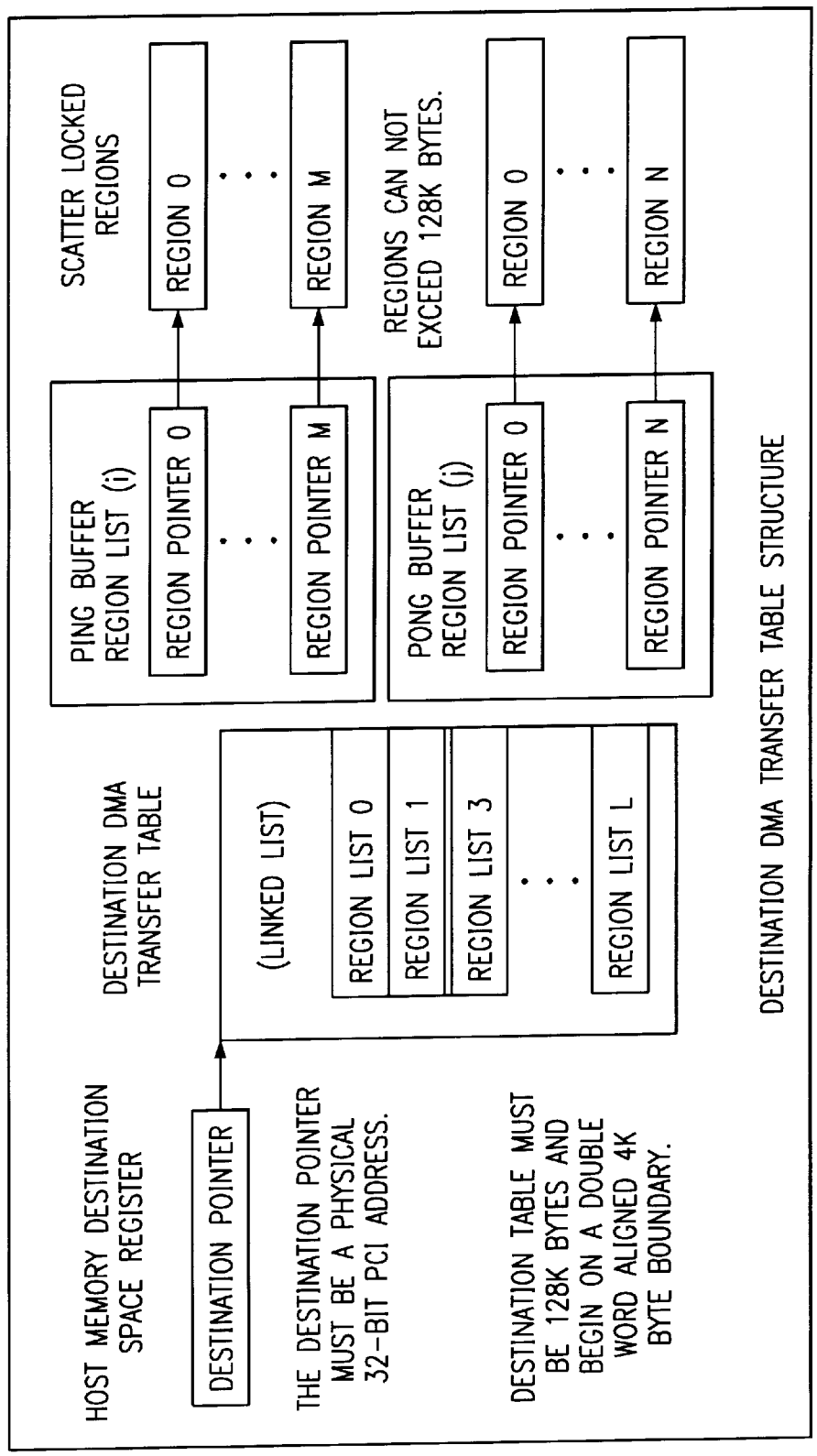
FIG. 25 is a schematic block diagram of the internal structure of a destination data DMA transfer table for the improved computer system of the present invention.
Figure 26:
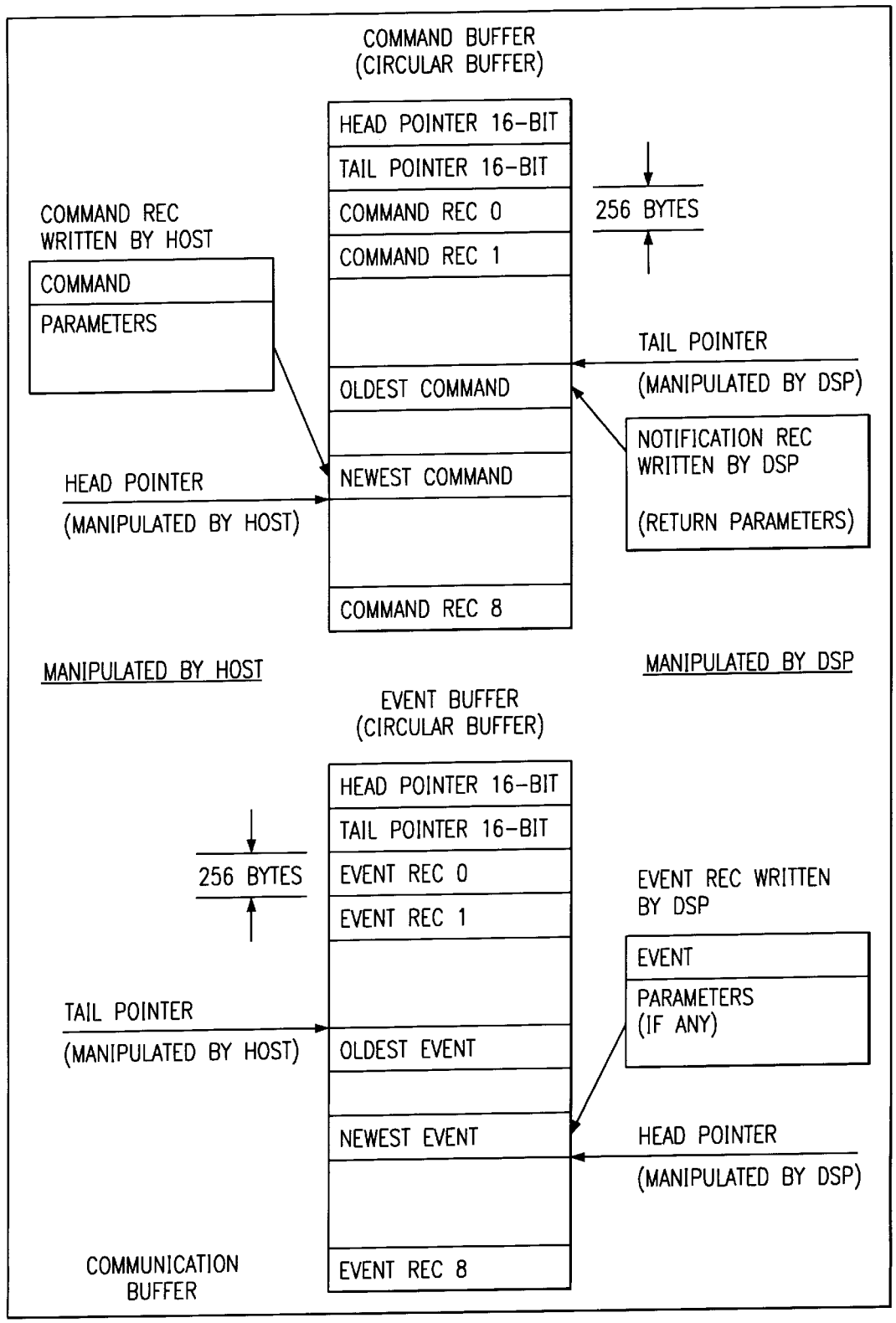
FIG. 26 is a more detailed diagram of a portion of the program/data space portion of FIG. 20.

FIG. 24 is a detail of a region list for the source data DMA transfer table of FIG. 22. FIG. 25 is a schematic block diagram of the internal structure of a destination data DMA transfer table for the improved computer system of the present invention. FIG. 26 is a more detailed diagram of a portion of the program/data space portion of FIG. 21. FIG. 25 shows a detail of the destination transfer table structure. FIG. 26 shows a detail of the program/data space block of FIG. 20. FIG. 24 is a detail of the region list in any one of FIGS. 21, 23 and 25. These Figures show how the DSP and host CPU can effectively share and coexist together in their use of the same memory space such as Local memory 112.

Figure 27:
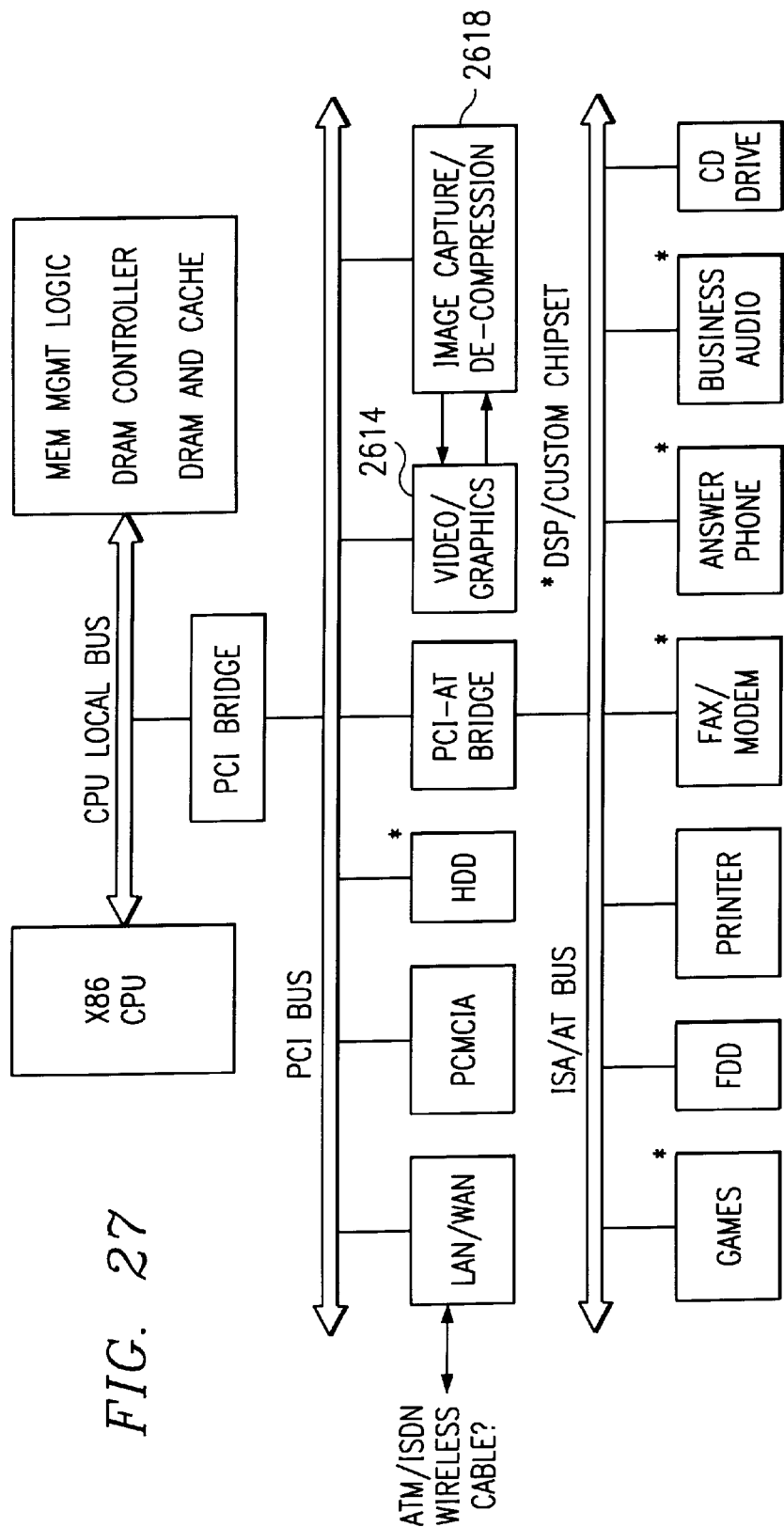
FIG. 27 is an electrical block diagram of another embodiment of an improved computer system according to the present invention.

FIG. 27 is an electrical block diagram of another embodiment of an improved computer system according to the present invention. For this embodiment the memory management logic, memory controller and memory and cache are combined in one block and are connected to the CPU via the local bus. The local bus in turn is connected to the PCI bridge which is connected to the PCI bus. Further, the video/graphics chip 2614 and image capture/decompression block 2618 provide 2D and 3D graphics and the various video image functions noted earlier herein.

Figure 29:
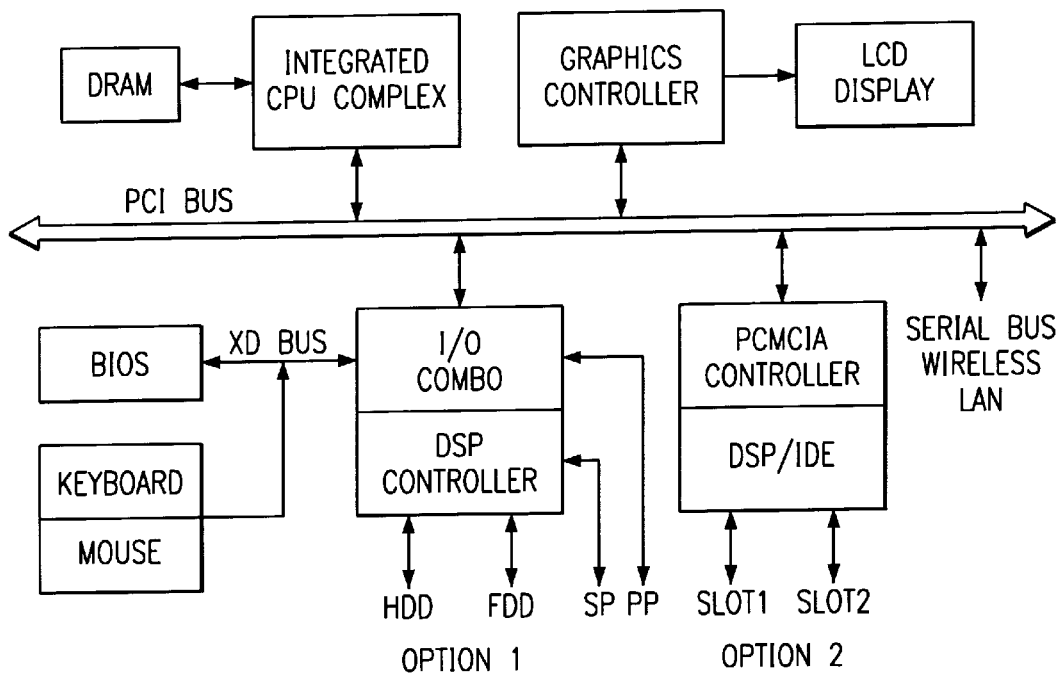
FIG. 29 is an electrical block diagram of another embodiment of an improved computer system according to the present invention.

FIG. 29 is an electrical block diagram of another embodiment of an improved computer system according to the present invention. For this embodiment the CPU has the memory controller and PCI bridge circuitry integrated on its chip and is thus directly connected to memory and the PCI bus. An integrated multimedia graphics controller is connected to the PCI bus and a display. In addition, two optional chips are provided connected to the PCI bus. One chip is for a peripheral I/O combo with the DSP. The other is for a PCMCIA controller with the DSP. The PC's bios is connected to the I/O block as are the keyboard and mouse and a parallel port (PP). The hard disc drive (HDD) and floppy disc drive (FDD) are connected to the DSP portion, as well as a serial port (SP).

FIG. 30 is an electrical block diagram of another embodiment of an improved computer system according to the present invention. FIG. 30 is similar to FIG. 29, but the wireless, LAN of FIG. 30 is now integrated with the PCMCIA controller block and upgraded to include a 1394 data stream.

FIG. 30 shows an embodiment wherein one chip provides all functions and a bare-bones physical layer provides I/O. Everything but the physical layer is part of the PC. Multiple peripheral circuitry is obviated. The physical layer which requires USA FCC approval, can be focused upon, and the DAA is soft. Voice annotated capability with speech codec is provided. LAN focuses on the physical layer, and the DSP virtualizes the other LAN functions. In the ultimate digital revolution of cost reduction everything but the physical layer is virtualized arid the DSP 200 provides the essential heart of this revolution.

FIG. 31 is a schematic block diagram of an embodiment of an application/driver model for the improved computer system of the present invention. The VxD Environment (VXDE) provides DSP related low-level services for Windows applications, for example multimedia applications. The Windows 3.1 model of the DSP driver depicted in FIG. 31 is comprised of a Windows VxD and a Windows DLL. The DLL interfaces with/to the Windows applications, performs application callbacks and file I/O's, handles interrupts, and interfaces with the VxD. The VxD is only responsible for locking down and freeing physical memory which may be used by DSP.

Under Windows 95, the above model is no longer appropriate because Windows drivers with which DSP driver DLL needs to communicate may be 16-bit or 32-bit. In order for both 16-bit and 32-bit Windows drivers be able to communicate with DSP driver, the above model is modified as depicted in FIG. 32.

Figure 32:
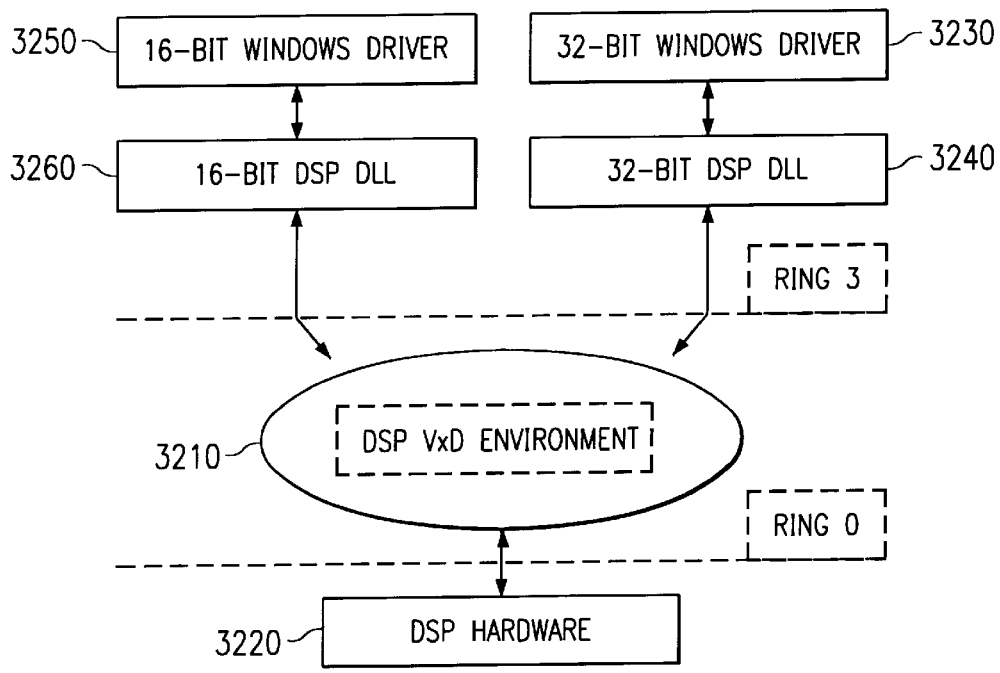
FIG. 32 is a schematic block diagram of another embodiment of a virtual memory model for the improved computer system of the present invention.

FIG. 32 is a schematic block diagram of another embodiment of an application/driver model for the improved computer system of the present invention. The model depicted in FIG. 32 has a Windows VxD, a 16-bit Windows DLL, and a 32-bit Windows DLL. The DLLs are necessary only for the communication between Windows drivers and the DSP VxD. However, for this model the DSP VxD is in charge of everything, interfacing with the DSP, handling interrupts, performing application callbacks and file I/O, etc., and is given the name DSP VxD Environment.

The VxD Environment(VXDE) provides DSP related low-level services for Windows applications, for example multimedia applications. For multimedia applications, these services may be: NodeAdvise, NodeAllocate, NodeDestroy, NodeGetAttr, NodeGetData, NodeGetPosition, NodePause, NodePutData, NodeResetStream, NodeRun, NodeSetAttr, NodeSignalEvent, NodeConvertData, NodeWaitSemaphore, NodeCreateSemaphore, and NodeDestroySemaphore.

Windows multimedia applications communicate with VXDE through a 16-bit DLL or a 32-bit DLL; VXDE communicates with Windows applications through a callback function in 16-bit case or through some event signaling mechanism (Semaphore) in the 32-bit case. VXDE communicates with DSP by writing to DSP's memory mapped ports; DSP communicates with VXDE by generating hardware interrupts which are virtualized by VXDE through VPICD.

For any Windows application wishing to communicate with VXDE, all it needs to do is using the set of API listed above together with the 16-bit DLL or 32-bit DLL (DSPAPI.DLL or DSPAPI32.DLL). Preferably, the 16-bit DLL puts the parameters in a calling structure, marks it as a call from the 16-bit side, and then calls the VXDE through the entry point. The entry point is located by using Int 2F function 1684h. On the other hand, the 32-bit DLL calls the WXDE through the DEVICEIOCONTROL interface. On the VXDE side, when a call is received from the entry point, the pointer of the calling structure is translated to a linear address and the call is dispatched to the corresponding function which again translates any pointer type parameters from SELECTOR/OFFSET address to a linear address and then process the call. If a call is received from the DEVICEIOCONTROL interface, it is dispatched directly to the corresponding function which process it directly without any address translation.

A 32-bit Windows application wishing to be notified when the DSP hardware finishes a specific task can do so by putting a valid event handle in the OVERLAPPED structure and passing the pointer to VXDE. It then needs to call WaitForSingleobject on the event. For applications not wishing to be notified, the parameter which contains a pointer to the OVERLAPPED structure should be MULL when calling VXDE.

A 16-bit Windows application wishing to be notified when the DSP hardware finishes a specific task can use the Callback function.

FIGS. 33 and 34 are schematic block diagrams illustrating various actions in the application/driver model of FIG. 31 or 32 for the improved computer system of the present invention. VXDE virtualizes the IRQ used to communicate with DSP through VPICD. Any interrupt on the specified IRQ is dispatched to VXDE. When an interrupt is generated, VXDE first clears the interrupt to enable any future interrupts, and then starts serving the interrupt. If the interrupt is the result of calling from a 16-bit application the callback function is handled through a scheduling event (Call_Priority_Event) during which the callback function is called through Vmm service Simulate_Far_Call. This is because when a VxD processes a hardware interrupt, it is restricted by the number services it may call. If the interrupt is the result of calling from a 32-bit application, the notification of application is still handled through a scheduling event, in which the notification is realized by calling vWin32 service VWin32_DIOCCompletionRoutine with EBX=overlapped.Internal.

Figure 35:
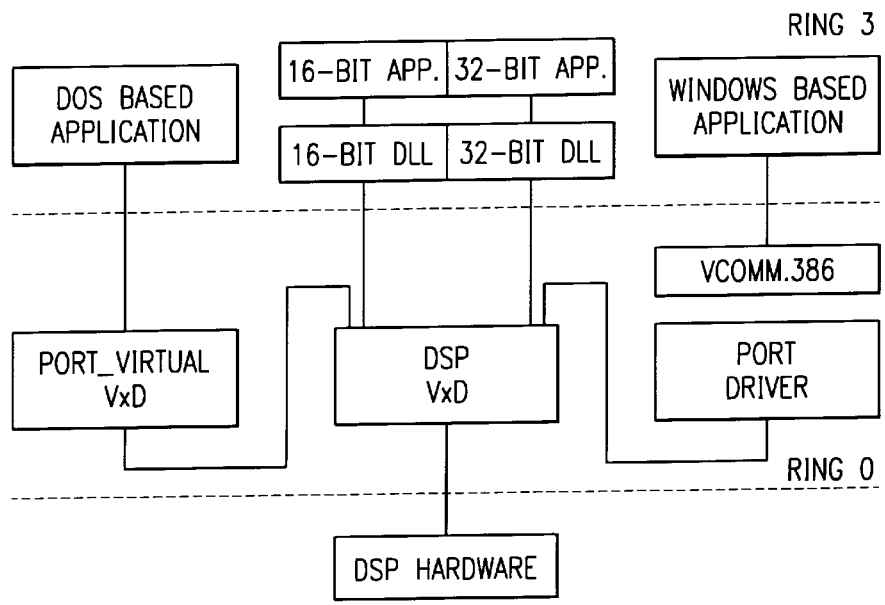
FIG. 35 is a schematic block diagram of another embodiment of a virtual memory model for the improved computer system of the present invention.

FIG. 35 is a schematic block diagram of another embodiment of a virtual memory model for the improved computer system of the present invention. The model in FIG. 35 illustrates how to redirect all the communication through the serial port to the DSP hardware.

A set of services is provided by DSP VxD for the Port Driver and Port-virtualization VxD to use in order to redirect the communication through serial port to DSP hardware. Upon system boot time when Port-virtualization VxD is loaded, it initializes its execution environment, installs port I/O trapping handlers, installs port I/O contention handlers, etc., and thus virtualizes the COM devices.

When a DOS application in a DOS box tries to acquire the COM port, the ownership of the port is given to the real-mode VM, the IRQ associated with that COM port is virtualized through VPICD so that interrupts from that IRQ can be reflected to the right VM. Any communication through the COM port are trapped through the installed port I/O trapping handlers and are redirected to DSP hardware by using the set of services provided by DSP VxD.

When a Windows application running on System VM tries to acquire the COM port, the Port Driver calls the contention handlers installed by Port-virtualization VxD to set the ownership of that COM port to the System VM and turn off I/O trappings. Any communication through the COM port are redirected to DSP hardware by the Port Driver using the set of services provided by DSP VxD.

FIG. 36 is a schematic block diagram of another embodiment of a virtual memory model for the improved computer system of the present invention. The model in FIG. 35 can be changed to that in FIG. 36 so that interfacing with hardware only happens in the Port Driver. The advantage of doing this is that when the hardware is changed only the Port Driver needs to be modified; the disadvantage is the extra delay for DOS based application.

Figure 37:
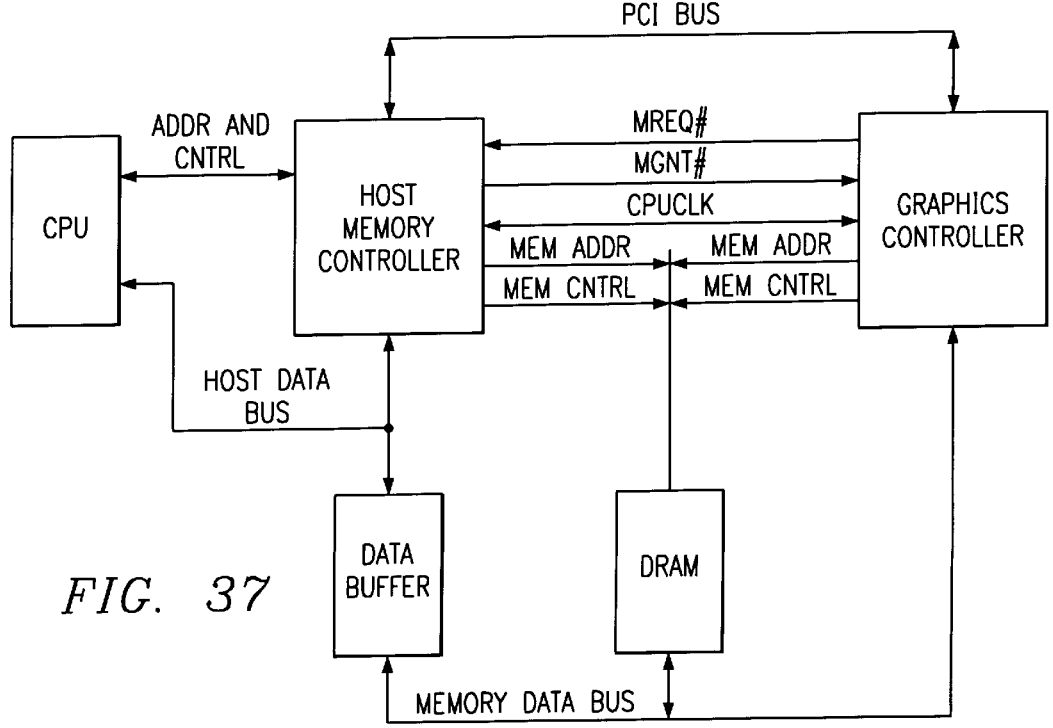
FIG. 37 is an electrical block diagram of an embodiment of a portion of an improved computer system according to the present invention.

FIG. 37 is an electrical block diagram of an embodiment of a portion of an improved computer system according to the present invention. FIG. 37 depicts the integration of the graphics controller with the memory controller and their sharing of memory via a memory data bus. The CPU provides addresses and controls to the memory controller and receives data on its host data bus via a data buffer.

Figure 38:
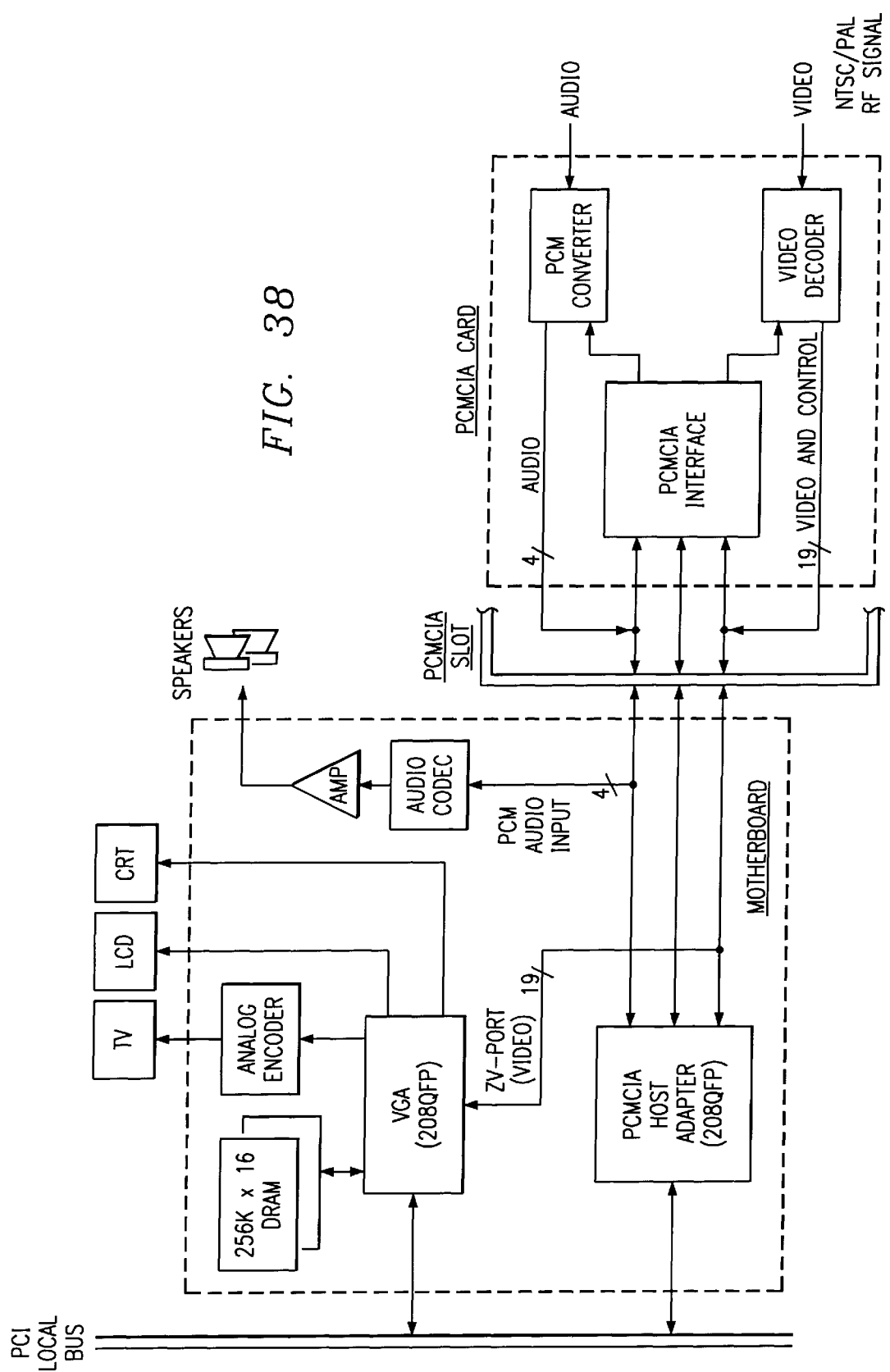
FIG. 38 is an electrical block diagram of an embodiment of a portion of an improved computer system according to the present invention.
Figure 39A:
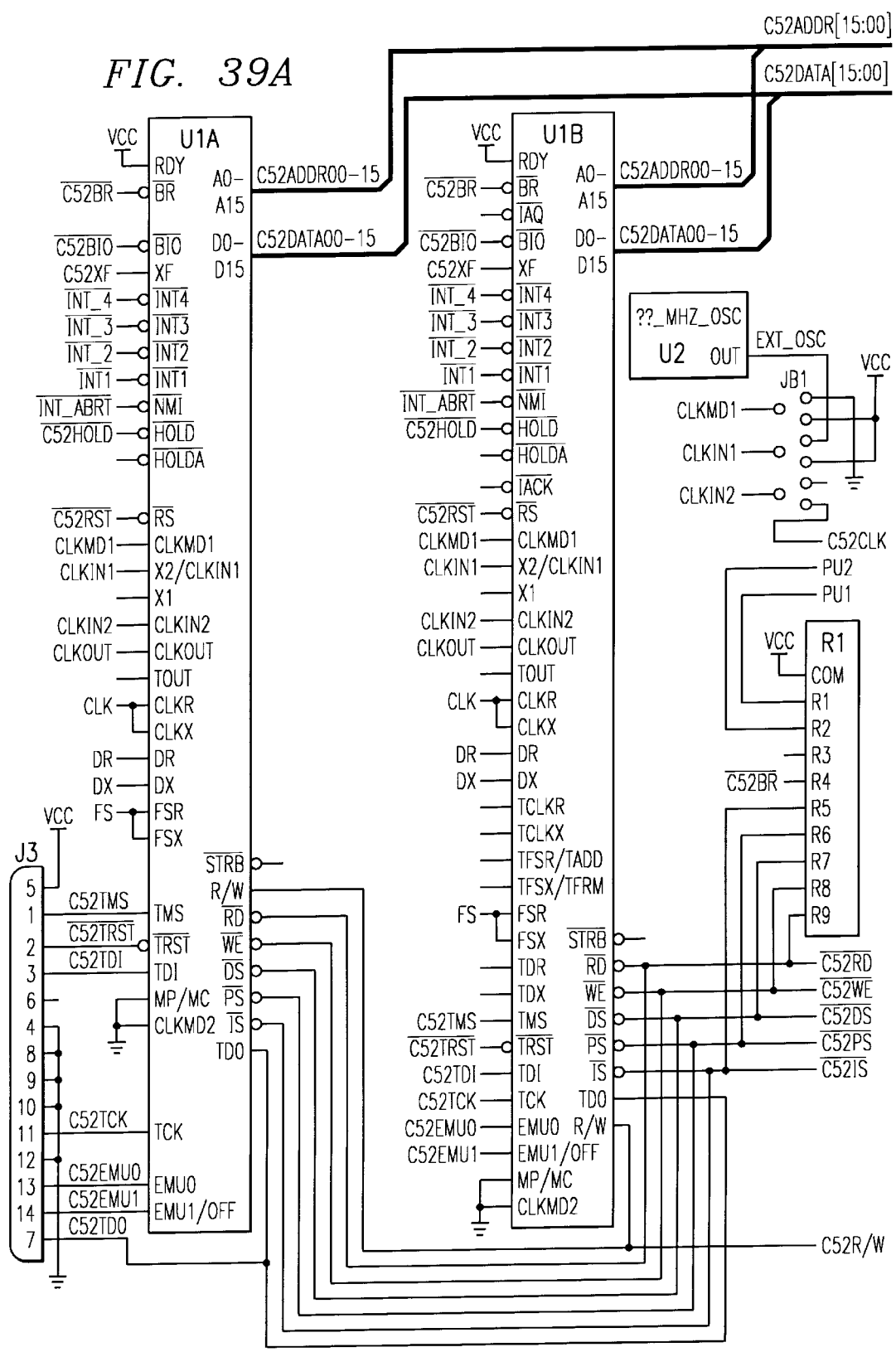
FIGS. 39A–39G are electrical block diagrams of an embodiment of a portion of an improved computer system according to the present invention.
Figure 39B:
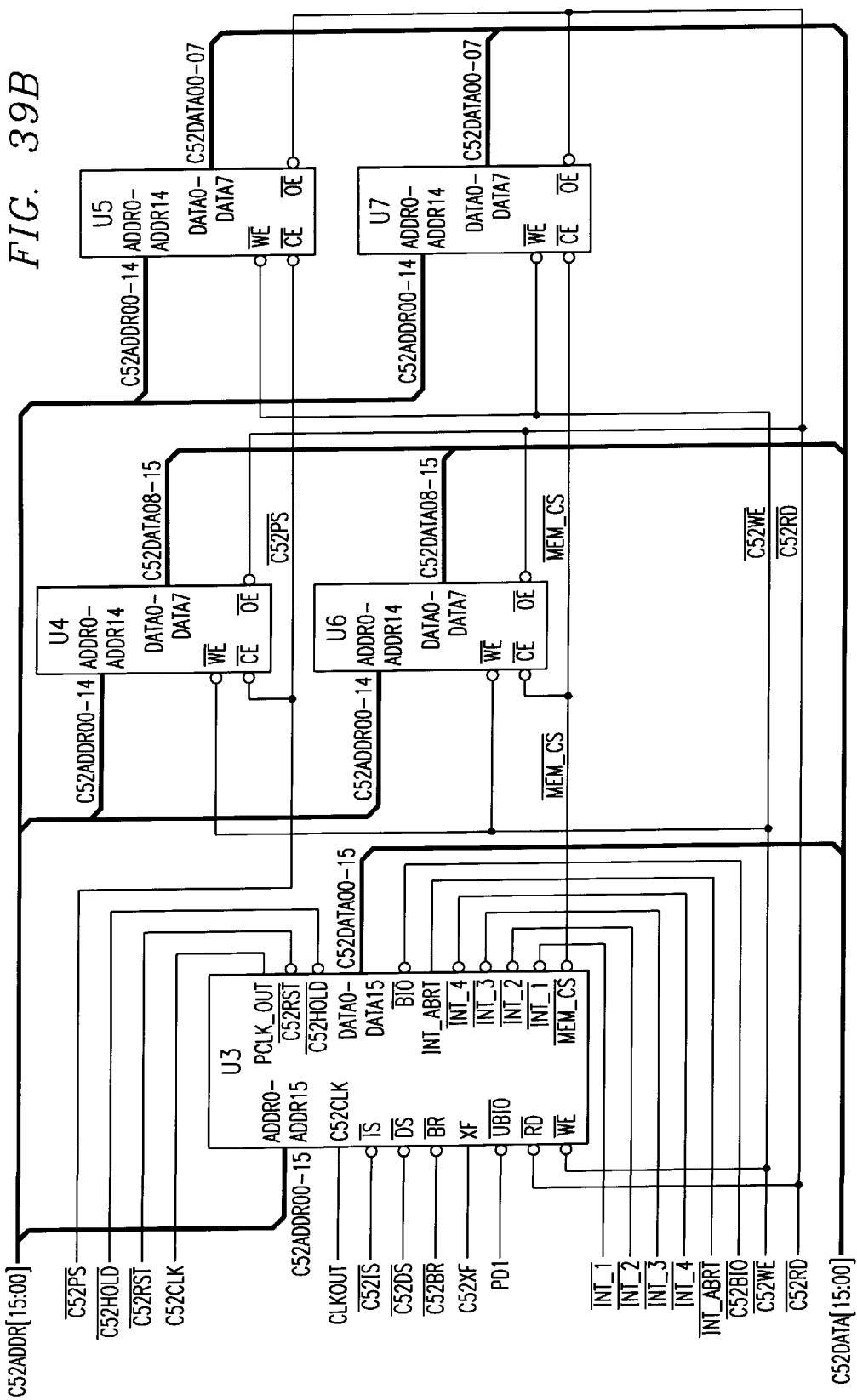
Figure 39C:
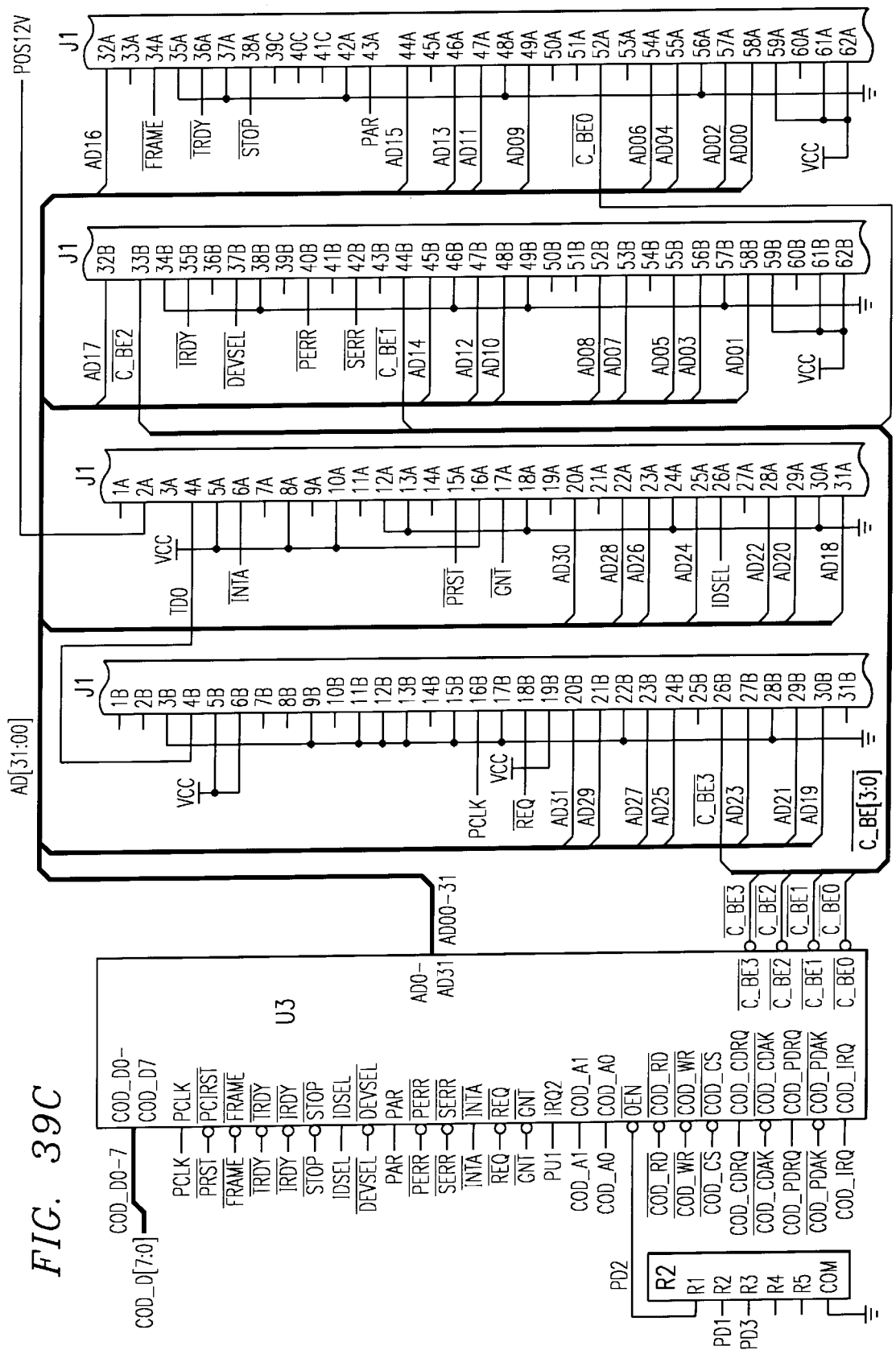
Figure 39D:
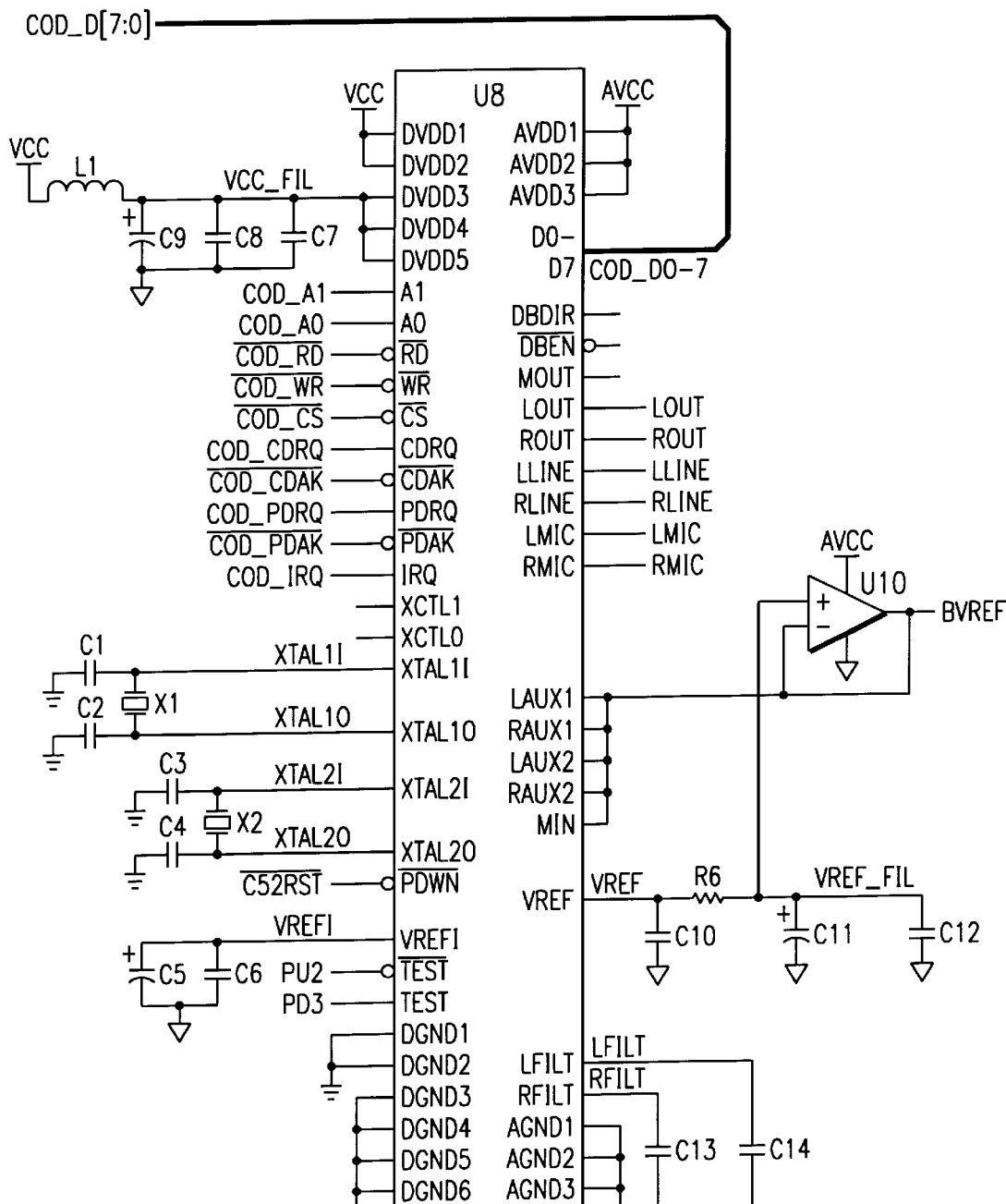
Figure 39E:
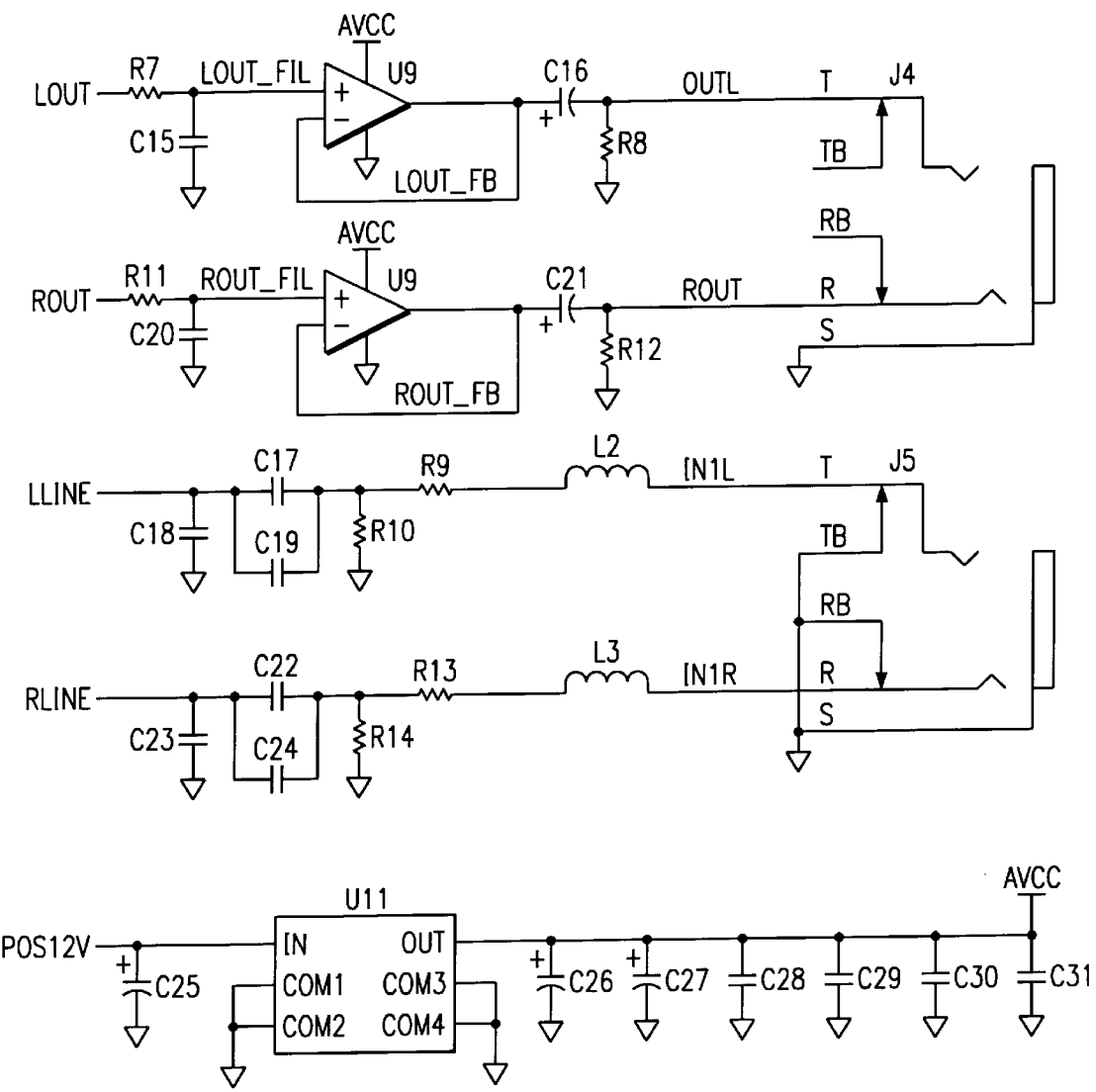
Figure 39F:
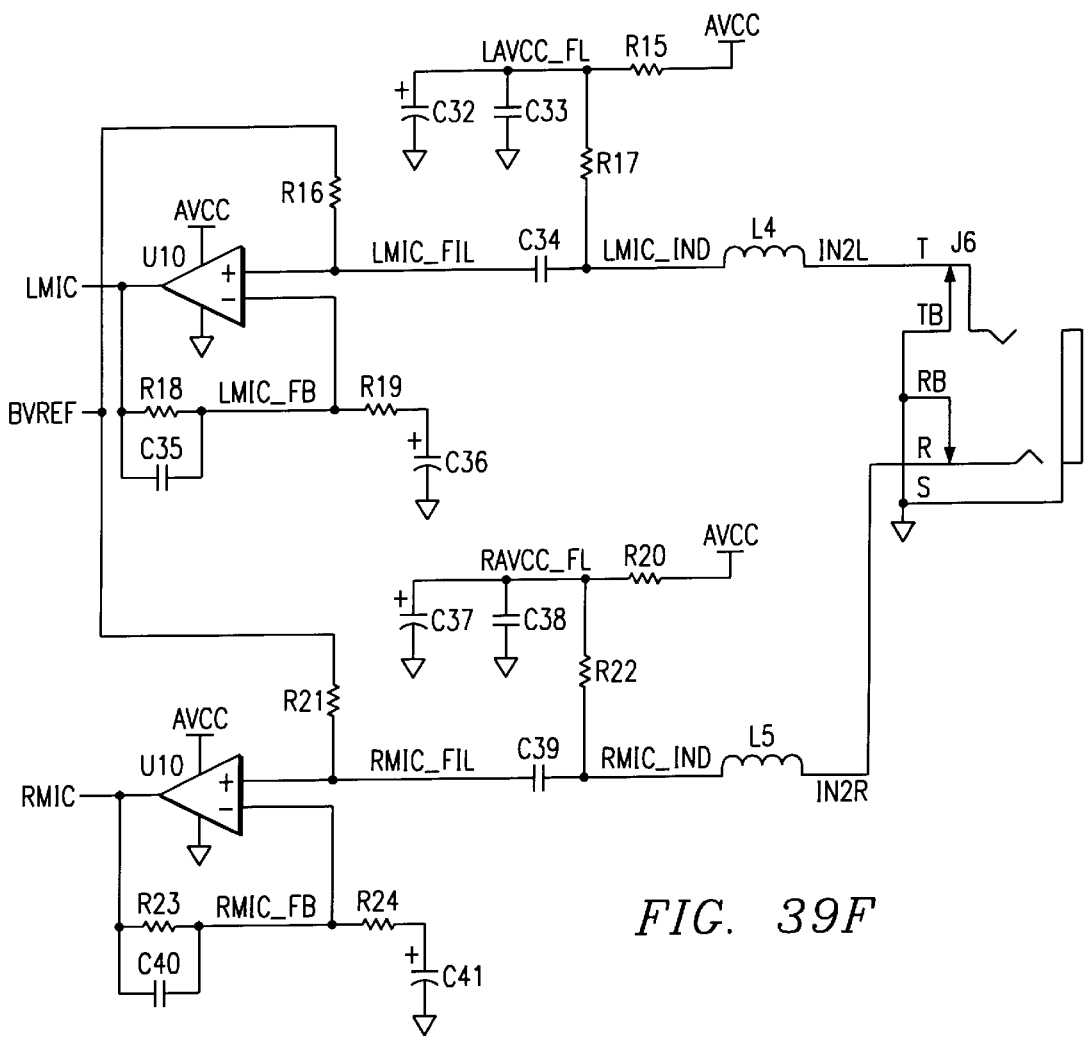
Figure 39G:
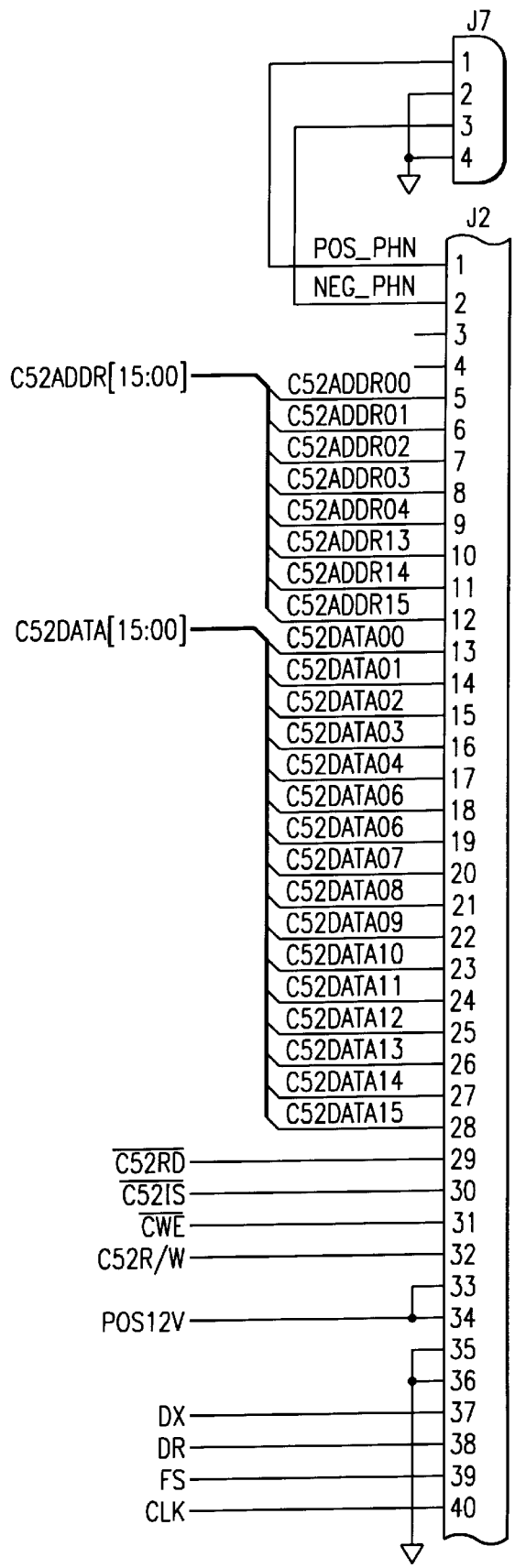

FIG. 38 is an electrical block diagram of an embodiment of a portion of an improved computer system according to the present invention. FIG. 38 depicts the use of a Zoom Video (ZV) port as a point to point unidirectional video bus between a PC card socket and a VGA con-roller. This Figure depicts how TV in a window could be achieved in a portable computer with a low cost PC card. An MPEG or teleconferencing card could also be plugged into the PCMCIA slot.

FIGS. 39A–39G are electrical block diagrams of a breadboard demonstration embodiment of a portion of an improved computer system according to the present invention. This embodiment is then turned into a PC/DSP integration board that is a multilayer PC board that fits within the PCI short card definition. The card has a digital area, an analog area, and a blank area where a daughter card may be connected in a low profile manner. The analog ground plane for the analog area and the digital ground plane for the digital area shall be connected near the Codec chip. The endplate of the board will house a C5x emulation header (closest to the motherboard), 3 stereo phone jacks (3.5 mm), 2 RCA 844 jacks, and an RJ11 phone jack (furthest away from the motherboard).

The header for the daughter card will be dual 90 degree header pins on the main board. The daughter card will have dual header sockets that will make for a low-profile board overall. The address range available via the I/O bus on the daughter card has been broken up to allow flexibility in assigning software wait states to the different address ranges.

The C5x family of DSPs have 2 input pins that determine which type of input clocking scheme will be used. CLKMD1 and CLKMD2 allow 4 different clocking options to be used (one of which is reserved for testing). This board design has two clocking options.

Figure 40:
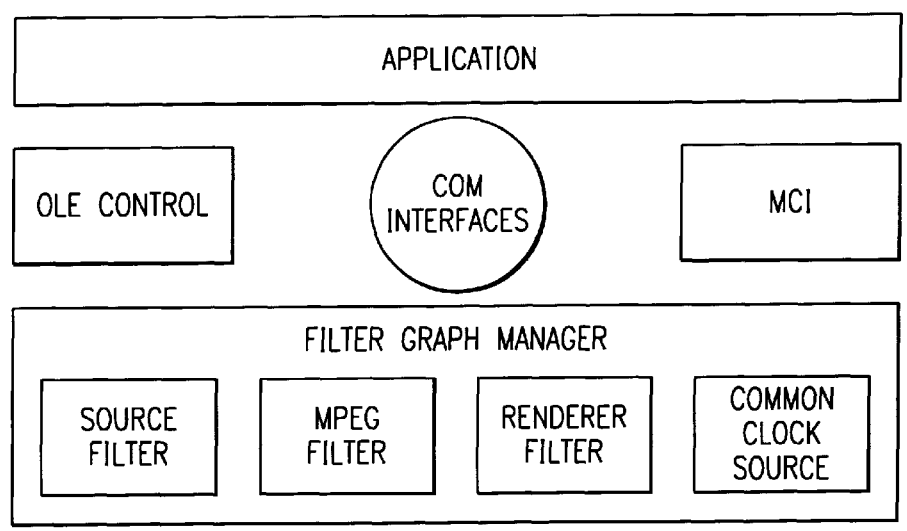
FIG. 40 is a schematic block diagram of an embodiment of an MPEG playback filter graph model for the improved computer system of the present invention.

FIG. 40 is a schematic block diagram of an embodiment of an MPEG playback filter graph model that may be employed in the improved computer system of the present invention. In FIG. 10, a Windows application dynamically allocates memory and runs object linking embedding (OLE) When a user clicks on a software object. The "com interfaces" circle in FIG. 40 are communication interfaces that the application with filter graph manager and the MCI block controls media interfaces. MPEG works object by object instead of layer by layer. Sources may include image capture data to decompress.

Figure 41:
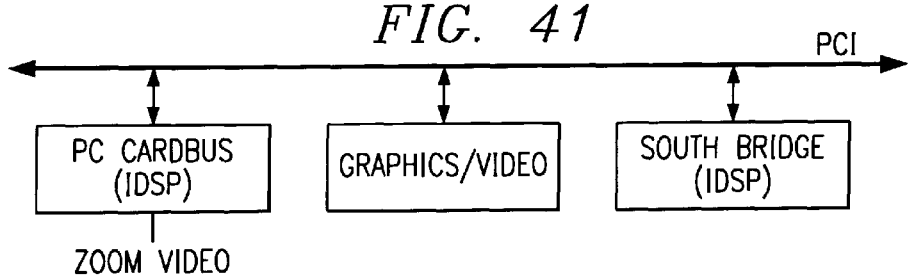
FIG. 41 is an electrical block diagram of another embodiment of an improved computer system according to the present invention.

FIG. 41 is an electrical block diagram of another embodiment of an improved computer system according to the present invention. FIG. 41 is similar to FIG. 30, but the PC Cardbus block has an IDSP integrated therein and a zoom video bus for video. The south bridge also includes a integrated IDSP function therein. The graphics and video functions are integrated into a single chip connected to the PCI bus.

Figure 42:
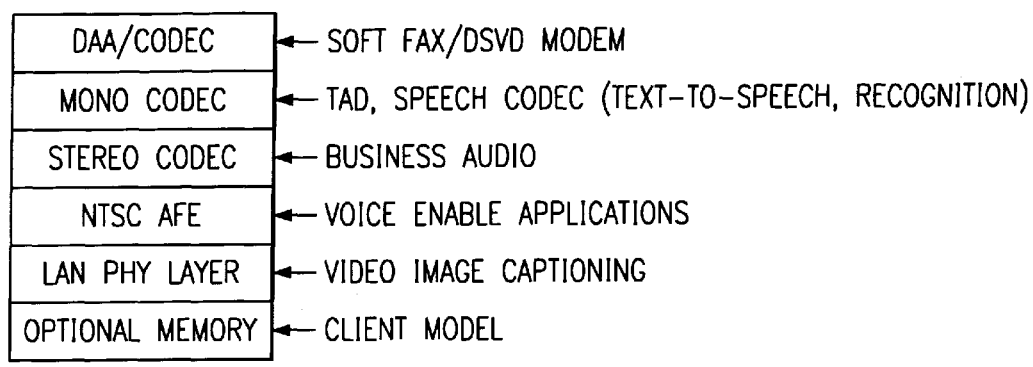
FIG. 42 is an block diagram of software applications and their associated applications that may be used in the improved computer system of the present invention.

FIG. 42 is an block diagram of software applications and their associated applications that may be used in the improved computer system of the present invention. FIG. 42 is similar to the lower portion of FIG. 30.

Figure 43:
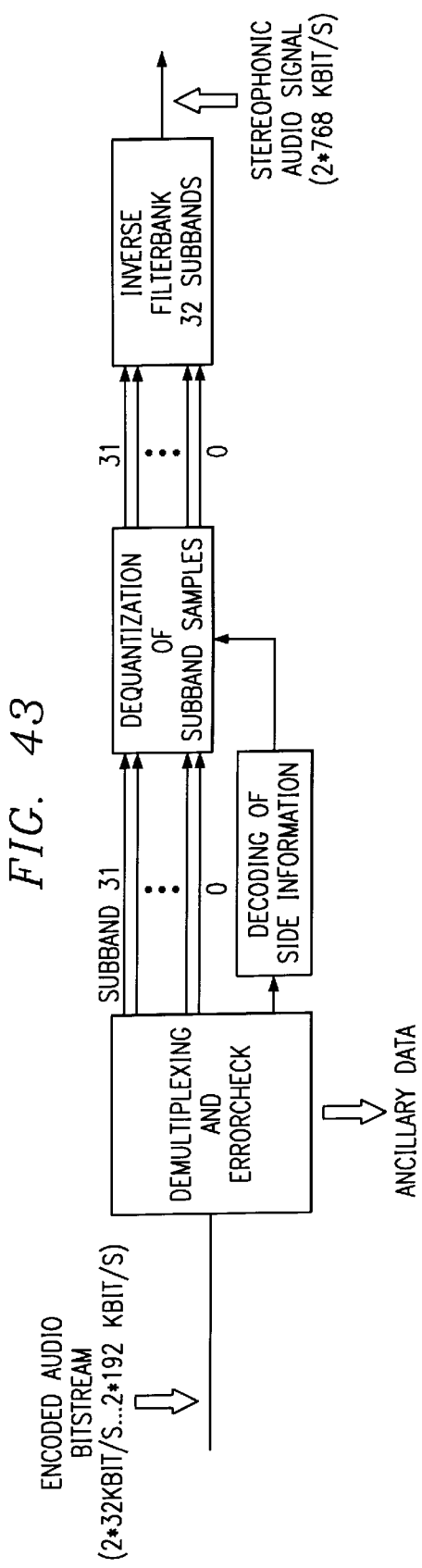
FIG. 43 is a simplified block diagram of an audio decoder for use in the improved computer system of the present invention.

FIG. 43 is a simplified block diagram of an audio decoder for use in the improved computer system of the present invention. Incoming coded audio is demultiplexed and error checked and any ancillary data is output. The various audio subbands are output to an inverse quantizer with quantizer steps supplied as part of the data. The inverse quantizer 1411 outputs to an inverse filter bank block which outputs the decoded audio signals.

Figure 44:
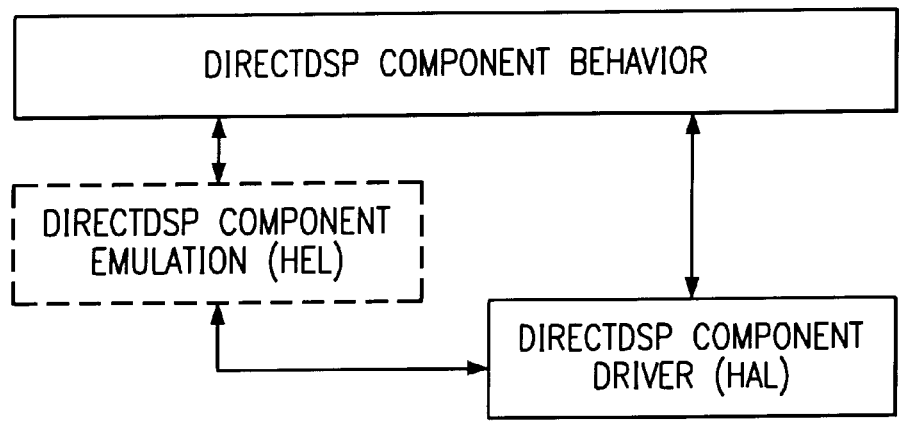
FIG. 44 is a schematic block diagram of a directDSP; component and how its interfaces with its driver and emulation block.

FIG. 44 is a schematic block diagram of a directDSP component and how its interfaces with its driver and emulation block. Such components may be employed in the improved computer system of the present invention.

Figure 45:
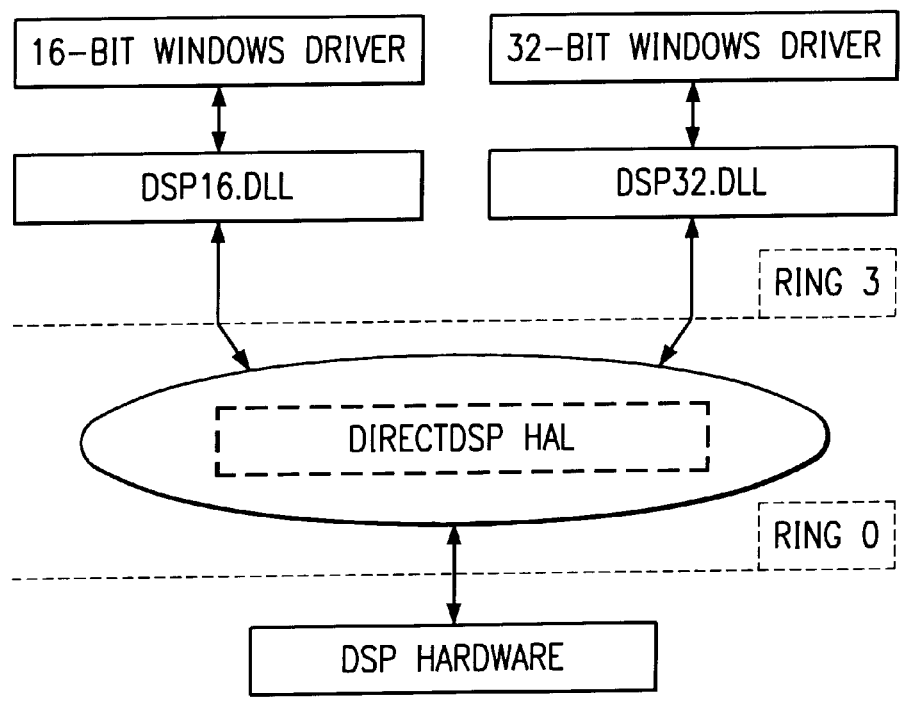
FIG. 45 is a schematic block diagram of another embodiment of a virtual memory model for the improved computer system of the present invention.

FIG. 45 is a schematic block diagram of another embodiment of a virtual memory model for the improved computer system of the present invention. The model depicted in FIG. 45 is similar to FIG. 32, but has a Windows directdsp HAL, a 16-bit Windows DLL, and a 32-bit Windows DLL. The DLLs are necessary only for the communication between Windows drivers and the directDSP. However, for this model the directDSP is in charge of everything, interfacing with the DSP, handling interrupts, performing application callbacks and file I/O, etc., and is given the name directDSP Environment.

Figure 46:
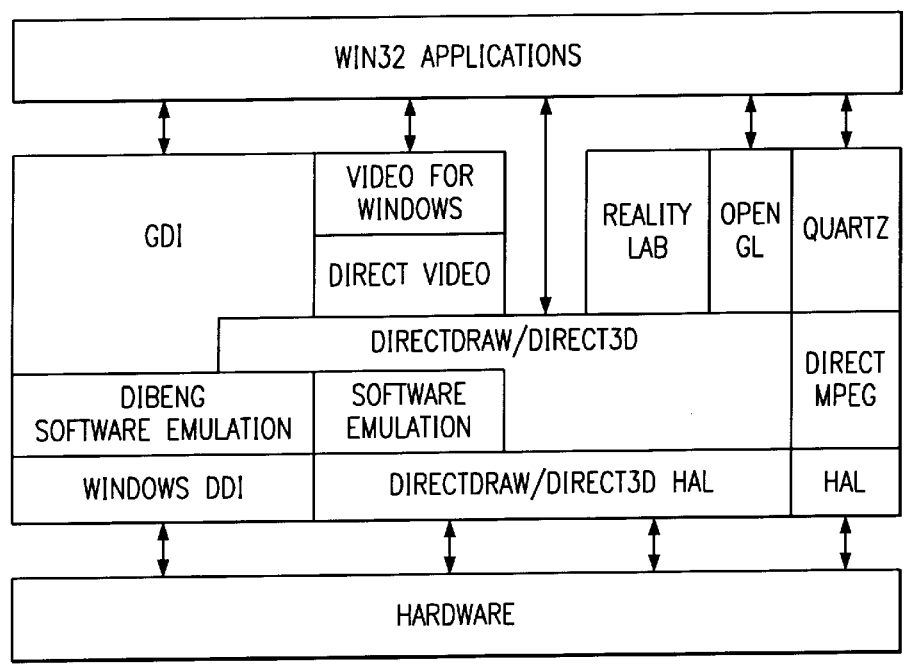
FIG. 46 is a schematic block diagram depicting the various layers of software between a windows application and the underlying PC hardware which implements the improved computer system of the present invention.

FIG. 46 is a schematic block diagram depicting the various layers of software between a windows application and the underlying PC hardware which implements the improved computer system of the present invention.

Figure 47:
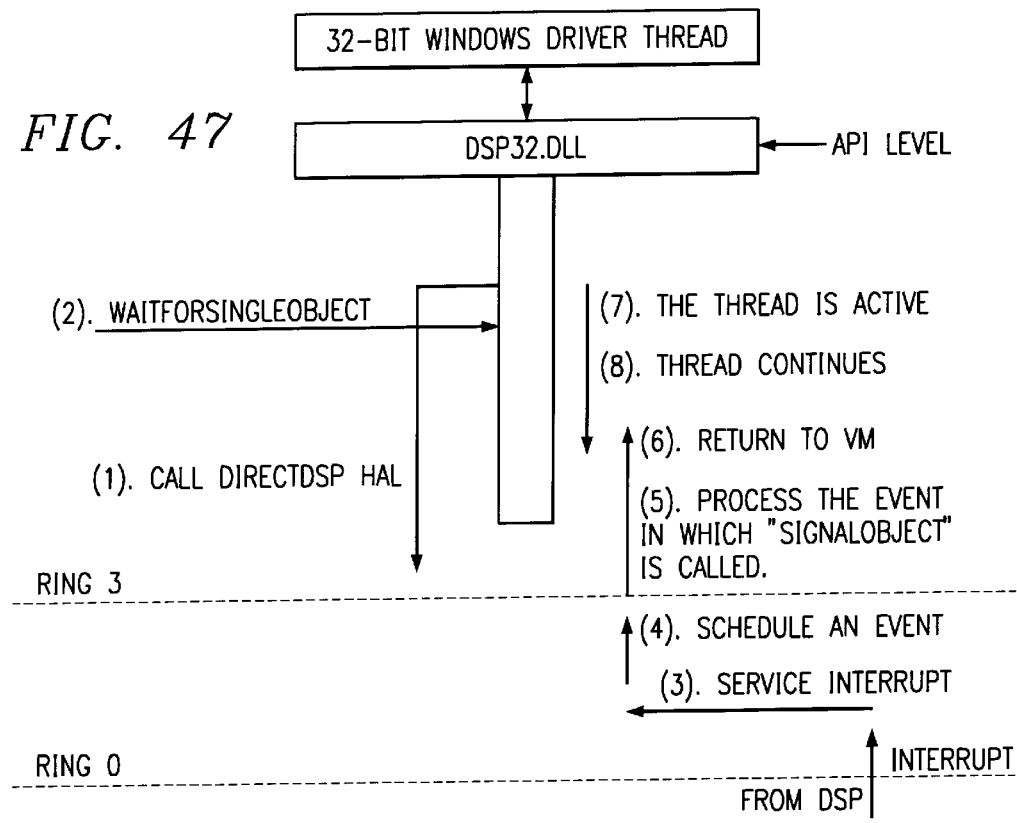
FIG. 47 is a schematic block diagram illustrating various actions in the virtual memory model of FIG. 45 for the improved computer system of the present invention.

FIG. 47 is a schematic block diagram illustrating various actions in the virtual memory model of FIG. 45 for the improved computer system of the present invention. FIG. 47 is similar to FIG. 33, but also includes and API level block.

Figure 48:
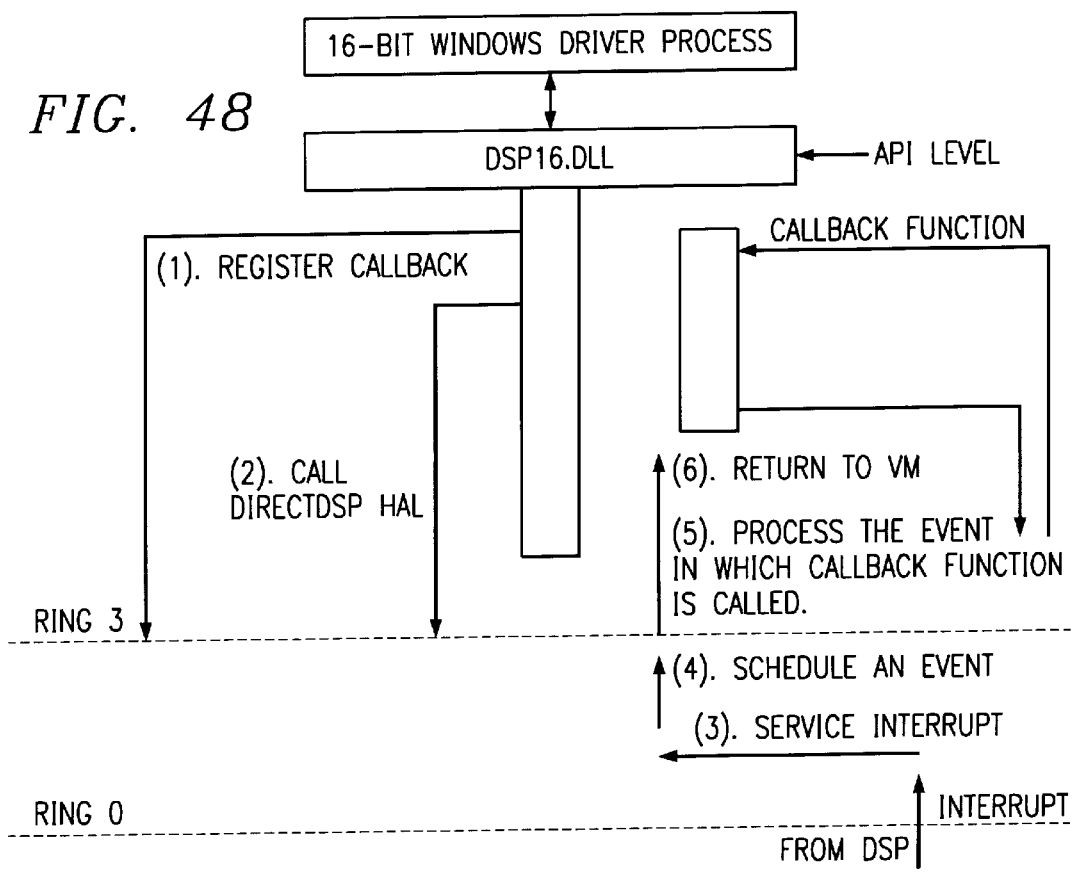
FIG. 48 is a schematic block diagram illustrating various actions in the virtual memory model of FIG. 45 for the improved computer system of the present invention.

FIG. 48 is a schematic block diagram illustrating various actions in the virtual memory model of FIG. 45 for the improved computer system of the present invention. FIG. 48 is similar to FIG. 34, but also includes and API level block.

Figure 49:
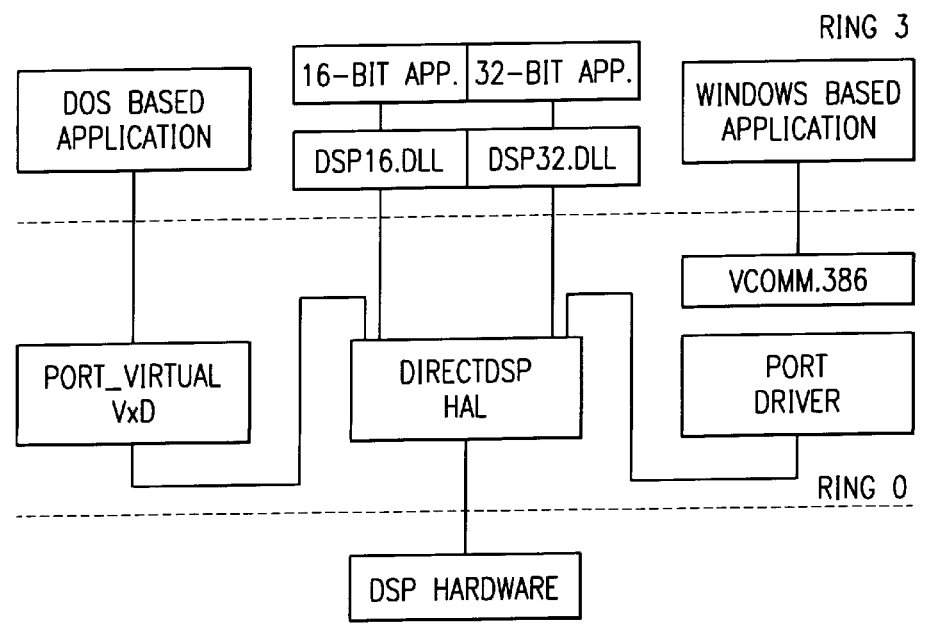
FIG. 49 is a schematic block diagram of another embodiment of a virtual memory model for the improved computer system of the present invention.

FIG. 49 is a schematic block diagram of another embodiment of a virtual memory model for the improved computer system of the present invention. FIG. 49 is similar to FIG. 35, but includes a directdsp HAL block.

Figure 50:
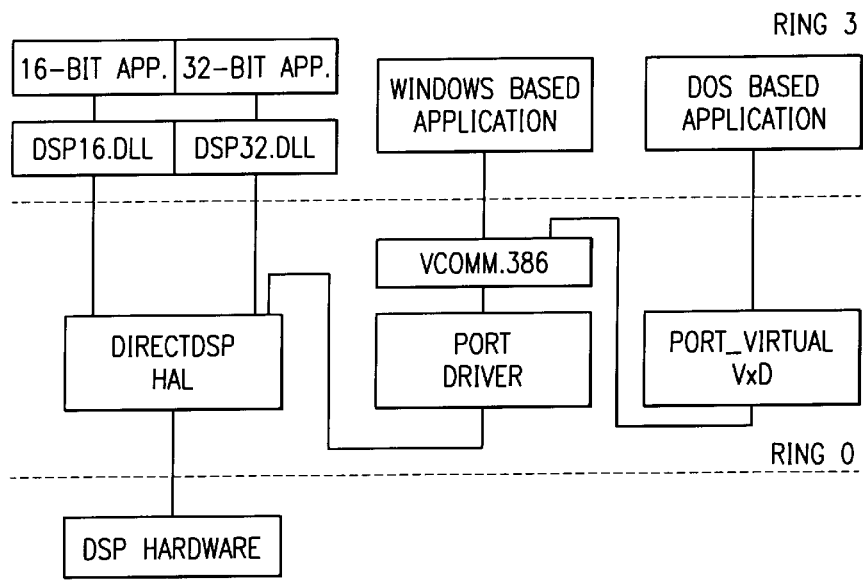
FIG. 50 is a schematic block diagram of another embodiment of a virtual memory model for the improved computer system of the present invention.

FIG. 50 is a schematic block diagram of another embodiment of a virtual memory model for the improved computer system of the present invention. FIG. 50 is similar to FIG. 36, but includes a directdsp HAL block.

Figure 51:
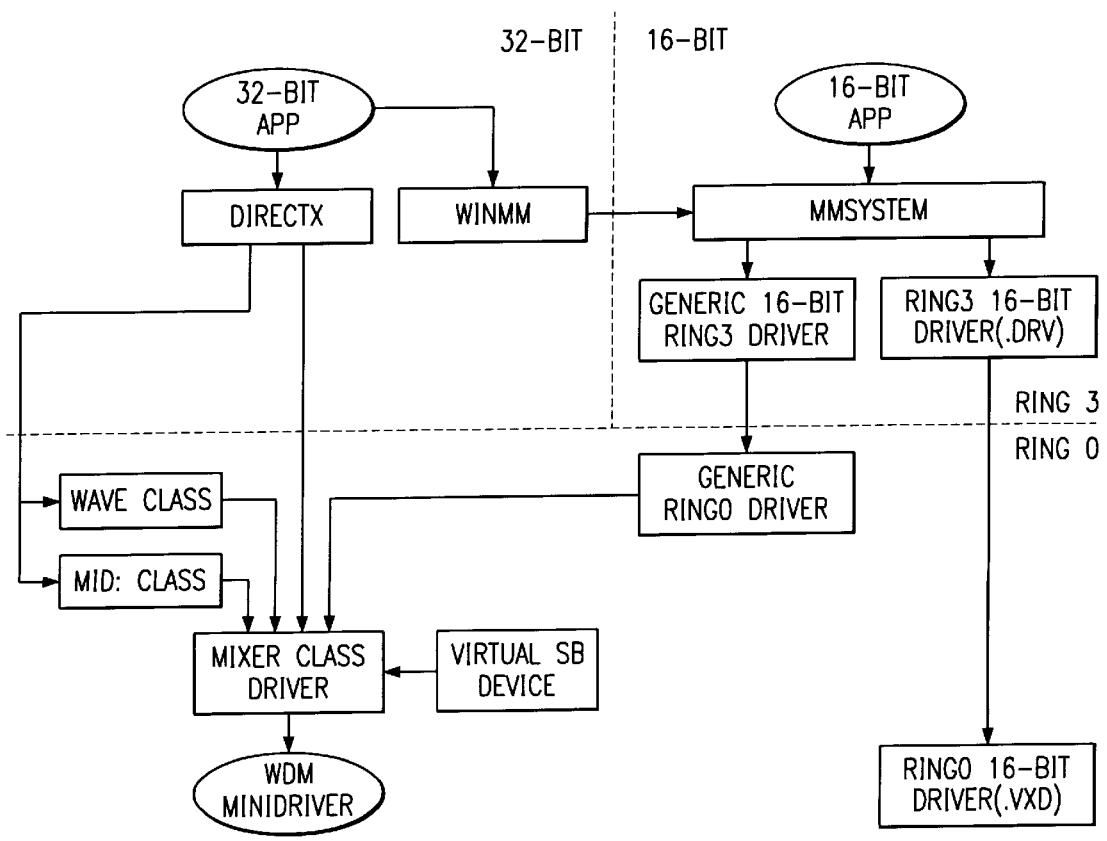
FIG. 51 is a schematic block diagram of another embodiment of a virtual memory model for multimedia used on the improved computer system of the present invention.

FIG. 51 is a schematic block diagram of another embodiment of a virtual memory model for multimedia useable on the improved computer system of the present invention. This model uses the direct nomenclature and shows the various interfaces between the applications and driver components.

Figure 52:
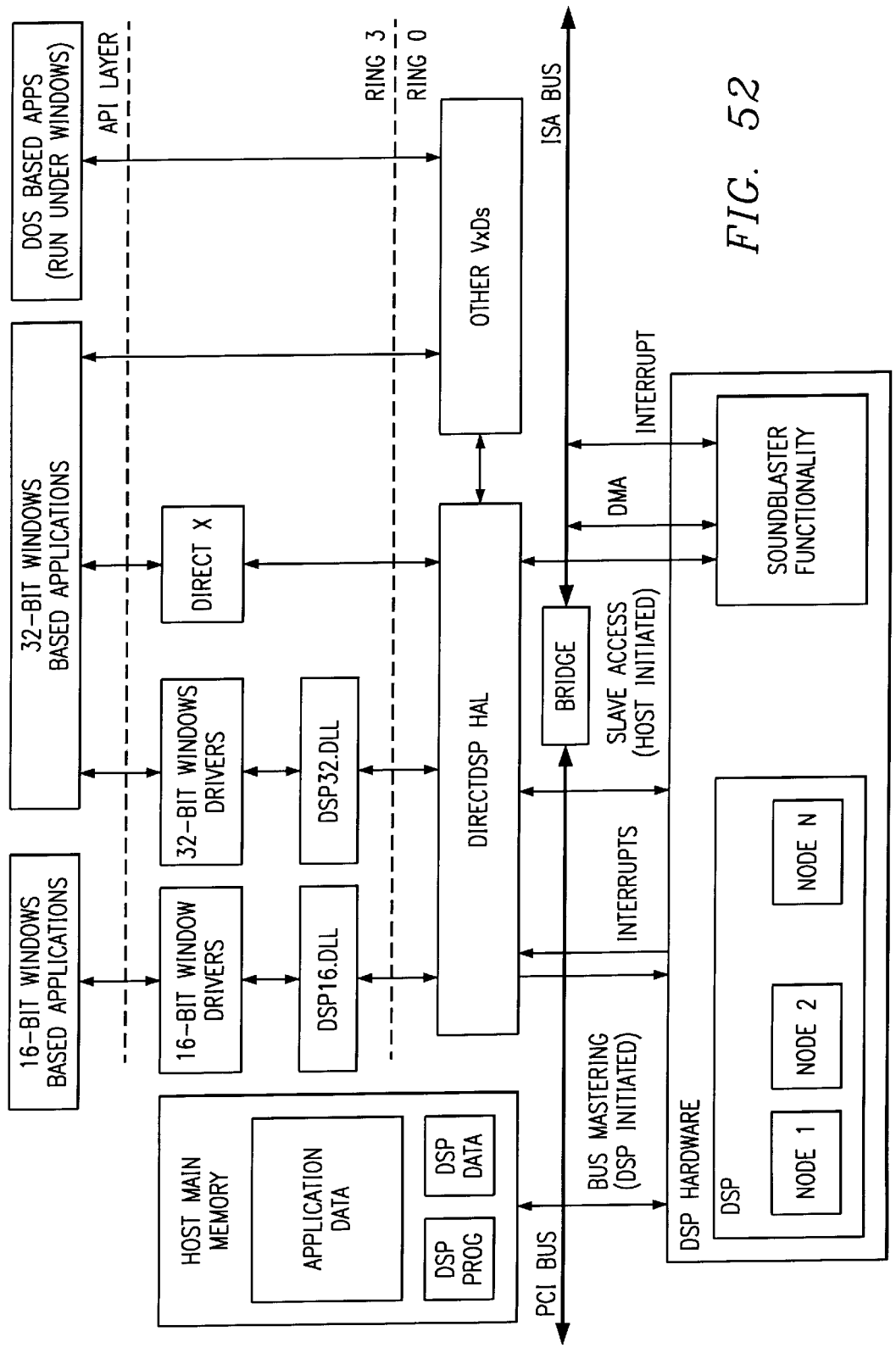
FIG. 52 is a schematic block diagram depicting the various layers of software between windows applications and the underlying PC hardware which implements the improved computer system of the present invention.

FIG. 52 is a schematic block diagram depicting the various layers of software between windows applications and the underlying PC hardware which implements the improved computer system of the present invention. This model shows the various interfaces between the applications, driver components, and various hardware blocks.

Figure 53:
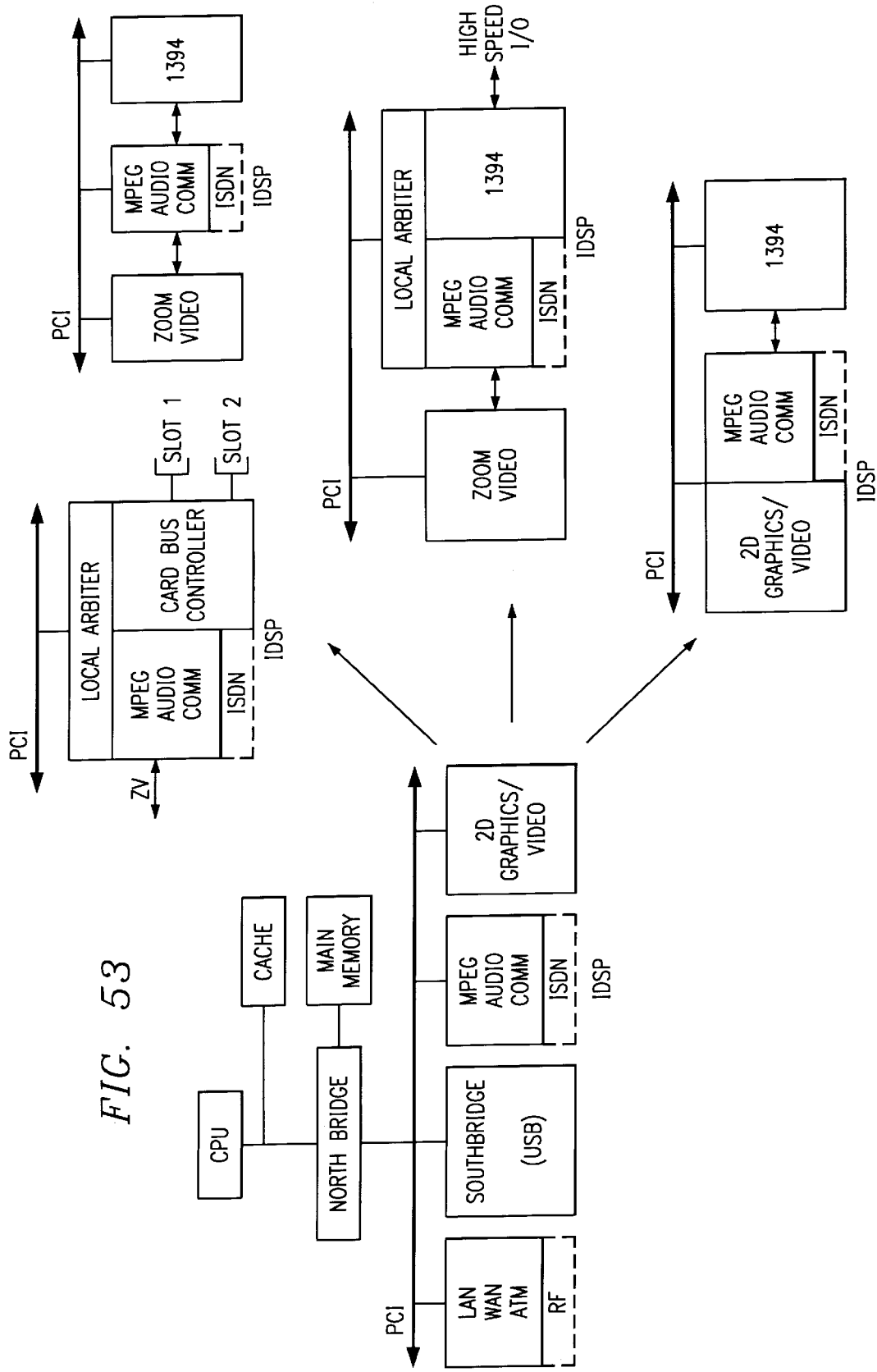
FIG. 53 is a schematic block diagram depicting the various ways selected application functionality may be combined together to provide blocks containing a DSP in accordance with the teachings of the present invention.

FIG. 53 is a schematic block diagram depicting the various ways selected application functionality may be combined together to provide blocks containing a DSP in accordance with the teachings of the present invention. This Figure depicts various integrations using functionality typically attached to the PCI bus.

Figure 54:
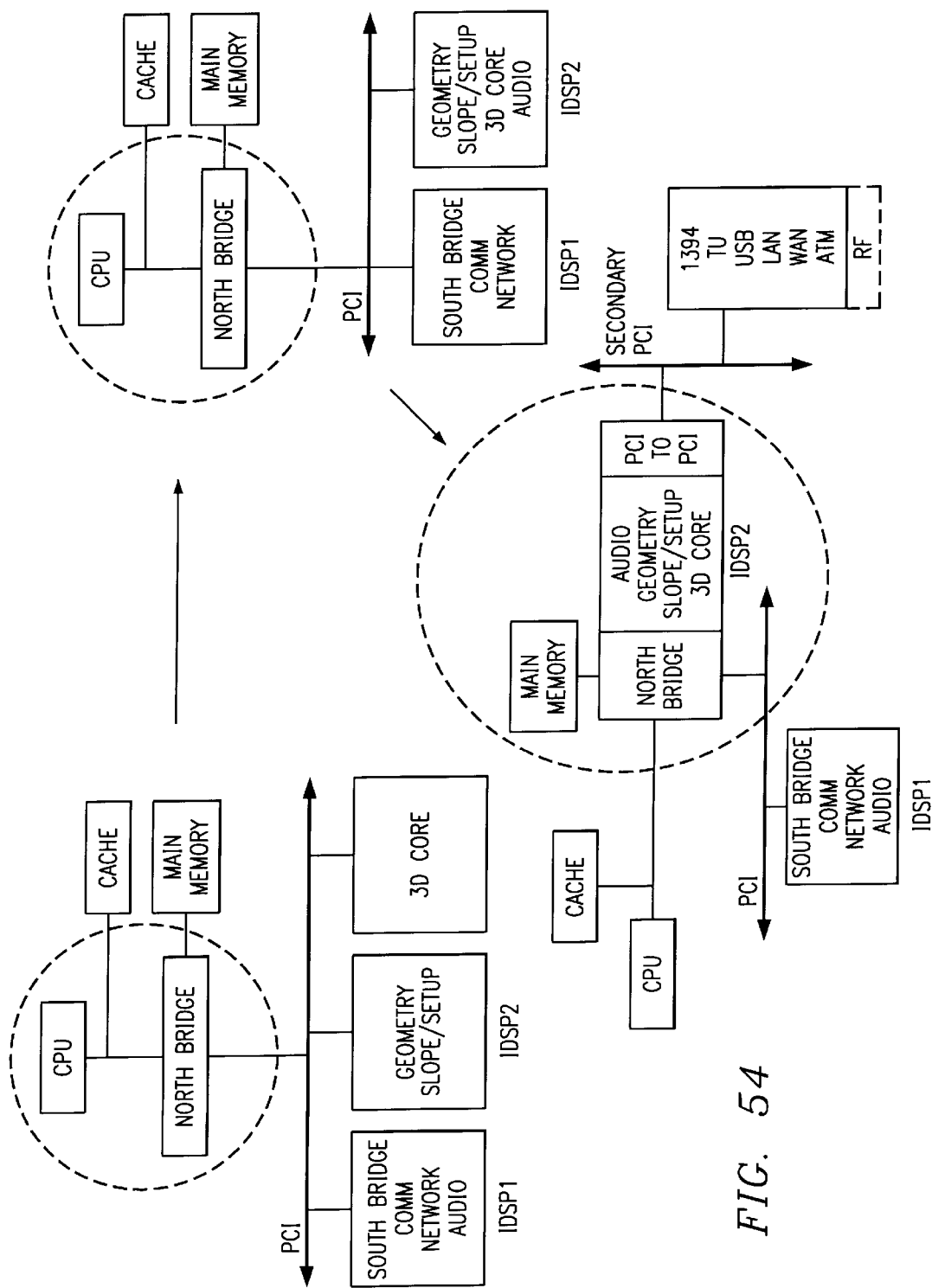
FIG. 54 is a schematic block diagram depicting alternative ways selected application functionality may be combined together to provide blocks containing a DSP in accordance with the teachings of the present invention.

FIG. 54 is a schematic block diagram depicting alternative ways selected application functionality may be combined together to provide blocks containing a DSP in accordance with the teachings of the present invention. This Figure depicts various integrations using functionality typically attached to the PCI bus and how some of this functionality may be included with the north bridge to accelerate to operations of the CPU. In addition, a secondary PCI bus is depicted for various networking functionality or high speed access.

Figure 55:
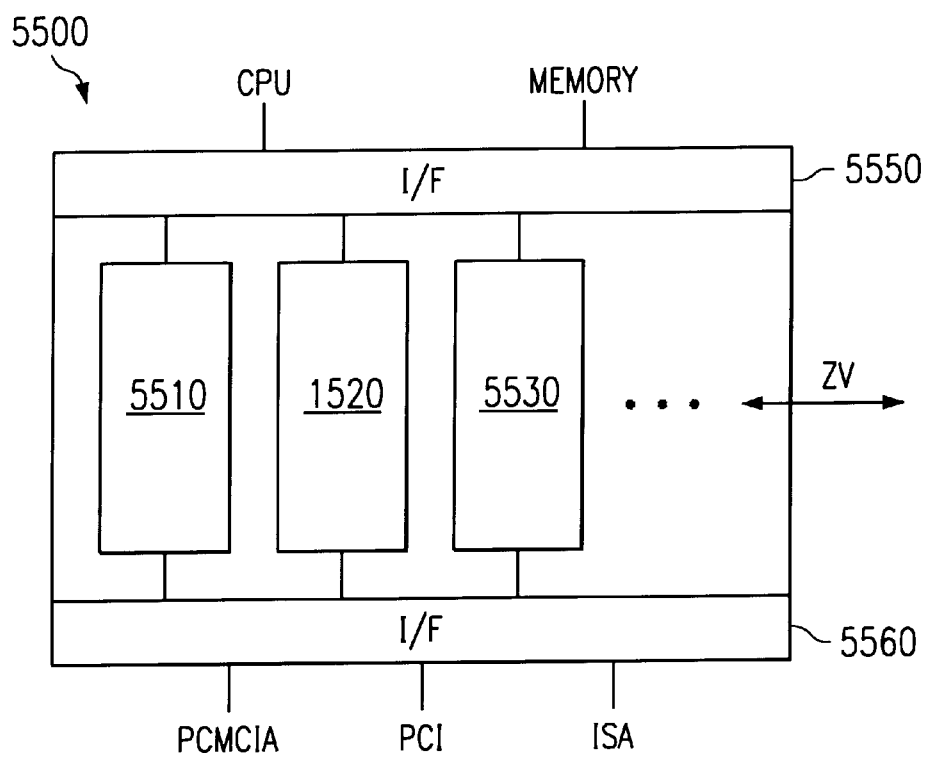
FIG. 55 is a schematic block diagram of another embodiment that may employed in the improved computer system of the present invention.

FIG. 55 is a schematic block diagram of another embodiment that may employed in the improved computer system of the present invention. FIG. 55 depicts the use of an interface circuit 5550 that provides access to a CPU and memory. Connected to the interface 5550 are a plurality of blocks 5510, 5520, 5530 that each include a DSP and are used to virtualize one or more applications according to the teachings of the present invention. These blocks in turn are connected to interface circuit 5560 which may be suitably connected to a PCMCIA, PCI, and/or ISA bus. In addition, a high speed ZV bus is also depicted interconnecting with appropriate ones of blocks 5510, 5520, 5530.

Figure 56:
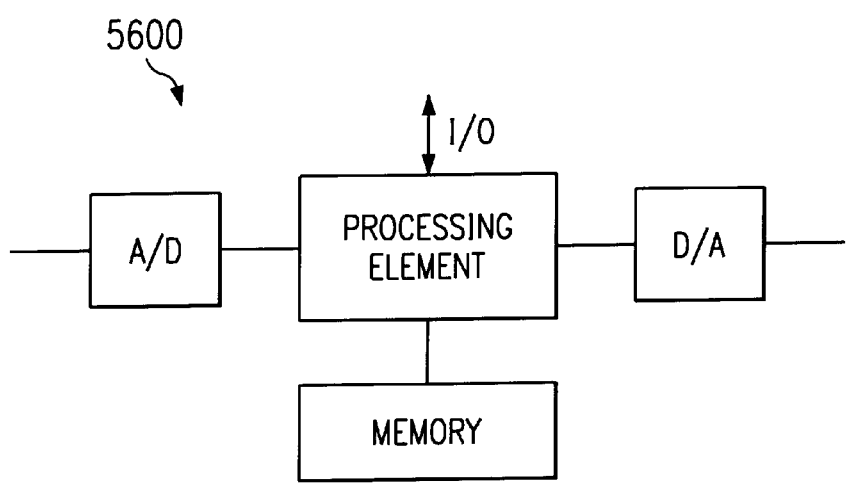
FIG. 56 is a high level schematic diagram of another embodiment that may employed in the improved computer system of the present invention.

FIG. 56 is a high level schematic diagram of another embodiment that may employed in the improved computer system of the present invention. FIG. 56 depicts how the overall block 5500 of FIG. 55 may be categorized as a processing element to which memory is connected and appropriate A/D and D/A blocks are connected. Additional T/O is also depicted.

While this invention has been described with reference to illustrative embodiments, this description is not intended to be construed in any limiting sense. Various modifications of the illustrative embodiments, as well as other embodiments of the invention, may be made and will be apparent to persons skilled in the art upon reference to this description. Accordingly, it is contemplated that the appended claims will cover any such modifications or embodiments as fall within the true scope of the present invention.

What is claimed is:

1. A single-chip integrated circuit comprising:

a master/slave bus interface including a PCI superbus master interface configurable for scatter-gather direct memory access;

a processor interface adapted for connection to a programmable data processor;

a memory circuit with FIFO operationality coupled to said master/slave interface, said memory circuit further with RAM operationality coupled to said processor interface; and a codec DMA state machine independent of the scatter-gather direct memory access.

2. A computing system comprising:

a main CPU microprocessor;

a first bus coupled to said main CPU microprocessor;

a master/slave bus interface coupled to said first bus;

a second microprocessor having a different instruction set from said main CPU microprocessor;

a processor interface coupled to said second microprocessor; and a memory circuit with FIFO operationality coupled to said master/slave interface, said memory circuit further with RAM operationality coupled to said processor interface.

3. The system of claim 2 wherein said master/slave bus interface includes a PCI superbus master interface configurable for scatter-gather direct memory access.

4. The system of claim 3 further comprising a codec DMA state machine independent of the scatter-gather direct memory access.

\* \* \* \* \*